(12) United States Patent
Woodgate et al.

(10) Patent No.: US 10,062,357 B2
(45) Date of Patent: Aug. 28, 2018

(54) CONTROLLING LIGHT SOURCES OF A DIRECTIONAL BACKLIGHT

(71) Applicant: REALD SPARK, LLC, Beverly Hills, CA (US)

(72) Inventors: Graham J. Woodgate, Henley on Thames (GB); Michael G. Robinson, Boulder, CO (US); Jonathan Harrold, Leamington Spa (GB)

(73) Assignee: RealD Spark, LLC, Beverly Hills, CA (US)

( * ) Notice: Subject to any disclaimer, the term of this patent is extended or adjusted under 35 U.S.C. 154(b) by 0 days.

(21) Appl. No.: 13/896,870

(22) Filed: May 17, 2013

(65) Prior Publication Data

US 2014/0009508 A1    Jan. 9, 2014

Related U.S. Application Data

(60) Provisional application No. 61/649,050, filed on May 18, 2012, provisional application No. 61/791,928, filed on Mar. 15, 2013.

(51) Int. Cl.
*G09G 5/00* (2006.01)
*G09G 5/10* (2006.01)
(Continued)

(52) U.S. Cl.
CPC .............. *G09G 5/10* (2013.01); *B60K 35/00* (2013.01); *G02B 6/003* (2013.01); *G02B 6/0011* (2013.01);
(Continued)

(58) Field of Classification Search
CPC .............. G02B 6/0053; G02B 6/0038; G02B 27/2214; G02B 6/0068; G02B 27/225;
(Continued)

(56) References Cited

U.S. PATENT DOCUMENTS 2,133,121 A   10/1938  Stearns
2,810,905 A   10/1957  Barlow
(Continued)

FOREIGN PATENT DOCUMENTS

CN   1466005 A    1/2004
CN   1696788 A    11/2005
(Continued)

OTHER PUBLICATIONS

Tabiryan et al., "The Promise of Diffractive Waveplates," Optics and Photonics News, vol. 21, Issue 3, pp. 40-45 (Mar. 2010).
(Continued)

*Primary Examiner* — Abdul-Samad A Adediran
(74) *Attorney, Agent, or Firm* — Penny L. Lowry; Neil G. Mothew

(57) ABSTRACT

Disclosed is an imaging directional backlight including an array of light sources, and a control system arranged to provide variable distribution of luminous fluxes, scaled inversely by the width associated with the respective light sources in the lateral direction, across the array of light sources. The luminous intensity distribution of output optical windows may be controlled to provide desirable luminance distributions in the window plane of an autostereoscopic display, a directional display operating in wide angle 2D mode, privacy mode and low power consumption mode. Image quality may be improved and power consumption reduced.

26 Claims, 46 Drawing Sheets

(51) Int. Cl.
  *B60K 35/00* (2006.01)
  *F21V 8/00* (2006.01)
  *H04N 13/04* (2006.01)
  *G02B 27/22* (2018.01)

(52) U.S. Cl.
  CPC .......... *G02B 6/0066* (2013.01); *G02B 6/0068* (2013.01); *G02B 27/225* (2013.01); *H04N 13/0418* (2013.01); *H04N 13/0452* (2013.01); *H04N 2013/0463* (2013.01); *H04N 2213/001* (2013.01)

(58) Field of Classification Search
  CPC .............. G02B 27/2264; G02B 6/0061; G02B 6/0036; G02B 6/003; G02F 1/133615; G02F 2001/133607; H04N 13/0418; H04N 13/0409; H04N 13/0477; H04N 13/0497; G09G 3/003; G09G 2320/068; G06F 2203/04109
  USPC .......................................................... 349/62
  See application file for complete search history.

(56) References Cited

U.S. PATENT DOCUMENTS

| | | | |
|---|---|---|---|
| 5,347,644 A | 9/1994 | Sedlmayr | |
| 5,703,667 A | 12/1997 | Ochiai | |
| 5,727,107 A | 3/1998 | Umemoto et al. | |
| 5,771,066 A | 6/1998 | Barnea | |
| 5,896,225 A | 4/1999 | Chikazawa | |
| 5,903,388 A | 5/1999 | Sedlmayr | |
| 5,959,664 A | 9/1999 | Woodgate | |
| 5,971,559 A | 10/1999 | Ishikawa et al. | |
| 6,014,164 A | 1/2000 | Woodgate et al. | |
| 6,061,489 A | 5/2000 | Ezra et al. | |
| 6,075,557 A | 6/2000 | Holliman et al. | |
| 6,108,059 A | 8/2000 | Yang | |
| 6,144,118 A | 11/2000 | Cahill et al. | |
| 6,199,995 B1 | 3/2001 | Umemoto | |
| 6,305,813 B1 | 10/2001 | Lekson et al. | |
| 6,464,365 B1 | 10/2002 | Gunn et al. | |
| 6,663,254 B2 | 12/2003 | Ohsumi | |
| 6,847,488 B2 | 1/2005 | Travis | |
| 6,870,671 B2 | 3/2005 | Travis | |
| 6,883,919 B2 | 4/2005 | Travis | |
| 7,052,168 B2 | 5/2006 | Epstein et al. | |
| 7,058,252 B2 | 6/2006 | Woodgate | |
| 7,073,933 B2 | 7/2006 | Gotoh et al. | |
| 7,101,048 B2 | 9/2006 | Travis | |
| 7,136,031 B2 | 11/2006 | Lee et al. | |
| 7,215,415 B2 | 5/2007 | Maehara | |
| 7,410,286 B2 | 8/2008 | Travis | |
| 7,430,358 B2 | 9/2008 | Qi et al. | |
| 7,528,893 B2 | 5/2009 | Schultz | |
| 7,545,429 B2 | 6/2009 | Travis | |
| 7,750,981 B2 | 7/2010 | Shestak | |
| 7,750,982 B2 | 7/2010 | Nelson | |
| 7,660,047 B1 | 8/2010 | Travis et al. | |
| 7,944,428 B2 | 5/2011 | Travis | |
| 7,970,246 B2 | 6/2011 | Travis et al. | |
| 7,976,208 B2 | 7/2011 | Travis | |
| 8,016,475 B2 | 9/2011 | Travis | |
| 8,216,405 B2 | 7/2012 | Emerton | |
| 8,223,296 B2 | 7/2012 | Lee et al. | |
| 8,325,295 B2 | 12/2012 | Sugita | |
| 8,354,806 B2 | 1/2013 | Travis | |
| 8,477,261 B2 | 7/2013 | Travis | |
| 8,534,901 B2 | 9/2013 | Panagotacos | |
| 8,556,491 B2 | 10/2013 | Lee | |
| 8,651,725 B2 | 2/2014 | Le et al. | |
| 8,714,804 B2 | 5/2014 | Kim et al. | |
| 2002/0113866 A1 | 8/2002 | Taniguchi et al. | |
| 2003/0137738 A1 | 7/2003 | Ozawa et al. | |
| 2004/0108971 A1 | 6/2004 | Waldern et al. | |
| 2004/0170011 A1 | 9/2004 | Kim et al. | |
| 2004/0263968 A1 | 12/2004 | Kobayashi et al. | |
| 2005/0135116 A1 | 6/2005 | Epstein et al. | |
| 2005/0180167 A1 | 8/2005 | Hoelen et al. | |
| 2005/0264717 A1 | 12/2005 | Chien et al. | |
| 2005/0276071 A1 | 12/2005 | Sasagawa et al. | |
| 2006/0132423 A1 | 6/2006 | Travis | |
| 2006/0139447 A1 | 6/2006 | Unkrich | |
| 2006/0158729 A1 | 7/2006 | Vissenberg et al. | |
| 2006/0215129 A1 | 9/2006 | Alasaarela et al. | |
| 2006/0269213 A1 | 11/2006 | Hwang et al. | |
| 2006/0291053 A1 | 12/2006 | Robinson et al. | |
| 2006/0291243 A1 | 12/2006 | Niioka et al. | |
| 2007/0025680 A1 | 2/2007 | Winston et al. | |
| 2007/0115551 A1 | 5/2007 | Robinson et al. | |
| 2007/0115552 A1 | 5/2007 | Robinson et al. | |
| 2007/0188667 A1 | 8/2007 | Schwerdtner | |
| 2007/0189701 A1 | 8/2007 | Chakmakjian et al. | |
| 2007/0223252 A1 | 9/2007 | Lee et al. | |
| 2008/0084519 A1 | 4/2008 | Brigham et al. | |
| 2008/0086289 A1 | 4/2008 | Brott | |
| 2008/0225205 A1 | 9/2008 | Travis | |
| 2008/0259012 A1 | 10/2008 | Fergason | |
| 2008/0291359 A1 | 11/2008 | Miyashita | |
| 2008/0297459 A1 | 12/2008 | Sugimoto et al. | |
| 2008/0304282 A1 | 12/2008 | Mi et al. | |
| 2008/0316768 A1 | 12/2008 | Travis | |
| 2009/0016057 A1 | 1/2009 | Rinko | |
| 2009/0067156 A1 | 3/2009 | Bonnett et al. | |
| 2009/0140656 A1 | 6/2009 | Kohashikawa et al. | |
| 2009/0160757 A1 | 6/2009 | Robinson | |
| 2009/0174700 A1* | 7/2009 | Daiku ............ | 345/214 |
| 2009/0190079 A1 | 7/2009 | Saitoh | |
| 2009/0225380 A1 | 9/2009 | Schwerdtner et al. | |
| 2009/0278936 A1 | 11/2009 | Pastoor et al. | |
| 2010/0053771 A1 | 2/2010 | Travis | |
| 2010/0091254 A1 | 4/2010 | Travis | |
| 2010/0165598 A1 | 7/2010 | Chen et al. | |
| 2010/0177387 A1 | 7/2010 | Travis | |
| 2010/0188438 A1 | 7/2010 | Kang | |
| 2010/0188602 A1 | 7/2010 | Feng | |
| 2010/0214135 A1 | 8/2010 | Bathiche | |
| 2010/0220260 A1* | 9/2010 | Sugita ................ | G02B 6/003 349/62 |
| 2010/0231498 A1 | 9/2010 | Large | |
| 2010/0277575 A1 | 11/2010 | Ismael et al. | |
| 2010/0278480 A1 | 11/2010 | Vasylyev | |
| 2010/0295930 A1 | 11/2010 | Ezhov | |
| 2010/0300608 A1 | 12/2010 | Emerton et al. | |
| 2010/0309296 A1* | 12/2010 | Harrold et al. ........... | 348/54 |
| 2011/0032483 A1 | 2/2011 | Hiruska et al. | |
| 2011/0043142 A1* | 2/2011 | Travis et al. ............. | 315/313 |
| 2011/0043501 A1 | 2/2011 | Daniel | |
| 2011/0044056 A1 | 2/2011 | Travis | |
| 2011/0044579 A1 | 2/2011 | Travis et al. | |
| 2011/0051237 A1 | 3/2011 | Hasegawa et al. | |
| 2011/0187293 A1 | 8/2011 | Travis | |
| 2011/0187635 A1 | 8/2011 | Lee et al. | |
| 2011/0188120 A1 | 8/2011 | Tabirian et al. | |
| 2011/0216266 A1 | 9/2011 | Travis | |
| 2011/0242298 A1 | 10/2011 | Bathiche | |
| 2011/0255303 A1 | 10/2011 | Nichol et al. | |
| 2011/0285927 A1 | 11/2011 | Schultz et al. | |
| 2011/0310232 A1 | 12/2011 | Wilson et al. | |
| 2012/0002136 A1 | 1/2012 | Nagata et al. | |
| 2012/0013720 A1 | 1/2012 | Kadowaki et al. | |
| 2012/0127573 A1 | 5/2012 | Robinson et al. | |
| 2012/0243204 A1 | 9/2012 | Robinson et al. | |
| 2013/0101253 A1 | 4/2013 | Popovich et al. | |
| 2013/0135588 A1 | 5/2013 | Popovich et al. | |

FOREIGN PATENT DOCUMENTS

| | | |
|---|---|---|
| CN | 101598863 A | 12/2009 |
| EP | 0939273 | 1/1999 |
| EP | 0860729 B1 | 7/2006 |
| EP | 2003394 | 12/2008 |
| JP | 08-237691 A | 9/1996 |
| JP | 08254617 A | 10/1996 |

(56) References Cited

FOREIGN PATENT DOCUMENTS

| | | |
|---|---|---|
| JP | 08340556 A | 12/1996 |
| JP | 2000-200049 A | 7/2000 |
| JP | 2001093321 A | 4/2001 |
| JP | 2002049004 A | 2/2002 |
| JP | 2003-215705 A | 7/2003 |
| JP | 2004319364 A | 11/2004 |
| JP | 2005135844 A | 5/2005 |
| JP | 2005183030 | 7/2005 |
| JP | 2005-259361 A | 9/2005 |
| JP | 2006004877 | 1/2006 |
| JP | 2006031941 A | 2/2006 |
| JP | 2006310269 A | 11/2006 |
| JP | 3968742 B2 | 8/2007 |
| JP | 2007273288 A | 10/2007 |
| JP | 2008204874 A | 9/2008 |
| JP | 2010160527 A | 7/2010 |
| JP | 2013502693 A | 1/2013 |
| KR | 1020030064258 | 7/2003 |
| KR | 10-0932304 B1 | 12/2009 |
| KR | 1020110006773 A | 1/2011 |
| KR | 1020110017918 A | 2/2011 |
| KR | 1020110067534 A | 6/2011 |
| KR | 10-2012-004989 A | 5/2012 |
| KR | 1020120048301 A | 5/2012 |
| WO | 2001-061241 A1 | 8/2001 |
| WO | 2011149739 A2 | 12/2011 |

OTHER PUBLICATIONS

International search report and written opinion of international searching authority in PCT/US2012/042279 dated Feb. 26, 2013.
International search report and written opinion of international searching authority in PCT/US2012/037677 dated Jun. 29, 2012.
International search report and written opinion of international searching authority in PCT/US2011/061511 dated Jun. 29, 2012.
Kalantar, et al. "Backlight Unit With Double Surface Light Emission," J. Soc. Inf. Display, vol. 12, Issue 4, pp. 379-387 (Dec. 2004).
International search report and written opinion of the international searching authority from PCT/US12/052189 dated Jan. 29, 2013.
International Preliminary Report on Patentability in PCT/US2011/061511 dated May 21, 2013.
International search report and written opinion of international searching authority for co-pending PCT application No. PCT/US2013/041192 dated Aug. 28, 2013.
International search report and written opinion of international searching authority for co-pending PCT application No. PCT/US2013/041619 dated Aug. 27, 2013.
International search report and written opinion of international searching authority for co-pending PCT application No. PCT/US2013/041655 dated Aug. 27, 2013.
International search report and written opinion of international searching authority for co-pending PCT application No. PCT/US2013/041703 dated Aug. 27, 2013.
International search report and written opinion of international searching authority for co-pending PCT application No. PCT/US2013/041548 dated Aug. 27, 2013.
International search report and written opinion of international searching authority for co-pending PCT application No. PCT/US2013/041683 dated Aug. 27, 2013.
International search report and written opinion of international searching authority for co-pending PCT application No. PCT/US2013/041228 dated Aug. 23, 2013.
International search report and written opinion of international searching authority for co-pending PCT application No. PCT/US2013/041235 dated Aug. 23, 2013.
International search report and written opinion of international searching authority for co-pending PCT application No. PCT/US2013/041697 dated Aug. 23, 2013.
International search report and written opinion of international searching authority for PCT application PCT/US2013/063133 dated Jan. 20, 2014.
International search report and written opinion of international searching authority for PCT application PCT/US2013/063125 dated Jan. 20, 2014.
International search report and written opinion of international searching authority for PCT application PCT/US2013/077288 dated Apr. 18, 2014.
International search report and written opinion of international searching authority for PCT application PCT/US2014/017779 dated May 28, 2014.
EP-13790942.0 European Extended Search Report of European Patent Office dated May 23, 2016.
JP 2015-512879 1st Office Action (translated) dated Apr. 11, 2017.
CN-201380026076.5 Office first action dated May 11, 2016.
EA-201401264 office action dated Jun. 23, 2017.
TW-102117633 office action dated Aug. 11, 2017.

* cited by examiner

CONTROLLING LIGHT SOURCES OF A DIRECTIONAL BACKLIGHT

CROSS-REFERENCE TO RELATED APPLICATIONS

This application claims priority to U.S. Patent App. No. 61/649,050, entitled "Control system for a directional light source", filed 18 May 2012, and to U.S. Patent App. No. 61/791,928, entitled "Illumination apparatus and control system for a directional display device", filed 15 Mar. 2013, the entireties of which are herein incorporated by reference.

TECHNICAL FIELD

This disclosure generally relates to illumination of spatial light modulators, and more specifically relates to directional backlights for providing large area illumination from localized light sources for use in 2D, 3D, and/or autostereoscopic display devices.

BACKGROUND

Spatially multiplexed autostereoscopic display devices typically align a parallax component such as a lenticular screen or parallax barrier with an array of images arranged as at least first and second sets of pixels on a spatial light modulator, for example an LCD. The parallax component directs light from each of the sets of pixels into different respective directions to provide first and second viewing windows in front of the display. An observer with an eye placed in the first viewing window can see a first image with light from the first set of pixels; and with an eye placed in the second viewing window can see a second image, with light from the second set of pixels.

Such display devices have reduced spatial resolution compared to the native resolution of the spatial light modulator and further, the structure of the viewing windows is determined by the pixel aperture shape and parallax component imaging function. Gaps between the pixels, for example for electrodes, typically produce non-uniform viewing windows. Undesirably such displays exhibit image flicker as an observer moves laterally with respect to the display and so limit the viewing freedom of the display. Such flicker can be reduced by defocusing the optical elements; however such defocusing results in increased levels of image cross talk and increases visual strain for an observer. Such flicker can be reduced by adjusting the shape of the pixel aperture, however such changes can reduce display brightness and can include addressing electronics in the spatial light modulator.

BRIEF SUMMARY

According to a first aspect of the present disclosure, there is provided a method of controlling an array of light sources of a directional backlight. The directional backlight may include a waveguide having an input end and the array of light sources may be disposed at different input positions in a lateral direction across the input end of the waveguide. The waveguide may have first and second opposed guide surfaces for guiding light along the waveguide. The waveguide may be arranged to direct input light from the light sources, as output light through the first guide surface into optical windows in output directions distributed in a lateral direction to the normal to the first guide surface that may be primarily dependent on the input positions. The method may selectively operate the light sources to direct light into varying optical windows corresponding to the output directions, and the light sources may be controlled to output light with luminous fluxes, scaled inversely by the width associated with the respective light sources in the lateral direction, that vary across the array of light sources.

In some embodiments, the variation of display luminance with viewing angle may be modified to achieve a backlight that has Lambertian characteristics from waveguides that exhibit non-Lambertian optical output characteristics when illuminated by light source arrays with uniform luminous fluxes across the array of light sources. Advantageously, the backlight may appear to have a visual appearance similar to paper and may be comfortable to view as each eye of an observer may perceive an illumination structure with the same perceived image brightness.

In other embodiments, the luminance of the backlight may be arranged to fall for off axis viewing positions at a faster rate than for a Lambertian characteristic. By way of comparison, such a backlight may achieve substantially lower power consumption in comparison to Lambertian output backlights.

In observer tracked embodiments, the backlight may achieve a Lambertian illumination appearance for a given viewing position, while the change in intensity with viewing position may vary in a non-Lambertian manner. Advantageously, the image may have high comfort to view, while the backlight power consumption may be reduced in comparison to Lambertian displays.

In further embodiments, the backlight luminance may be arranged to vary across a viewing window; the cross talk of an autostereoscopic image may be reduced while achieving acceptable levels of image flicker for a moving observer.

According to another aspect of the present disclosure, there is provided a directional display apparatus in which a control system is arranged to implement a similar method.

According to another aspect of the present disclosure, there is provided a method of controlling an array of light sources of a directional backlight. The directional backlight may include a waveguide having an input end and the array of light sources disposed at different input positions in a lateral direction across the input end of the waveguide. The waveguide may further include first and second opposed guide surfaces for guiding light along the waveguide, and a reflective end facing the input end for reflecting input light from the light sources back through the waveguide. The waveguide may be arranged to direct input light from the light sources, after reflection from the reflective end, as output light through the first guide surface into optical windows in output directions distributed in a lateral direction to the normal to the first guide surface that may be primarily dependent on the input positions. The method may include supplying drive signals to the light sources that selectively operate the light sources to direct light into varying optical windows corresponding to the output directions and sensing light incident on the input end from the light sources after reflection from the reflective end. The drive signals may be calibrated in response to the sensed light incident on the input end.

The scaled luminous flux of a light source array may vary spatially due to non-uniformities in luminance and chromaticity between respective light source of the array. The present embodiments may advantageously achieve calibration of variation between fluxes of respective light sources so that an optical output may be provided that achieves control of light source scaled luminous flux that may vary in a uniform manner for an observer. Further, the scaled luminous flux may vary with time, for example due to ageing effects of the light source. The present embodiments may achieve in-field correction of light source ageing effects, advantageously providing extended device lifetime and uniformity of output. A small number of detectors may be used to monitor the whole array during a calibration step, reducing cost.

Sensing the light incident on the input end may use sensor elements arranged at a region of the input end outside the array of light sources in the lateral direction. In another example, sensing the light incident on the input end may use sensor elements arranged at regions of the input end outside the array of light sources in the lateral direction on both sides of the array of light sources. In yet another example, sensing the light incident on the input end may use light sources of the array that are not concurrently operated. The levels of the drive signals may be calibrated such that the light sources output light with luminous fluxes that have a predetermined distribution across the array of light sources According to another aspect of the present disclosure, there is provided a directional backlight apparatus in which a control system is arranged to implement a similar method.

Embodiments herein may provide an autostereoscopic display with large area and thin structure. Further, as will be described, the optical valves of the present disclosure may achieve thin optical components with large back working distances. Such components can be used in directional backlights, to provide directional displays including autostereoscopic displays. Further, embodiments may provide a controlled illuminator for the purposes of an efficient autostereoscopic and efficient 2D image display.

Embodiments of the present disclosure may be used in a variety of optical systems. The embodiment may include or work with a variety of projectors, projection systems, optical components, displays, microdisplays, computer systems, processors, self-contained projector systems, visual and/or audiovisual systems and electrical and/or optical devices. Aspects of the present disclosure may be used with practically any apparatus related to optical and electrical devices, optical systems, presentation systems or any apparatus that may contain any type of optical system. Accordingly, embodiments of the present disclosure may be employed in optical systems, devices used in visual and/or optical presentations, visual peripherals and so on and in a number of computing environments.

Before proceeding to the disclosed embodiments in detail, it should be understood that the disclosure is not limited in its application or creation to the details of the particular arrangements shown, because the disclosure is capable of other embodiments. Moreover, aspects of the disclosure may be set forth in different combinations and arrangements to define embodiments unique in their own right. Also, the terminology used herein is for the purpose of description and not of limitation.

Directional backlights offer control over the illumination emanating from substantially the entire output surface controlled typically through modulation of independent LED light sources arranged at the input aperture side of an optical waveguide. Controlling the emitted light directional distribution can achieve single person viewing for a security function, where the display can only be seen by a single viewer from a limited range of angles; high electrical efficiency, where illumination is only provided over a small angular directional distribution; alternating left and right eye viewing for time sequential stereoscopic and autostereoscopic display; and low cost.

The various aspects of the present invention and the various features thereof may be applied together in any combination.

These and other advantages and features of the present disclosure will become apparent to those of ordinary skill in the art upon reading this disclosure in its entirety.

BRIEF DESCRIPTION OF THE DRAWINGS

Embodiments are illustrated by way of example in the accompanying FIGURES, in which like reference numbers indicate similar parts, and in which.

DETAILED DESCRIPTION

Figure 1A:
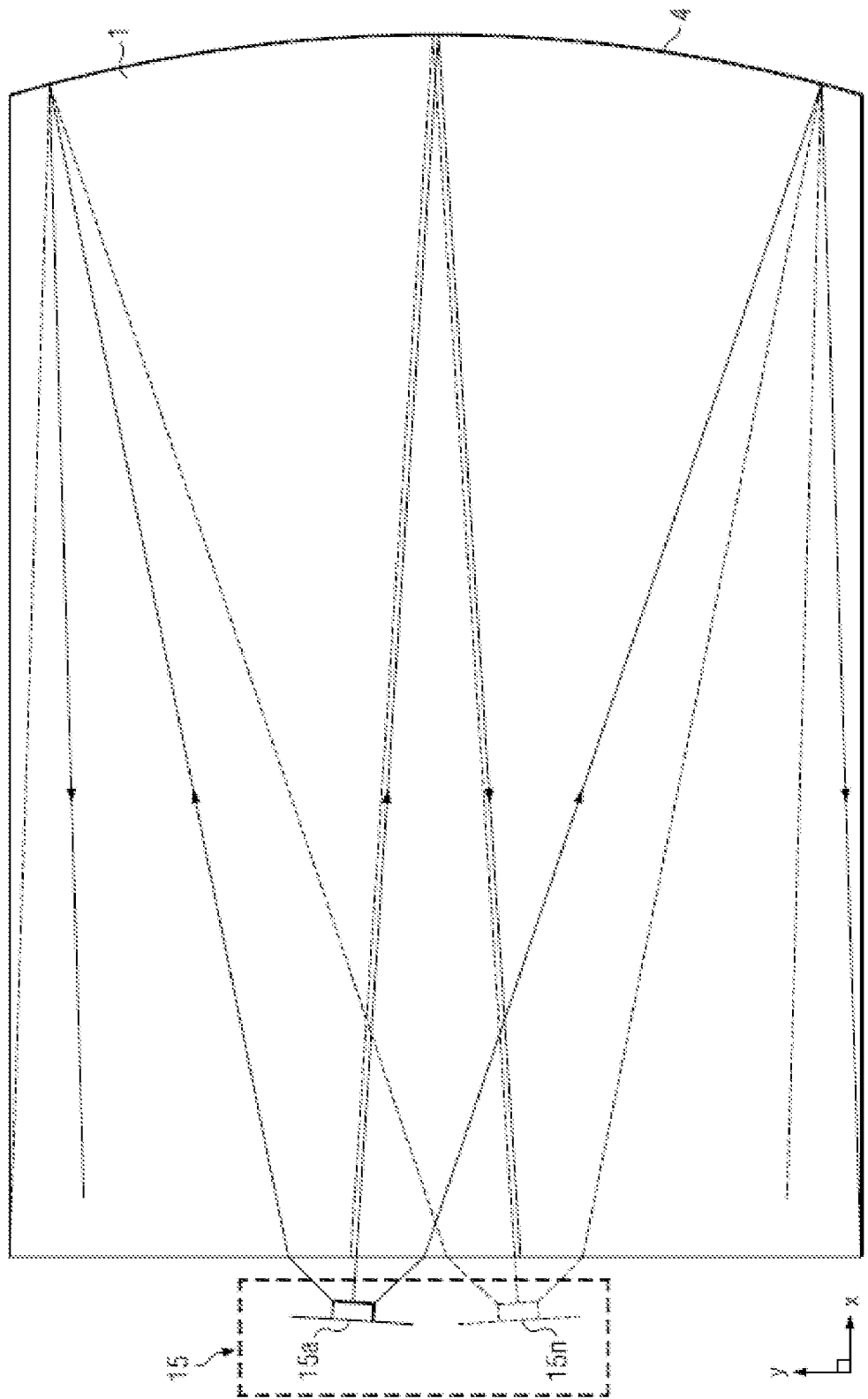
FIG. 1A is a schematic diagram illustrating a front view of light propagation in one embodiment of a directional display device, in accordance with the present disclosure.

Time multiplexed autostereoscopic displays can advantageously improve the spatial resolution of autostereoscopic display by directing light from all of the pixels of a spatial light modulator to a first viewing window in a first time slot, and all of the pixels to a second viewing window in a second time slot. Thus an observer with eyes arranged to receive light in first and second viewing windows will see a full resolution image across the whole of the display over multiple time slots. Time multiplexed displays can advantageously achieve directional illumination by directing an illuminator array through a substantially transparent time multiplexed spatial light modulator using directional optical elements, wherein the directional optical elements substantially form an image of the illuminator array in the window plane.

The uniformity of the viewing windows may be advantageously independent of the arrangement of pixels in the spatial light modulator. Advantageously, such displays can provide observer tracking displays which have low flicker, with low levels of cross talk for a moving observer.

To achieve high uniformity in the window plane, it is desirable to provide an array of illumination elements that have a high spatial uniformity. The illuminator elements of the time sequential illumination system may be provided, for example, by pixels of a spatial light modulator with size approximately 100 micrometers in combination with a lens array. However, such pixels suffer from similar difficulties as for spatially multiplexed displays. Further, such devices may have low efficiency and higher cost, requiring additional display components.

High window plane uniformity can be conveniently achieved with macroscopic illuminators, for example, an array of LEDs in combination with homogenizing and diffusing optical elements that are typically of size 1 mm or greater. However, the increased size of the illuminator elements means that the size of the directional optical elements increases proportionately. For example, a 16 mm wide illuminator imaged to a 65 mm wide viewing window may require a 200 mm back working distance. Thus, the increased thickness of the optical elements can prevent useful application, for example, to mobile displays, or large area displays.

Addressing the aforementioned shortcomings, optical valves as described in commonly-owned U.S. patent application Ser. No. 13/300,293 advantageously can be arranged in combination with fast switching transmissive spatial light modulators to achieve time multiplexed autostereoscopic illumination in a thin package while providing high resolution images with flicker free observer tracking and low levels of cross talk. Described is a one dimensional array of viewing positions, or windows, that can display different images in a first, typically horizontal, direction, but contain the same images when moving in a second, typically vertical, direction.

Conventional non-imaging display backlights commonly employ optical waveguides and have edge illumination from light sources such as LEDs. However, it should be appreciated that there are many fundamental differences in the function, design, structure, and operation between such conventional non-imaging display backlights and the imaging directional backlights discussed in the present disclosure.

Generally, for example, in accordance with the present disclosure, imaging directional backlights are arranged to direct the illumination from multiple light sources through a display panel to respective multiple optical windows in at least one axis. Each optical window is substantially formed as an image in at least one axis of a light source by the imaging system of the imaging directional backlight. An imaging system may be formed to image multiple light sources to respective viewing windows. In this manner, the light from each of the multiple light sources is substantially not visible for an observer's eye outside of the respective viewing window.

In contradistinction, conventional non-imaging backlights or light guiding plates (LGPs) are used for illumination of 2D displays. See, e.g., Kälil Käläntär et al., *Backlight Unit With Double Surface Light Emission*, J. Soc. Inf. Display, Vol. 12, Issue 4, pp. 379-387 (December 2004). Non-imaging backlights are typically arranged to direct the illumination from multiple light sources through a display panel into a substantially common viewing zone for each of the multiple light sources to achieve wide viewing angle and high display uniformity. Thus non-imaging backlights do not form viewing windows. In this manner, the light from each of the multiple light sources may be visible for an observer's eye at substantially all positions across the viewing zone. Such conventional non-imaging backlights may have some directionality, for example, to increase screen gain compared to Lambertian illumination, which may be provided by brightness enhancement films such as BEF™ from 3M. However, such directionality may be substantially the same for each of the respective light sources. Thus, for these reasons and others that should be apparent to persons of ordinary skill, conventional non-imaging backlights are different to imaging directional backlights. Edge lit non-imaging backlight illumination structures may be used in liquid crystal display systems such as those seen in 2D Laptops, Monitors and TVs. Light propagates from the edge of a lossy waveguide which may include sparse features; typically local indentations in the surface of the guide which cause light to be lost regardless of the propagation direction of the light.

As used herein, an optical valve is an optical structure that may be a type of light guiding structure or device referred to as, for example, a light valve, an optical valve directional backlight, and a valve directional backlight ("v-DBL"). In the present disclosure, optical valve is different to a spatial light modulator (even though spatial light modulators may be sometimes generally referred to as a "light valve" in the art). One example of an imaging directional backlight is an optical valve that may employ a folded optical system. Light may propagate substantially without loss in one direction through the optical valve, may be incident on an imaging reflector, and may counter-propagate such that the light may be extracted by reflection off tilted light extraction features, and directed to viewing windows as described in patent application Ser. No. 13/300,293, which is herein incorporated by reference in its entirety.

As used herein, examples of an imaging directional backlight include a stepped waveguide imaging directional backlight, a folded imaging directional backlight, a wedge type directional backlight, or an optical valve.

Additionally, as used herein, a stepped waveguide imaging directional backlight may be an optical valve. A stepped waveguide is a waveguide for an imaging directional backlight including a waveguide for guiding light, further including a first light guiding surface; and a second light guiding surface, opposite the first light guiding surface, further including a plurality of guiding features interspersed with a plurality of extraction features arranged as steps.

Moreover, as used, a folded imaging directional backlight may be at least one of a wedge type directional backlight, or an optical valve.

In operation, light may propagate within an exemplary optical valve in a first direction from an input end to a reflective end and may be transmitted substantially without loss. Light may be reflected at the reflective end and propagates in a second direction substantially opposite the first direction. As the light propagates in the second direction, the light may be incident on light extraction features, which are operable to redirect the light outside the optical valve. Stated differently, the optical valve generally allows light to propagate in the first direction and may allow light to be extracted while propagating in the second direction.

The optical valve may achieve time sequential directional illumination of large display areas. Additionally, optical elements may be employed that are thinner than the back working distance of the optical elements to direct light from macroscopic illuminators to a nominal window plane. Such displays may use an array of light extraction features arranged to extract light counter propagating in a substantially parallel waveguide.

Thin imaging directional backlight implementations for use with LCDs have been proposed and demonstrated by 3M, for example U.S. Pat. No. 7,528,893; by Microsoft, for example U.S. Pat. No. 7,970,246 which may be referred to herein as a "wedge type directional backlight;" by RealD, for example U.S. patent application Ser. No. 13/300,293 which may be referred to herein as an "optical valve" or "optical valve directional backlight," all of which are herein incorporated by reference in their entirety.

The present disclosure provides stepped waveguide imaging directional backlights in which light may reflect back and forth between the internal faces of, for example, a stepped waveguide which may include a first guide surface and a second guide surface comprising a plurality of light extraction features and intermediate regions. As the light travels along the length of the stepped waveguide, the light may not substantially change angle of incidence with respect to the first and second guide surfaces and so may not reach the critical angle of the medium at these internal surfaces. Light extraction may be advantageously achieved by a light extraction features which may be facets of the second guide surface (the step "risers") that are inclined to the intermediate regions (the step "treads"). Note that the light extraction features may not be part of the light guiding operation of the stepped waveguide, but may be arranged to provide light extraction from the structure. By contrast, a wedge type imaging directional backlight may allow light to guide within a wedge profiled waveguide having continuous internal surfaces. Thus, the stepped waveguide (optical valve) is thus not a wedge type imaging directional backlight.

Figure 1B:
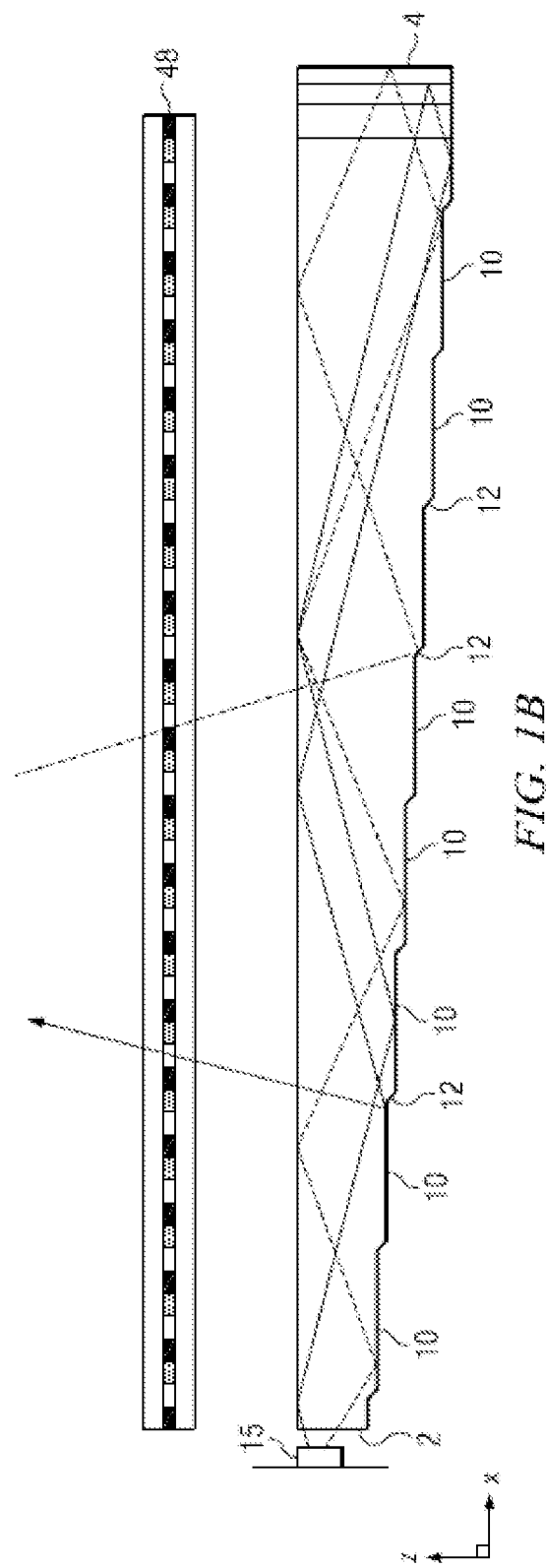
FIG. 1B is a schematic diagram illustrating a side view of light propagation in one embodiment of the directional display device of FIG. 1A, in accordance with the present disclosure.

FIG. 1A is a schematic diagram illustrating a front view of light propagation in one embodiment of a directional display device, and FIG. 1B is a schematic diagram illustrating a side view of light propagation in the directional display device of FIG. 1A.

FIG. 1A illustrates a front view in the xy plane of a directional backlight of a directional display device, and includes an illuminator array 15 which may be used to illuminate a stepped waveguide 1. Illuminator array 15 includes illuminator elements 15a through illuminator element 15n (where n is an integer greater than one). In one example, the stepped waveguide 1 of FIG. 1A may be a stepped, display sized waveguide 1. Illuminator elements 15a through 15n are light sources that may be light emitting diodes (LEDs). Although LEDs are discussed herein as illuminator elements 15a-15n, other light sources may be used such as, but not limited to, diode sources, semiconductor sources, laser sources, local field emission sources, organic emitter arrays, and so forth. Additionally, FIG. 1B illustrates a side view in the xz plane, and includes illuminator array 15, SLM (spatial light modulator) 48, extraction features 12, intermediate regions 10, and stepped waveguide 1, arranged as shown. The side view provided in FIG. 1B is an alternative view of the front view shown in FIG. 1A. Accordingly, the illuminator array 15 of FIGS. 1A and 1B corresponds to one another and the stepped waveguide 1 of FIGS. 1A and 1B may correspond to one another.

Further, in FIG. 1B, the stepped waveguide 1 may have an input end 2 that is thin and a reflective end 4 that is thick. Thus the waveguide 1 extends between the input end 2 that receives input light and the reflective end 4 that reflects the input light back through the waveguide 1. The length of the input end 2 in a lateral direction across the waveguide is greater than the height of the input end 2. The illuminator elements 15a-15n are disposed at different input positions in a lateral direction across the input end 2.

The waveguide 1 has first and second, opposed guide surfaces extending between the input end 2 and the reflective end 4 for guiding light forwards and back along the waveguide 1 by total internal reflection (TIR). The first guide surface is planar. The second guide surface has a plurality of light extraction features 12 facing the reflective end 4 and inclined to reflect at least some of the light guided back through the waveguide 1 from the reflective end in directions that break the total internal reflection at the first guide surface and allow output through the first guide surface, for example, upwards in FIG. 1B, that is supplied to the SLM 48.

In this example, the light extraction features 12 are reflective facets, although other reflective features could be used. The light extraction features 12 do not guide light through the waveguide, whereas the intermediate regions of the second guide surface intermediate the light extraction features 12 guide light without extracting it. Those regions of the second guide surface are planar and may extend parallel to the first guide surface, or at a relatively low inclination. The light extraction features 12 extend laterally to those regions so that the second guide surface has a stepped shape including of the light extraction features 12 and intermediate regions. The light extraction features 12 are oriented to reflect light from the light sources, after reflection from the reflective end 4, through the first guide surface.

The light extraction features 12 are arranged to direct input light from different input positions in the lateral direction across the input end in different directions relative to the first guide surface that are dependent on the input position. As the illumination elements 15a-15n are arranged at different input positions, the light from respective illumination elements 15a-15n is reflected in those different directions. In this manner, each of the illumination elements 15a-15n directs light into a respective optical window in output directions distributed in the lateral direction in dependence on the input positions. The lateral direction across the input end 2 in which the input positions are distributed corresponds with regard to the output light to a lateral direction to the normal to the first guide surface. The lateral directions as defined at the input end 2 and with regard to the output light remain parallel in this embodiment where the deflections at the reflective end 4 and the first guide surface are generally orthogonal to the lateral direction. Under the control of a control system, the illuminator elements 15a-15n may be selectively operated to direct light into a selectable optical window. The optical windows may be used individually or in groups as viewing windows.

In the present disclosure an optical window may correspond to the image of a single light source in the window plane, being a nominal plane in which optical windows form across the entirety of the display device. Alternatively, an optical window may correspond to the image of a groups of light sources that are driven together. Advantageously, such groups of light sources may increase uniformity of the optical windows of the array 121.

By way of comparison, a viewing window is a region in the window plane wherein light is provided comprising image data of substantially the same image from across the display area. Thus a viewing window may be formed from a single optical window or from plural optical windows, under the control of the control system.

The SLM 48 extends across the waveguide is transmissive and modulates the light passing therethrough. Although the SLM 48 may be a liquid crystal display (LCD) but this is merely by way of example, and other spatial light modulators or displays may be used including LCOS, DLP devices, and so forth, as this illuminator may work in reflection. In this example, the SLM 48 is disposed across the first guide surface of the waveguide and modulates the light output through the first guide surface after reflection from the light extraction features 12.

The operation of a directional display device that may provide a one dimensional array of optical windows is illustrated in front view in FIG. 1A, with its side profile shown in FIG. 1B. In operation, in FIGS. 1A and 1B, light may be emitted from an illuminator array 15, such as an array of illuminator elements 15a through 15n, located at different positions, y, along the surface of input end 2, x=0, of the stepped waveguide 1. The light may propagate along +x in a first direction, within the stepped waveguide 1, while at the same time, the light may fan out in the xy plane and upon reaching the reflective end 4 that is curved to have a positive optical power in the lateral direction, may substantially or entirely fill the curved end side 4. While propagating, the light may spread out to a set of angles in the xz plane up to, but not exceeding the critical angle of the guide material. The extraction features 12 that link the intermediate regions 10 of the second guide surface of the stepped waveguide 1 may have a tilt angle greater than the critical angle and hence may be missed by substantially all light propagating along +x in the first direction, ensuring the substantially lossless forward propagation.

Continuing the discussion of FIGS. 1A and 1B, the reflective end 4 of the stepped waveguide 1 may be made reflective, typically by being coated with a reflective material such as, for example, silver, although other reflective techniques may be employed. Light may therefore be redirected in a second direction, back down the guide in the direction of −x and may be substantially collimated in the xy or display plane. The angular spread may be substantially preserved in the xz plane about the principal propagation direction, which may allow light to hit the riser edges and reflect out of the guide. In an embodiment with approximately 45 degree tilted extraction features 12, light may be effectively directed approximately normal to the xy display plane with the xz angular spread substantially maintained relative to the propagation direction. This angular spread may be increased when light exits the stepped waveguide 1 through refraction, but may be decreased somewhat dependent on the reflective properties of the extraction features 12.

In some embodiments with uncoated extraction features 12, reflection may be reduced when total internal reflection (TIR) fails, squeezing the xz angular profile and shifting off normal. However, in other embodiments having silver coated or metallized extraction features, the increased angular spread and central normal direction may be preserved. Continuing the description of the embodiment with silver coated extraction features, in the xz plane, light may exit the stepped waveguide 1 approximately collimated and may be directed off normal in proportion to the y-position of the respective illuminator element 15a-15n in illuminator array 15 from the input edge center. Having independent illuminator elements 15a-15n along the input end 2 then enables light to exit from the entire first guide surface 6 and propagate at different external angles, as illustrated in FIG. 1A.

Figure 2A:
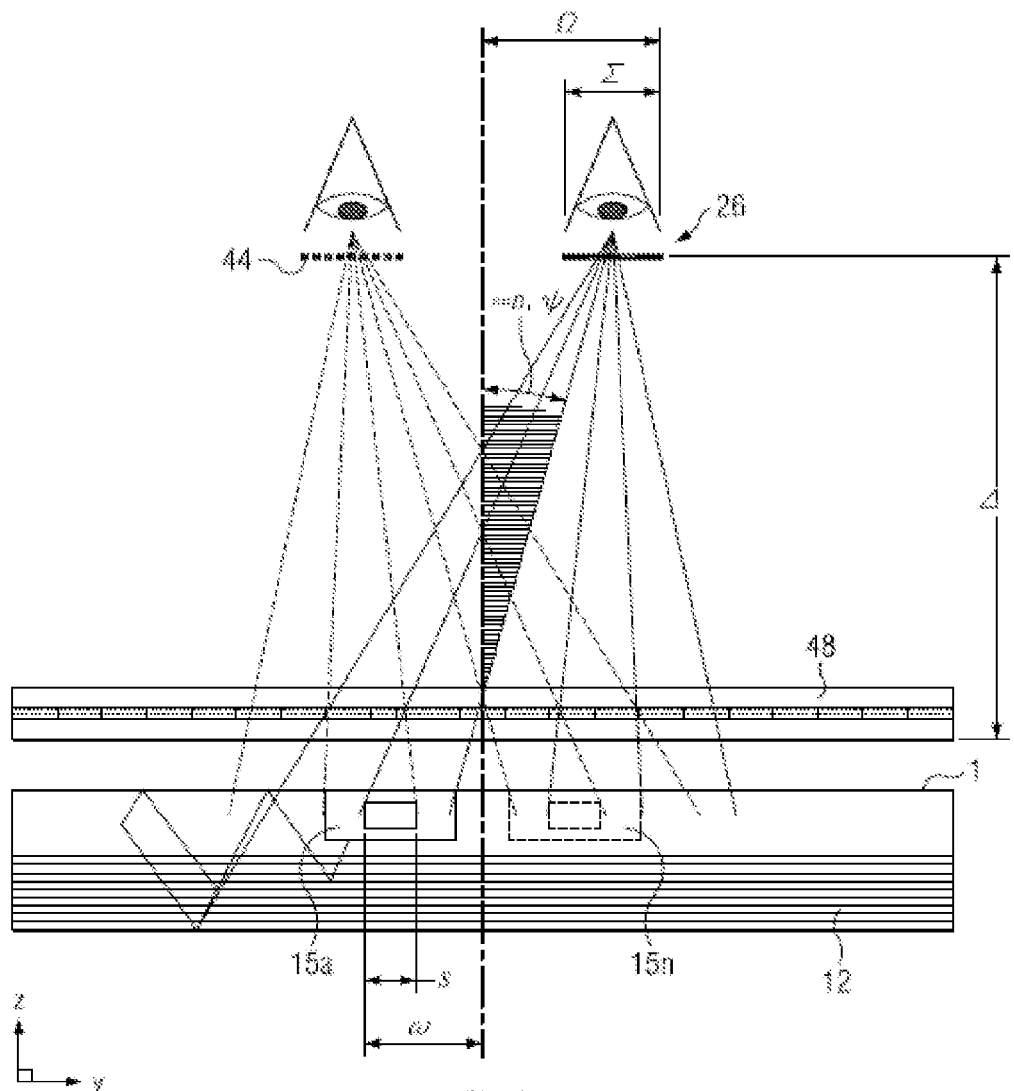
FIG. 2A is a schematic diagram illustrating in a top view of light propagation in another embodiment of a directional display device, in accordance with the present disclosure.
Figure 2B:
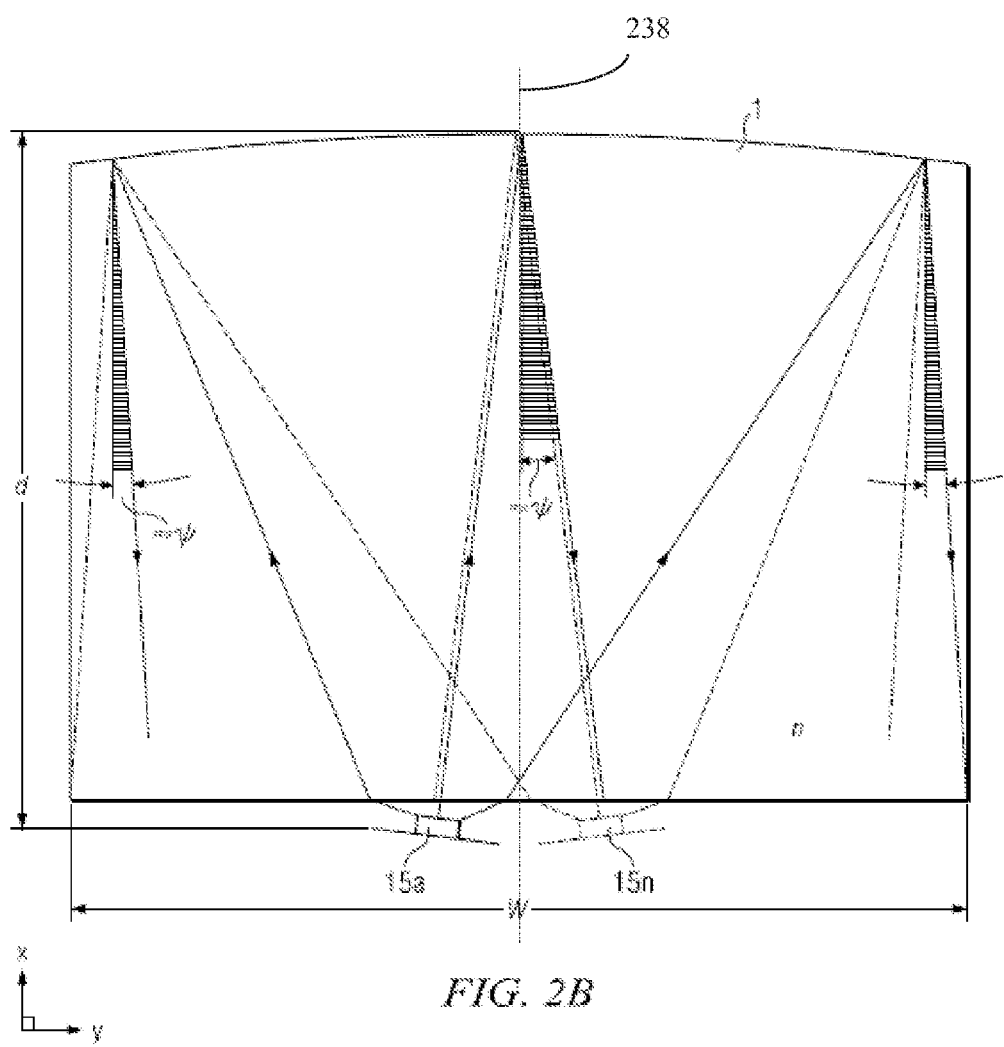
FIG. 2B is a schematic diagram illustrating light propagation in a front view of the directional display device of FIG. 2A, in accordance with the present disclosure.
Figure 2C:
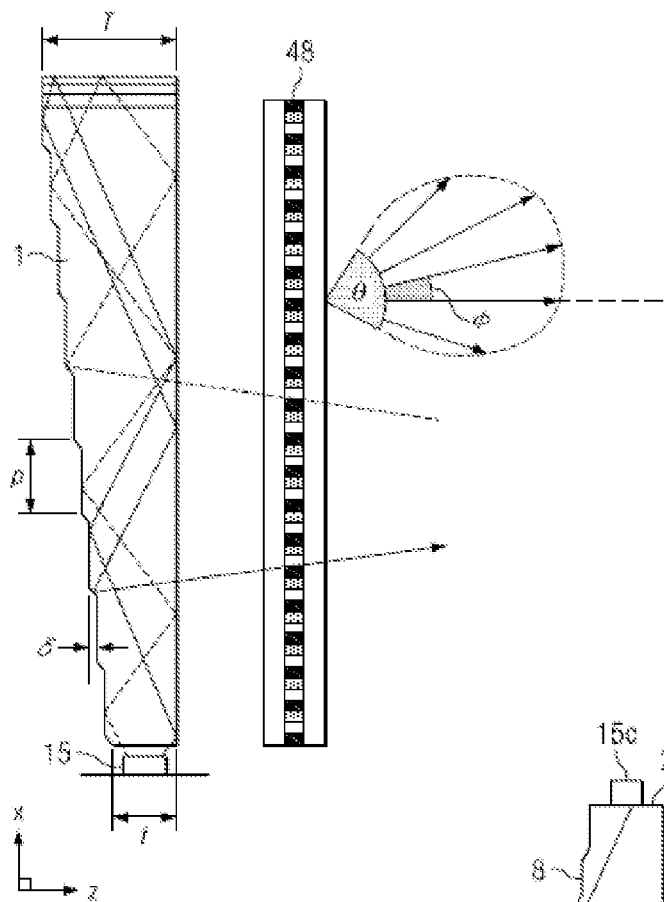
FIG. 2C is a schematic diagram illustrating light propagation in a side view of the directional display device of FIG. 2A, in accordance with the present disclosure.

Illuminating a spatial light modulator (SLM) 48 such as a fast liquid crystal display (LCD) panel with such a device may achieve autostereoscopic 3D as shown in top view or yz-plane viewed from the illuminator array 15 end in FIG. 2A, front view in FIG. 2B and side view in FIG. 2C. FIG. 2A is a schematic diagram illustrating in a top view, propagation of light in a directional display device, FIG. 2B is a schematic diagram illustrating in a front view, propagation of light in a directional display device, and FIG. 2C is a schematic diagram illustrating in side view propagation of light in a directional display device. As illustrated in FIGS. 2A, 2B, and 2C, a stepped waveguide 1 may be located behind a fast (e.g., greater than 100 Hz) LCD panel SLM 48 that displays sequential right and left eye images. In synchronization, specific illuminator elements 15a through 15n of illuminator array 15 (where n is an integer greater than one) may be selectively turned on and off, providing illuminating light that enters right and left eyes substantially independently by virtue of the system's directionality. In the simplest case, sets of illuminator elements of illuminator array 15 are turned on together, providing a one dimensional viewing window 26 or an optical pupil with limited width in the horizontal direction, but extended in the vertical direction, in which both eyes horizontally separated may view a left eye image, and another viewing window 44 in which a right eye image may primarily be viewed by both eyes, and a central position in which both the eyes may view different images. Viewing window 26 may comprise an array of optical windows 260 and viewing window 44 may comprise an array of optical windows 440, wherein each optical window is formed by a single illuminator of the array 15. Thus multiple illuminators may be arranged to form viewing windows 26 and 44. In FIG. 2A, the viewing window 26 is shown as formed by a single illuminator 15a and may thus comprise a single optical window 260. Similarly, the viewing window 44 is shown as formed by a single illuminator 15n and may thus comprise a single optical window 440. In this way, 3D may be viewed when the head of a viewer is approximately centrally aligned. Movement to the side away from the central position may result in the scene collapsing onto a 2D image.

The reflective end 4 may have positive optical power in the lateral direction across the waveguide. In embodiments in which typically the reflective end 4 has positive optical power, the optical axis may be defined with reference to the shape of the reflective end 4, for example being a line that passes through the centre of curvature of the reflective end 4 and coincides with the axis of reflective symmetry of the end 4 about the x-axis. In the case that the reflecting surface 4 is flat, the optical axis may be similarly defined with respect to other components having optical power, for example the light extraction features 12 if they are curved, or the Fresnel lens 62 described below. The optical axis 238 is typically coincident with the mechanical axis of the waveguide 1. In the present embodiments that typically comprise a substantially cylindrical reflecting surface at end 4, the optical axis 238 is a line that passes through the centre of curvature of the surface at end 4 and coincides with the axis of reflective symmetry of the side 4 about the x-axis. The optical axis 238 is typically coincident with the mechanical axis of the waveguide 1. The cylindrical reflecting surface at end 4 may typically be a spherical profile to optimize performance for on-axis and off-axis viewing positions. Other profiles may be used.

Figure 3:
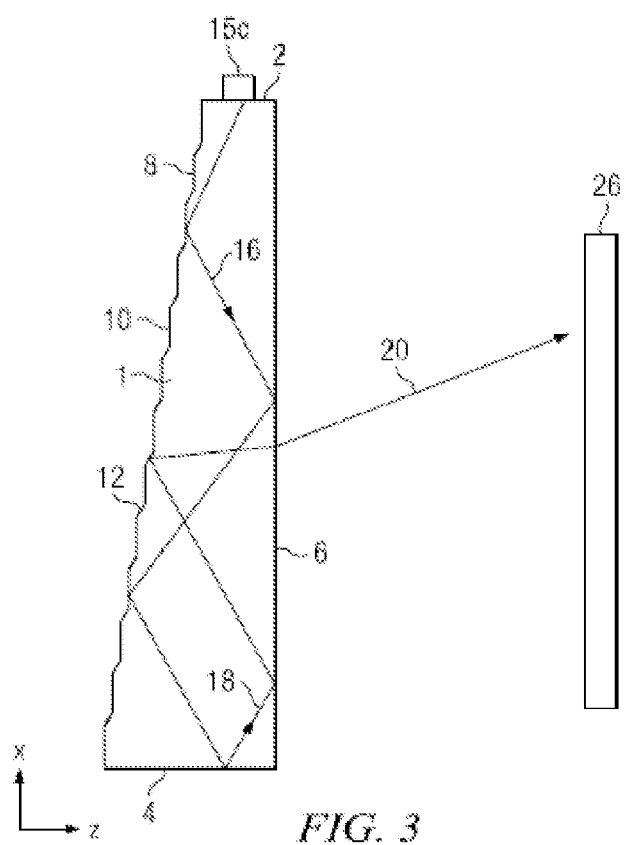
FIG. 3 is a schematic diagram illustrating in a side view of a directional display device, in accordance with the present disclosure.

FIG. 3 is a schematic diagram illustrating in side view a directional display device. Further, FIG. 3 illustrates additional detail of a side view of the operation of a stepped waveguide 1, which may be a transparent material. The stepped waveguide 1 may include an illuminator input end 2, a reflective end 4, a first guide surface 6 which may be substantially planar, and a second guide surface 8 which includes intermediate regions 10 and light extraction features 12. In operation, light rays 16 from an illuminator element 15c of an illuminator array 15 (not shown in FIG. 3), that may be an addressable array of LEDs for example, may be guided in the stepped waveguide 1 by means of total internal reflection by the first guide surface 6 and total internal reflection by the intermediate regions 10 of the second guide surface 8, to the reflective end 4, which may be a mirrored surface. Although reflective end 4 may be a mirrored surface and may reflect light, it may in some embodiments also be possible for light to pass through reflective end 4.

Continuing the discussion of FIG. 3, light ray 18 reflected by the reflective end 4 may be further guided in the stepped waveguide 1 by total internal reflection at the reflective end 4 and may be reflected by extraction features 12. Light rays 18 that are incident on extraction features 12 may be substantially deflected away from guiding modes of the stepped waveguide 1 and may be directed, as shown by ray 20, through the first guide surface 6 to an optical pupil that may form a viewing window 26 of an autostereoscopic display. The width of the viewing window 26 may be determined by at least the size of the illuminator, number of illuminator elements 15n illuminated, output design distance and optical power in the reflective end 4 and extraction features 12. The height of the viewing window may be primarily determined by the reflection cone angle of the extraction features 12 and the illumination cone angle input at the input end 2. Thus each viewing window 26 represents a range of separate output directions with respect to the surface normal direction of the spatial light modulator 48 that intersect with a window plane 106 at the nominal viewing distance.

Figure 4A:
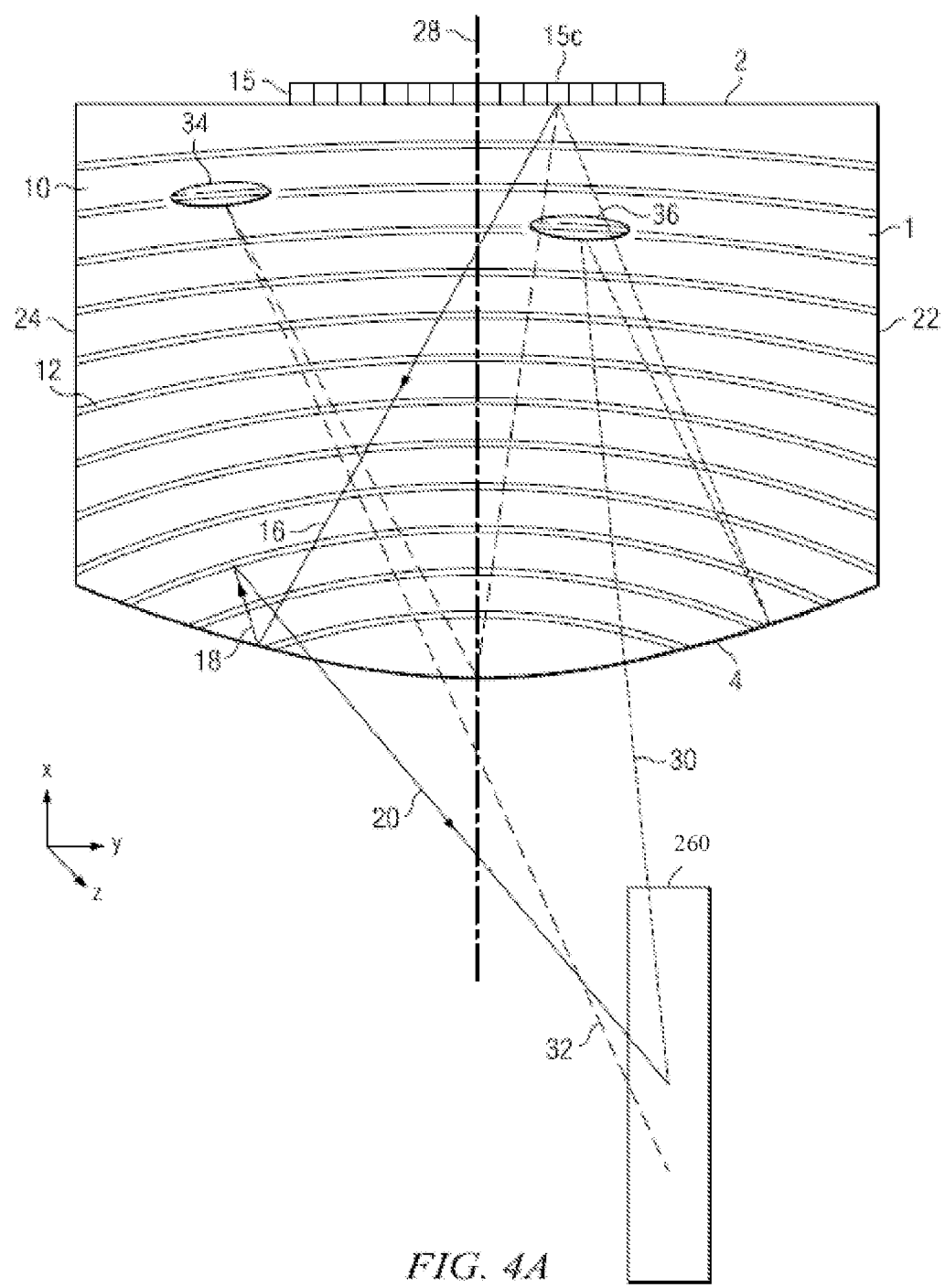
FIG. 4A is schematic diagram illustrating in a front view, generation of a viewing window in a directional display device and including curved light extraction features, in accordance with the present disclosure.

FIG. 4A is a schematic diagram illustrating in front view a directional display device which may be illuminated by a first illuminator element and including curved light extraction features. Further, FIG. 4A shows in front view further guiding of light rays from illuminator element 15c of illuminator array 15, in the stepped waveguide 1 having an optical axis 28. In FIG. 4A, the directional backlight may include the stepped waveguide 1 and the light source illuminator array 15. Each of the output rays are directed from the input end 2 towards the same optical window 260 from the respective illuminator 15c. The light rays of FIG. 4A may exit the reflective end 4 of the stepped waveguide 1. As shown in FIG. 4A, ray 16 may be directed from the illuminator element 15c towards the reflective end 4. Ray 18 may then reflect from a light extraction feature 12 and exit the reflective end 4 towards the optical window 260. Thus light ray 30 may intersect the ray 20 in the optical window 260, or may have a different height in the viewing window as shown by ray 32. Additionally, in various embodiments, sides 22, 24 of the waveguide 1 may be transparent, mirrored, or blackened surfaces. Continuing the discussion of FIG. 4A, light extraction features 12 may be elongate, and the orientation of light extraction features 12 in a first region 34 of the second guide surface 8 (shown in FIG. 3, but not shown in FIG. 4A) may be different to the orientation of light extraction features 12 in a second region 36 of the second guide surface 8. Similar to other embodiments discussed herein, for example as illustrated in FIG. 3, the light extraction features of FIG. 4A may alternate with the intermediate regions 10. As illustrated in FIG. 4A, the stepped waveguide 1 may include a reflective surface on reflective end 4. In one embodiment, the reflective end of the stepped waveguide 1 may have positive optical power in a lateral direction across the stepped waveguide 1.

In another embodiment, the light extraction features 12 of each directional backlight may have positive optical power in a lateral direction across the waveguide.

In another embodiment, each directional backlight may include light extraction features 12 which may be facets of the second guide surface. The second guide surface may have regions alternating with the facets that may be arranged to direct light through the waveguide without substantially extracting it.

Figure 4B:
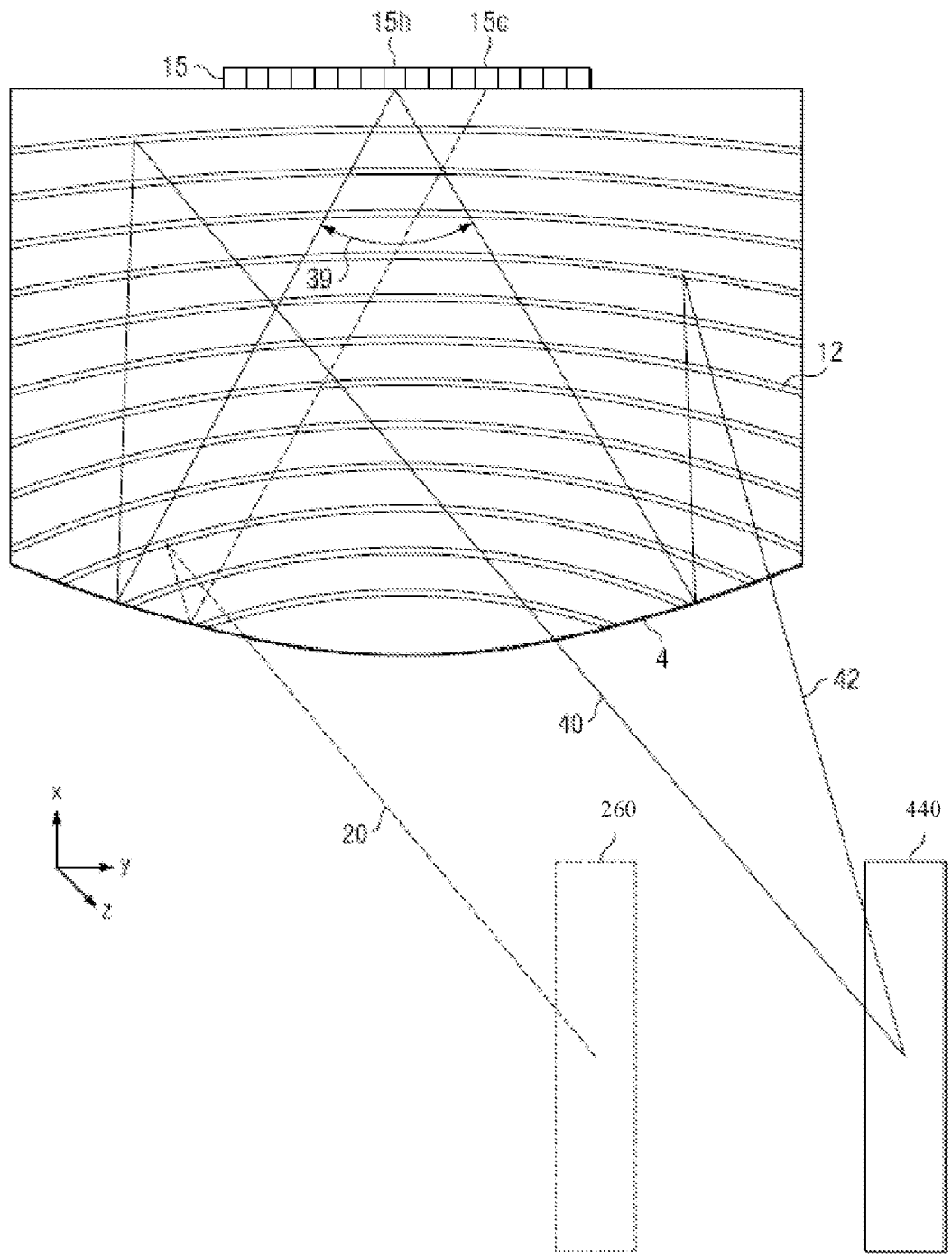
FIG. 4B is a schematic diagram illustrating in a front view, generation of a first and a second viewing window in a directional display device and including curved light extraction features, in accordance with the present disclosure.

FIG. 4B is a schematic diagram illustrating in front view a directional display device which may illuminated by a second illuminator element. Further, FIG. 4B shows the light rays 40, 42 from a second illuminator element 15h of the illuminator array 15. The curvature of the reflective surface on the reflective end 4 and the light extraction features 12 cooperatively produce a second optical window 440 laterally separated from the optical window 260 with light rays from the illuminator element 15h.

Advantageously, the arrangement illustrated in FIG. 4B may provide a real image of the illuminator element 15c at an optical window 260 in which the real image may be formed by cooperation of optical power in reflective end 4 and optical power which may arise from different orientations of elongate light extraction features 12 between regions 34 and 36, as shown in FIG. 4A. The arrangement of FIG. 4B may achieve improved aberrations of the imaging of illuminator element 15c to lateral positions in optical window 260. Improved aberrations may achieve an extended viewing freedom for an autostereoscopic display while achieving low cross talk levels.

Figure 5:
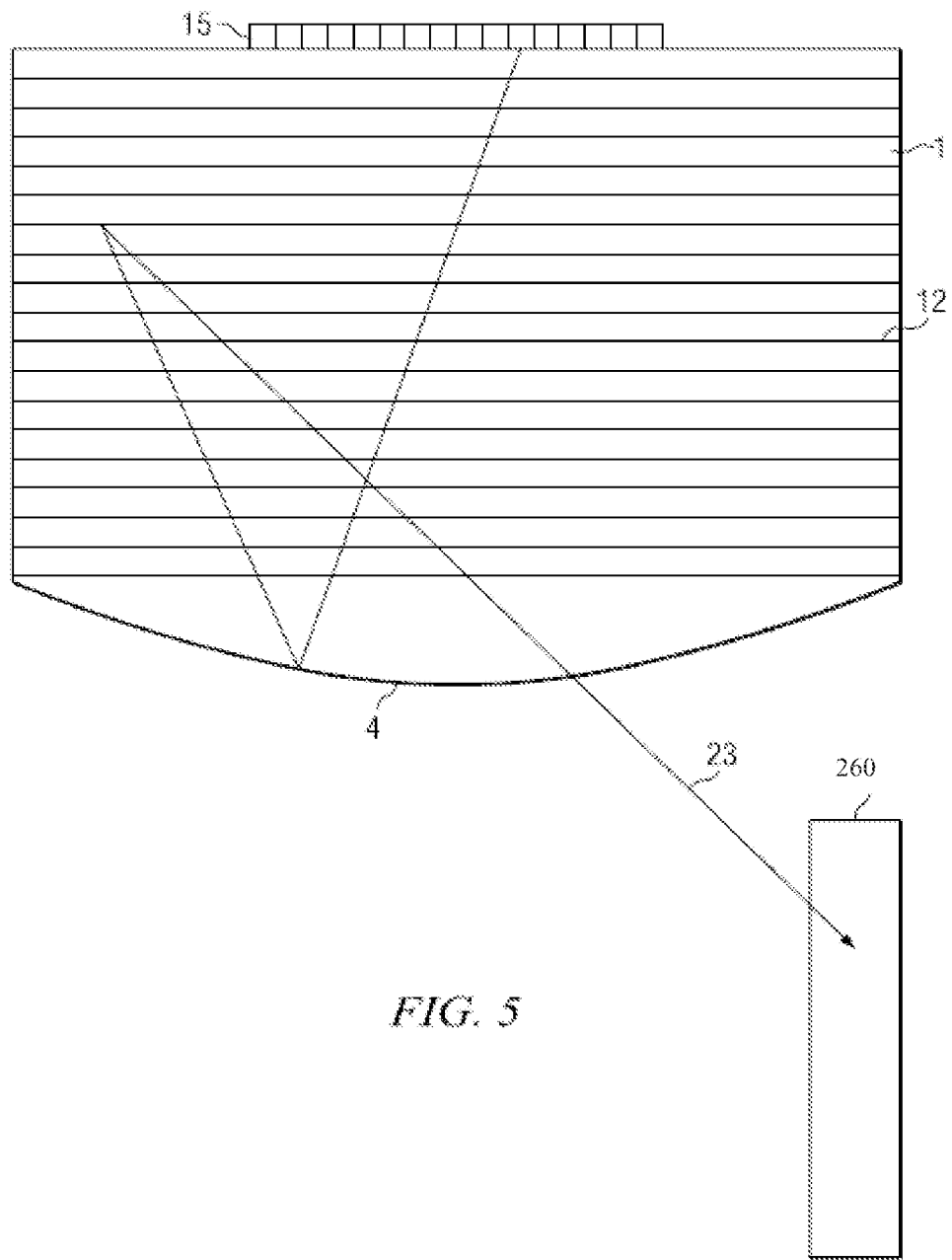
FIG. 5 is a schematic diagram illustrating generation of a first viewing window in a directional display device including linear light extraction features, in accordance with the present disclosure.

FIG. 5 is a schematic diagram illustrating in front view an embodiment of a directional display device having substantially linear light extraction features. Further, FIG. 5 shows a similar arrangement of components to FIG. 1 (with corresponding elements being similar), with one of the differences being that the light extraction features 12 are substantially linear and parallel to each other. Advantageously, such an arrangement may provide substantially uniform illumination across a display surface and may be more convenient to manufacture than the curved extraction features of FIG. 4A and FIG. 4B. The optical axis 321 of the directional waveguide 1 may be the optical axis direction of the surface at the reflective end 4. The optical power of the reflective end 4 is arranged to be across the optical axis direction, thus rays incident on the reflective end 4 will have an angular deflection that varies according to the lateral offset 319 of the incident ray from the optical axis 321.

Figure 6A:
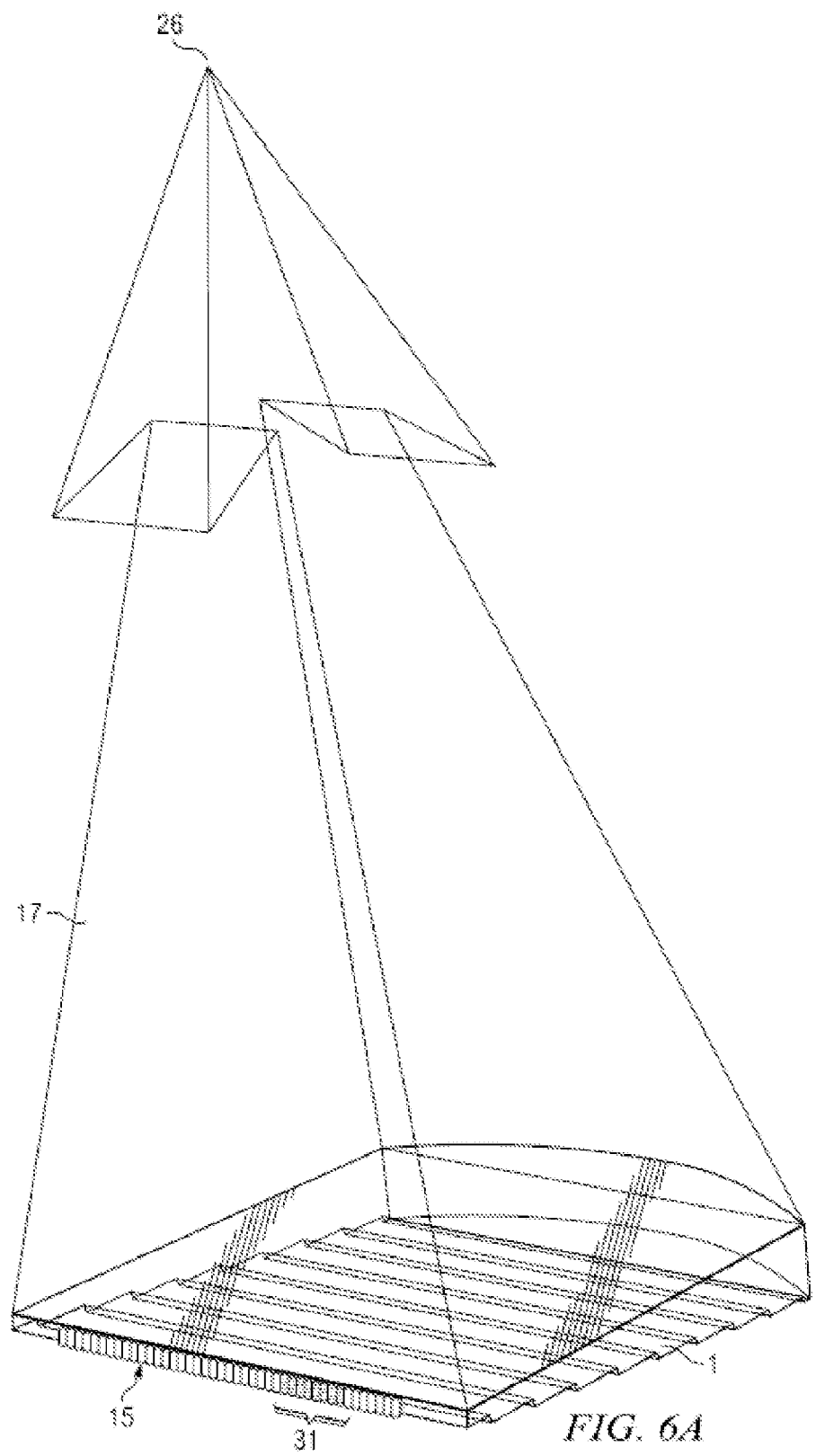
FIG. 6A is a schematic diagram illustrating one embodiment of the generation of a first viewing window in a time multiplexed directional display device, in accordance with the present disclosure.
Figure 6B:
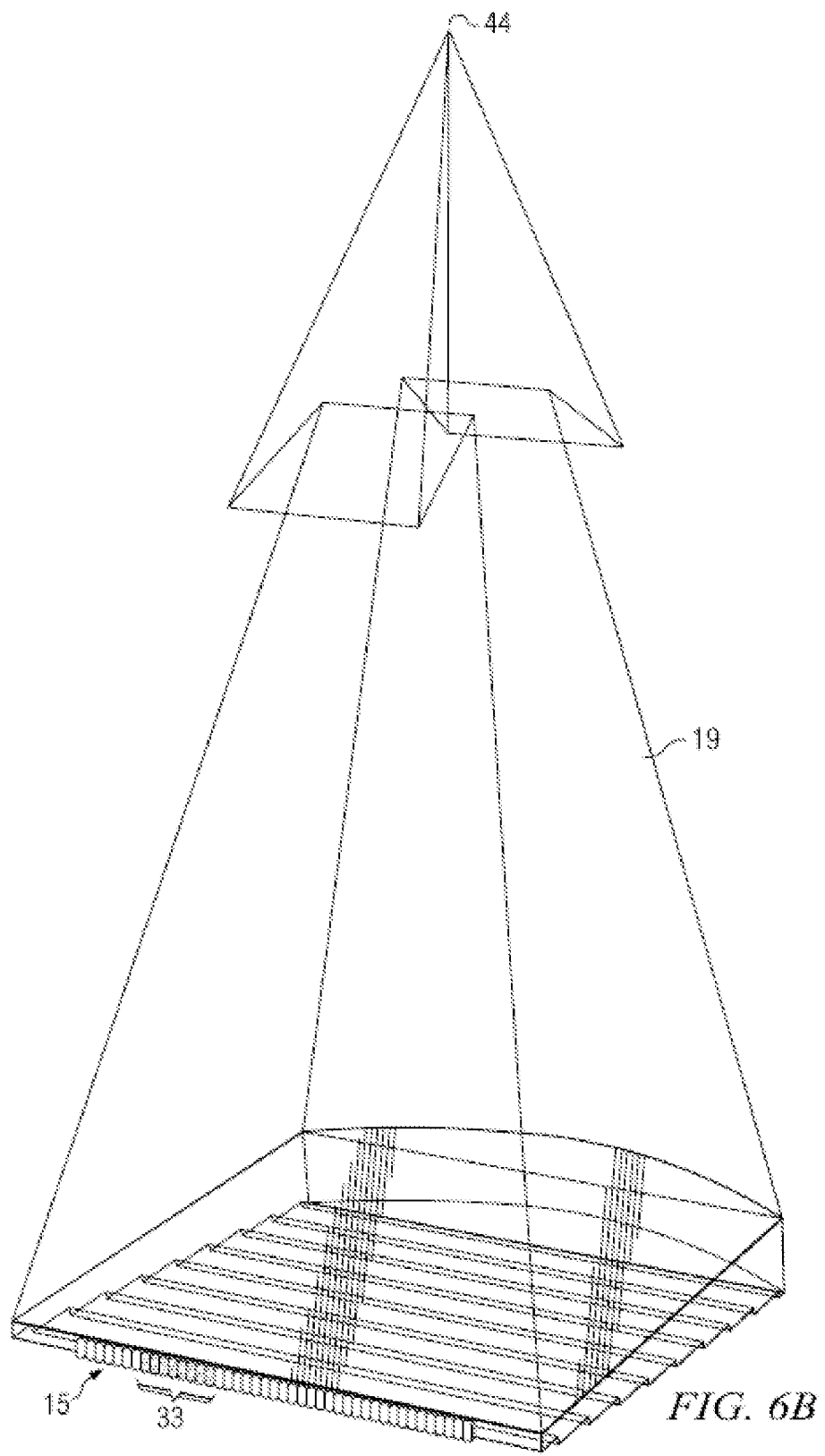
FIG. 6B is a schematic diagram illustrating another embodiment of the generation of a second viewing window in a time multiplexed directional display device in a second time slot, in accordance with the present disclosure.
Figure 6C:
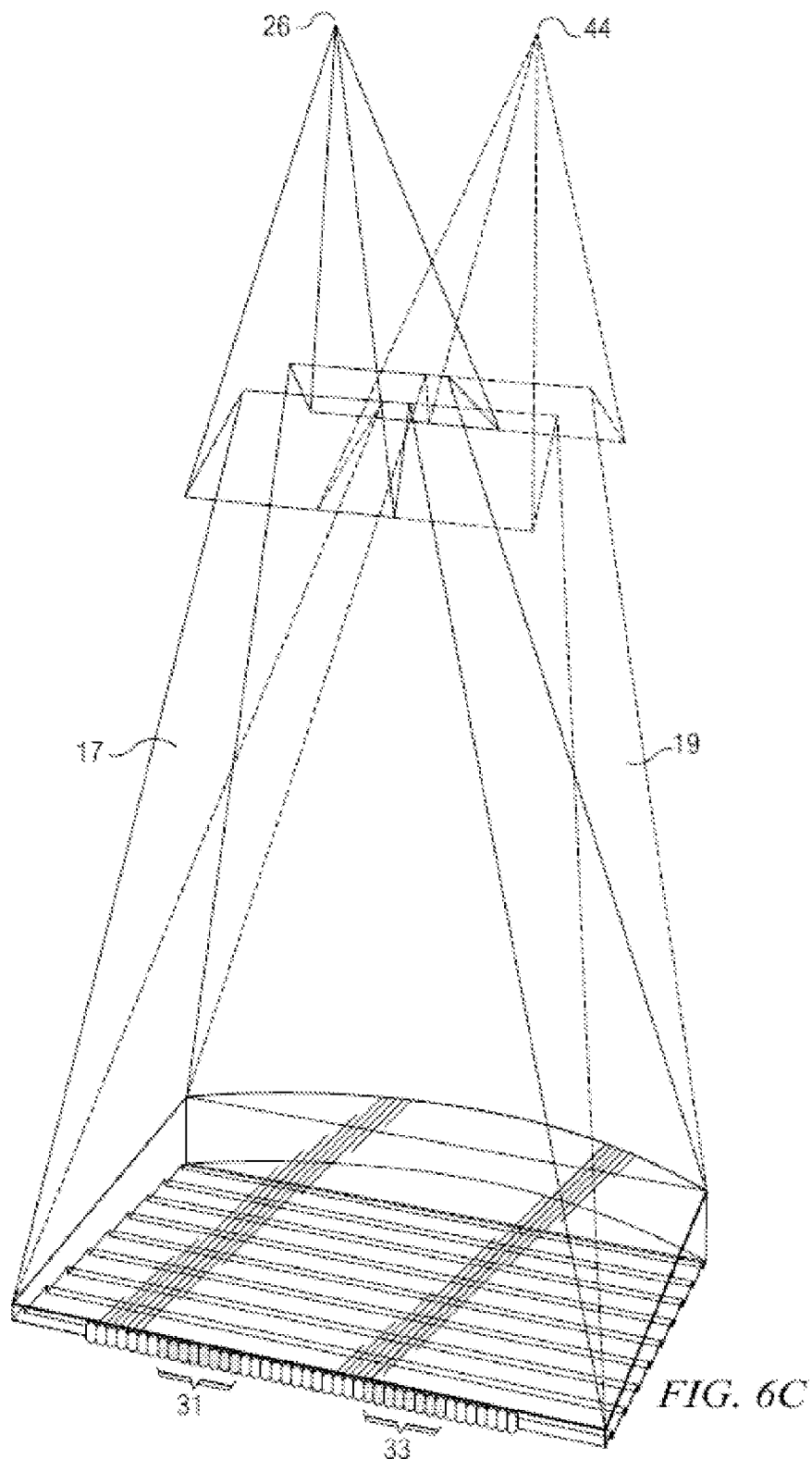
FIG. 6C is a schematic diagram illustrating another embodiment of the generation of a first and a second viewing window in a time multiplexed directional display device, in accordance with the present disclosure.

FIG. 6A is a schematic diagram illustrating one embodiment of the generation of a first viewing window in a time multiplexed imaging directional display device in a first time slot, FIG. 6B is a schematic diagram illustrating another embodiment of the generation of a second viewing window in a time multiplexed imaging directional backlight apparatus in a second time slot, and FIG. 6C is a schematic diagram illustrating another embodiment of the generation of a first and a second viewing window in a time multiplexed imaging directional display device. Further, FIG. 6A shows schematically the generation of viewing window 26 from stepped waveguide 1. Illuminator element group 31 in illuminator array 15 may provide a light cone 17 directed towards a viewing window 26 (that may comprise a single optical window 260 or an array of optical windows 260). FIG. 6B shows schematically the generation of viewing window 44. Illuminator element group 33 in illuminator array 15 may provide a light cone 19 directed towards viewing window 44 (that may comprise a single optical window 440 or an array of optical windows 440). In cooperation with a time multiplexed display, viewing windows 26 and 44 may be provided in sequence as shown in FIG. 6C. If the image on a spatial light modulator 48 (not shown in FIGS. 6A, 6B, 6C) is adjusted in correspondence with the light direction output, then an autostereoscopic image may be achieved for a suitably placed viewer. Similar operation can be achieved with all the imaging directional backlights described herein. Note that illuminator element groups 31, 33 each include one or more illumination elements from illumination elements 15a to 15n, where n is an integer greater than one.

Figure 7:
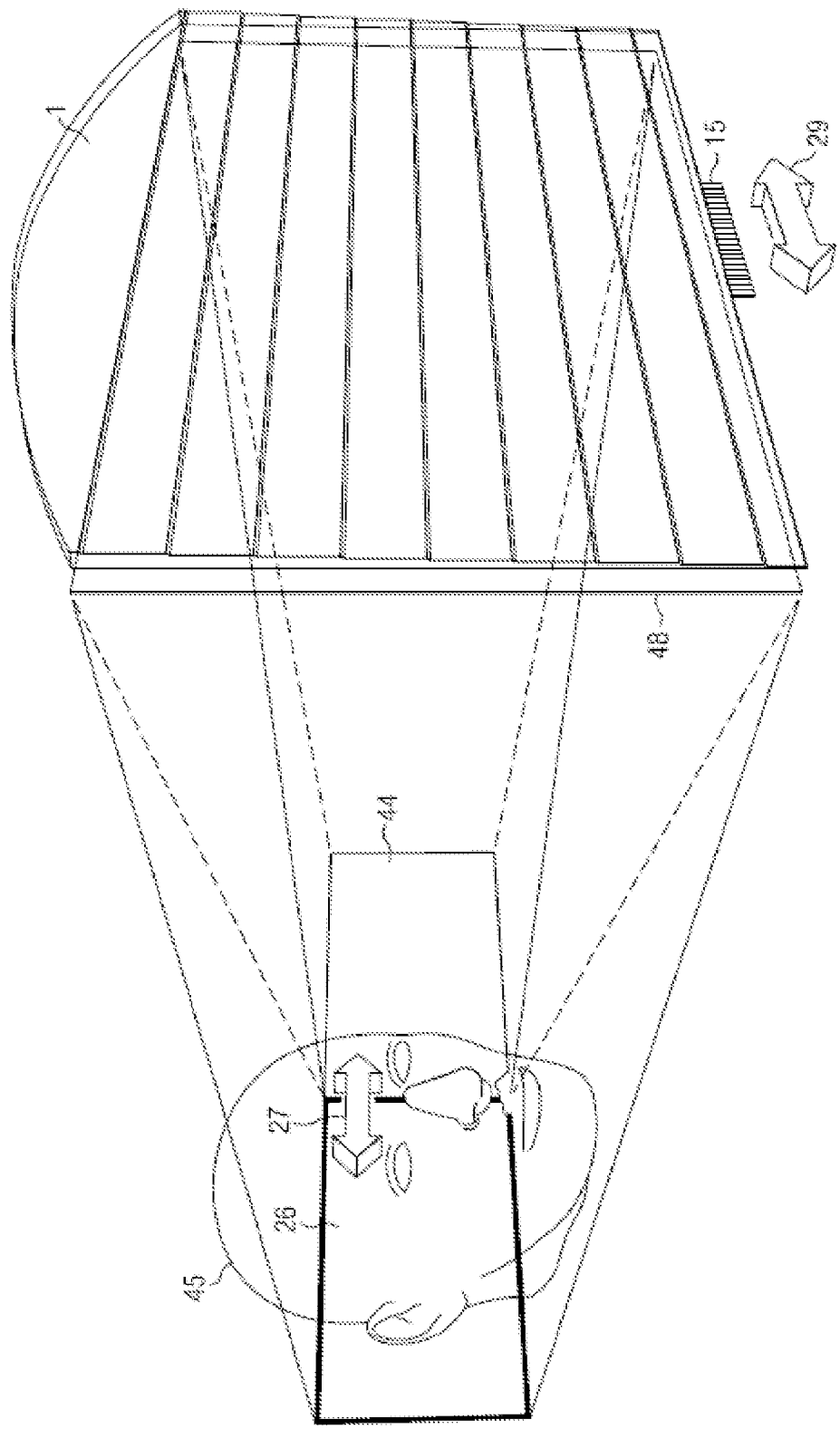
FIG. 7 is a schematic diagram illustrating an observer tracking autostereoscopic directional display device, in accordance with the present disclosure.

FIG. 7 is a schematic diagram illustrating one embodiment of an observer tracking autostereoscopic display apparatus including a time multiplexed directional display device. As shown in FIG. 7, selectively turning on and off illuminator elements 15a to 15n along axis 29 provides for directional control of viewing windows 26, 44. The head 45 position may be monitored with a camera, motion sensor, motion detector, or any other appropriate optical, mechanical or electrical means, and the appropriate illuminator elements of illuminator array 15 may be turned on and off to provide substantially independent images to each eye irrespective of the head 45 position. The head tracking system (or a second head tracking system) may provide monitoring of more than one head 45, 47 (head 47 not shown in FIG. 7) and may supply the same left and right eye images to each viewers' left and right eyes providing 3D to all viewers. Again similar operation can be achieved with all the imaging directional backlights described herein.

Figure 8:
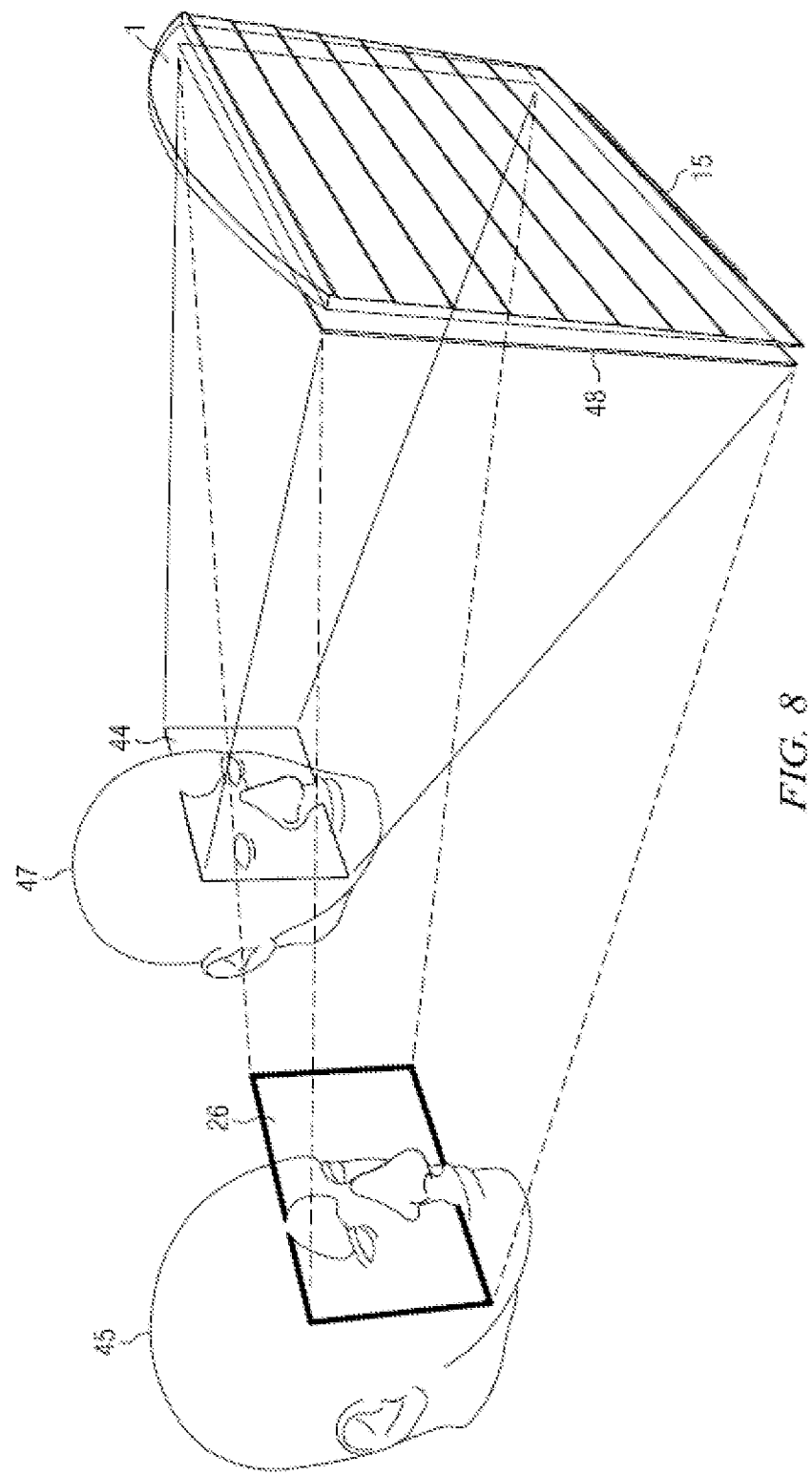
FIG. 8 is a schematic diagram illustrating a multi-viewer directional display device, in accordance with the present disclosure.

FIG. 8 is a schematic diagram illustrating one embodiment of a multi-viewer directional display device as an example including an imaging directional backlight. As shown in FIG. 8, at least two 2D images may be directed towards a pair of viewers 45, 47 so that each viewer may watch a different image on the spatial light modulator 48. The two 2D images of FIG. 8 may be generated in a similar manner as described with respect to FIG. 7 in that the two images would be displayed in sequence and in synchronization with sources whose light is directed toward the two viewers. One image is presented on the spatial light modulator 48 in a first phase, and a second image is presented on the spatial light modulator 48 in a second phase different from the first phase. In correspondence with the first and second phases, the output illumination is adjusted to provide first and second viewing windows 26, 44 respectively. An observer with both eyes in viewing window 26 will perceive a first image while an observer with both eyes in viewing window 44 will perceive a second image.

Figure 9:
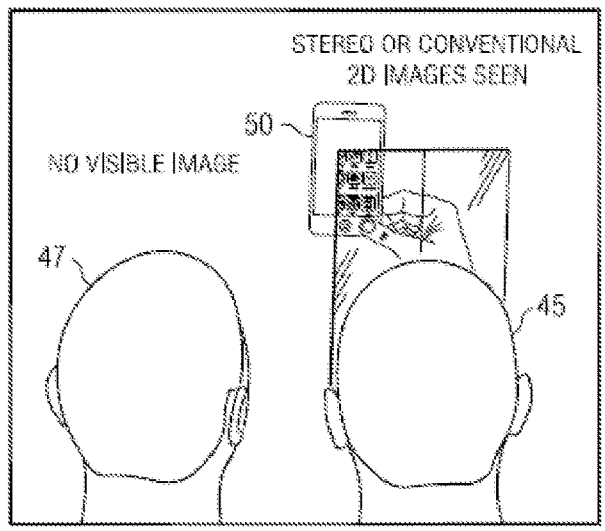
FIG. 9 is a schematic diagram illustrating a privacy directional display device, in accordance with the present disclosure.

FIG. 9 is a schematic diagram illustrating a privacy directional display device which includes an imaging directional backlight. 2D display systems may also utilize directional backlighting for security and efficiency purposes in which light may be primarily directed at the eyes of a first viewer 45 as shown in FIG. 9. Further, as illustrated in FIG. 9, although first viewer 45 may be able to view an image on device 50, light is not directed towards second viewer 47. Thus second viewer 47 is prevented from viewing an image on device 50. Each of the embodiments of the present disclosure may advantageously provide autostereoscopic, dual image or privacy display functions.

Figure 10:
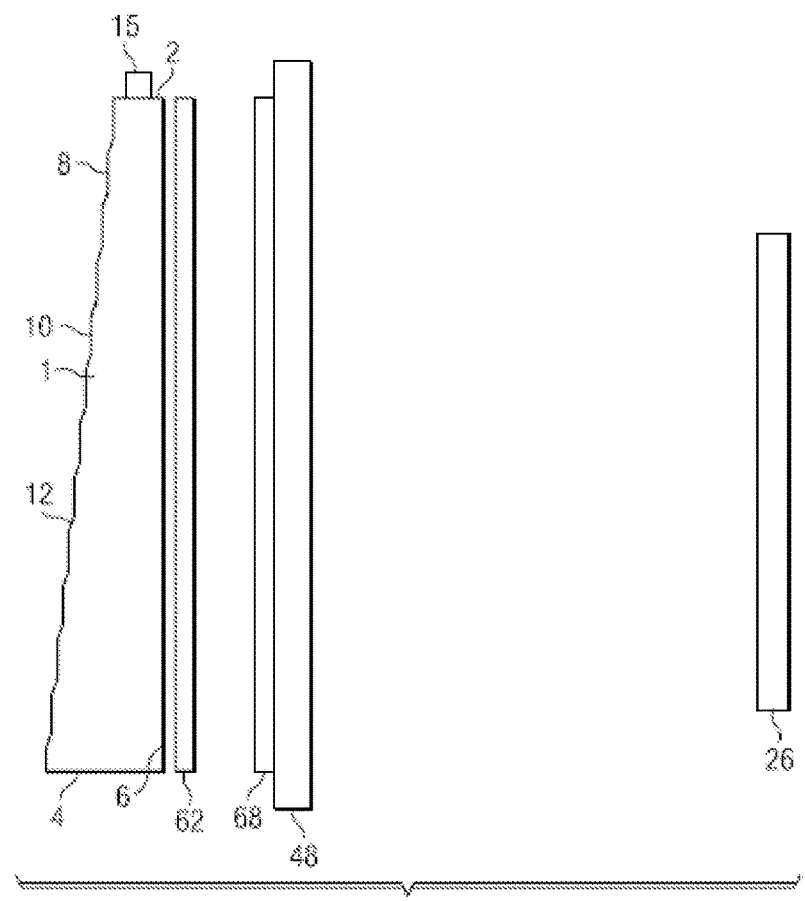
FIG. 10 is a schematic diagram illustrating in side view, the structure of a directional display device, in accordance with the present disclosure.

FIG. 10 is a schematic diagram illustrating in side view the structure of a time multiplexed directional display device as an example including an imaging directional backlight. Further, FIG. 10 shows in side view an autostereoscopic directional display device, which may include the stepped waveguide 1 and a Fresnel lens 62 arranged to provide the viewing window 26 for a substantially collimated output across the stepped waveguide 1 output surface. A vertical diffuser 68 may be arranged to extend the height of the viewing window 26 further and to achieve blurring in directions in the vertical direction (parallel to the x-axis) while minimizing blurring in directions in the lateral direction (y axis). The light may then be imaged through the spatial light modulator 48. The illuminator array 15 may include light emitting diodes (LEDs) that may, for example, be phosphor converted blue LEDs, or may be separate RGB LEDs. Alternatively, the illuminator elements in illuminator array 15 may include a uniform light source and spatial light modulator arranged to provide separate illumination regions. Alternatively the illuminator elements may include laser light source(s). The laser output may be directed onto a diffuser by means of scanning, for example, using a galvo or MEMS scanner. In one example, laser light may thus be used to provide the appropriate illuminator elements in illuminator array 15 to provide a substantially uniform light source with the appropriate output angle, and further to provide reduction in speckle. Alternatively, the illuminator array 15 may be an array of laser light emitting elements. Additionally in one example, the diffuser may be a wavelength converting phosphor, so that illumination may be at a different wavelength to the visible output light.

Thus, FIGS. 1 to 10 variously describe: a waveguide 1; a directional backlight comprising such a waveguide 1 and an illuminator array 15; and a directional display device including such a directional backlight and an SLM 48. As such the various features disclosed above with reference to FIGS. 1 to 10 may be combined in any combination.

Figure 11:
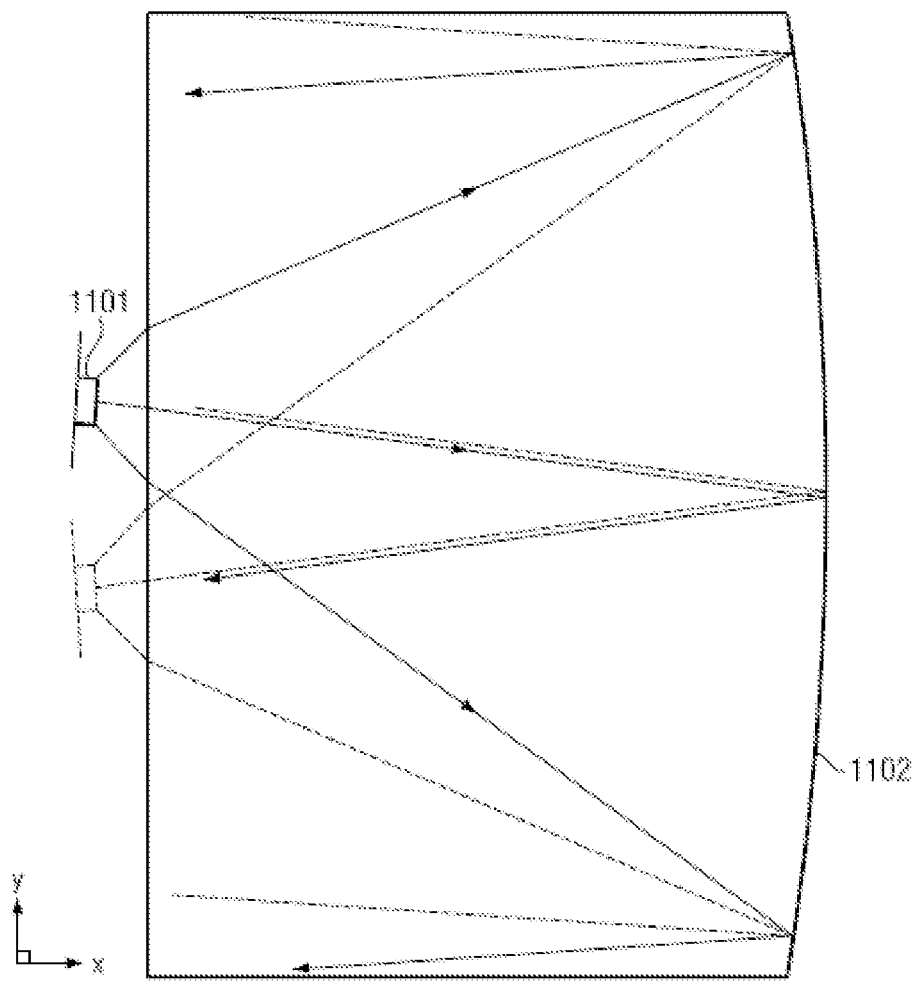
FIG. 11 is a schematic diagram illustrating a front view of a wedge type directional backlight, in accordance with the present disclosure.
Figure 12:
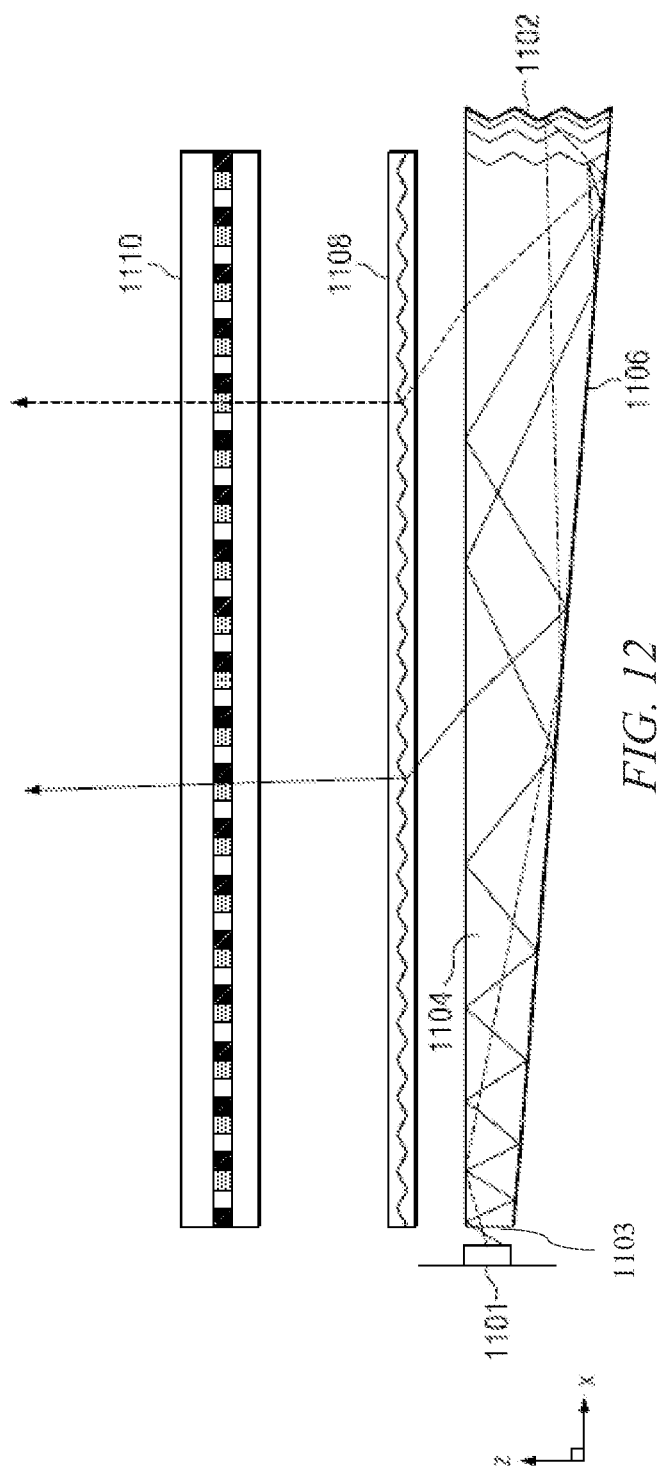
FIG. 12 is a schematic diagram illustrating a side view of a wedge type directional display device, in accordance with the present disclosure.

FIG. 11 is a schematic diagram illustrating a front view of another imaging directional backlight, as illustrated, a wedge type directional backlight, and FIG. 12 is a schematic diagram illustrating a side view of a similar wedge type directional display device. A wedge type directional backlight is generally discussed by U.S. Pat. No. 7,660,047 and entitled "Flat Panel Lens," which is herein incorporated by reference in its entirety. The structure may include a wedge type waveguide 1104 with a bottom surface which may be preferentially coated with a reflecting layer 1106 and with an end corrugated surface 1102, which may also be preferentially coated with a reflecting layer 1106.

In one embodiment, a directional display device may include a waveguide having an input end, first and second opposed guide surfaces for guiding light along the waveguide, and a reflective end facing the input end for reflecting light from the input light back through the waveguide. The directional display device may also include an array of light sources disposed at different input positions across the input end of the waveguide. The waveguide may be arranged to direct input light from the light sources as output light through the first guide surface after reflection from the reflective end into optical windows in output directions relative to the normal to the first guide surface and may be primarily dependent on the input positions. The directional display device may also include a transmissive spatial light modulator arranged to receive the output light from the first guide surface and arranged to modulate a first polarization component of the output light having a first polarization.

In one embodiment of a wedge type directional backlight, the first guide surface may be arranged to guide light by total internal reflection and the second guide surface may be substantially planar and inclined at an angle to reflect light in directions that break the total internal reflection for outputting light through the first guide surface. The wedge type directional backlight may be part of a directional display device. The directional display device may also include a deflection element extending across the first guide surface of the waveguide for deflecting light towards the normal to the spatial light modulator.

As shown in FIG. 12, light may enter the wedge type waveguide 1104 from local sources 1101 and the light may propagate in a first direction before reflecting off the end surface. Light may exit the wedge type waveguide 1104 while on its return path and may illuminate a display panel 1110. By way of comparison with an optical valve, a wedge type waveguide provides extraction by a taper that reduces the incidence angle of propagating light so that when the light is incident at the critical angle on an output surface, it may escape. Escaping light at the critical angle in the wedge type waveguide propagates substantially parallel to the surface until deflected by a redirection layer 1108 such as a prism array. Errors or dust on the wedge type waveguide output surface may change the critical angle, creating stray light and uniformity errors. Further, an imaging directional backlight that uses a mirror to fold the beam path in the wedge type directional backlight may employ a faceted mirror that biases the light cone directions in the wedge type waveguide. Such faceted mirrors are generally complex to fabricate and may result in illumination uniformity errors as well as stray light.

The wedge type directional backlight and optical valve further process light beams in different ways. In the wedge type waveguide, light input at an appropriate angle will output at a defined position on a major surface, but light rays will exit at substantially the same angle and substantially parallel to the major surface. By comparison, light input to a stepped waveguide of an optical valve at a certain angle may output from points across the first side, with output angle determined by input angle. Advantageously, the stepped waveguide of the optical valve may not require further light re-direction films to extract light towards an observer and angular non-uniformities of input may not provide non-uniformities across the display surface.

However, in the present disclosure, in general a wedge type waveguide such as wedge type waveguide 1104 may be used in a directional backlight, and may replace the stepped waveguide 1 in the various structures shown in FIGS. 1 to 10 described above and in the structures described below.

There follows a description of some directional display apparatuses including a directional display device and a control system, wherein the directional display device includes a directional backlight including a waveguide and an SLM. In the following description, the waveguides, directional backlights and directional display devices are based on and incorporate the structures of FIGS. 1 to 10 above, but could equally be adapted to replace the stepped waveguide 1 by a wedge type waveguide as described above. Except for the modifications and/or additional features which will now be described, the above description applies equally to the following waveguides, directional backlights and display devices, but for brevity will not be repeated.

Figure 13:
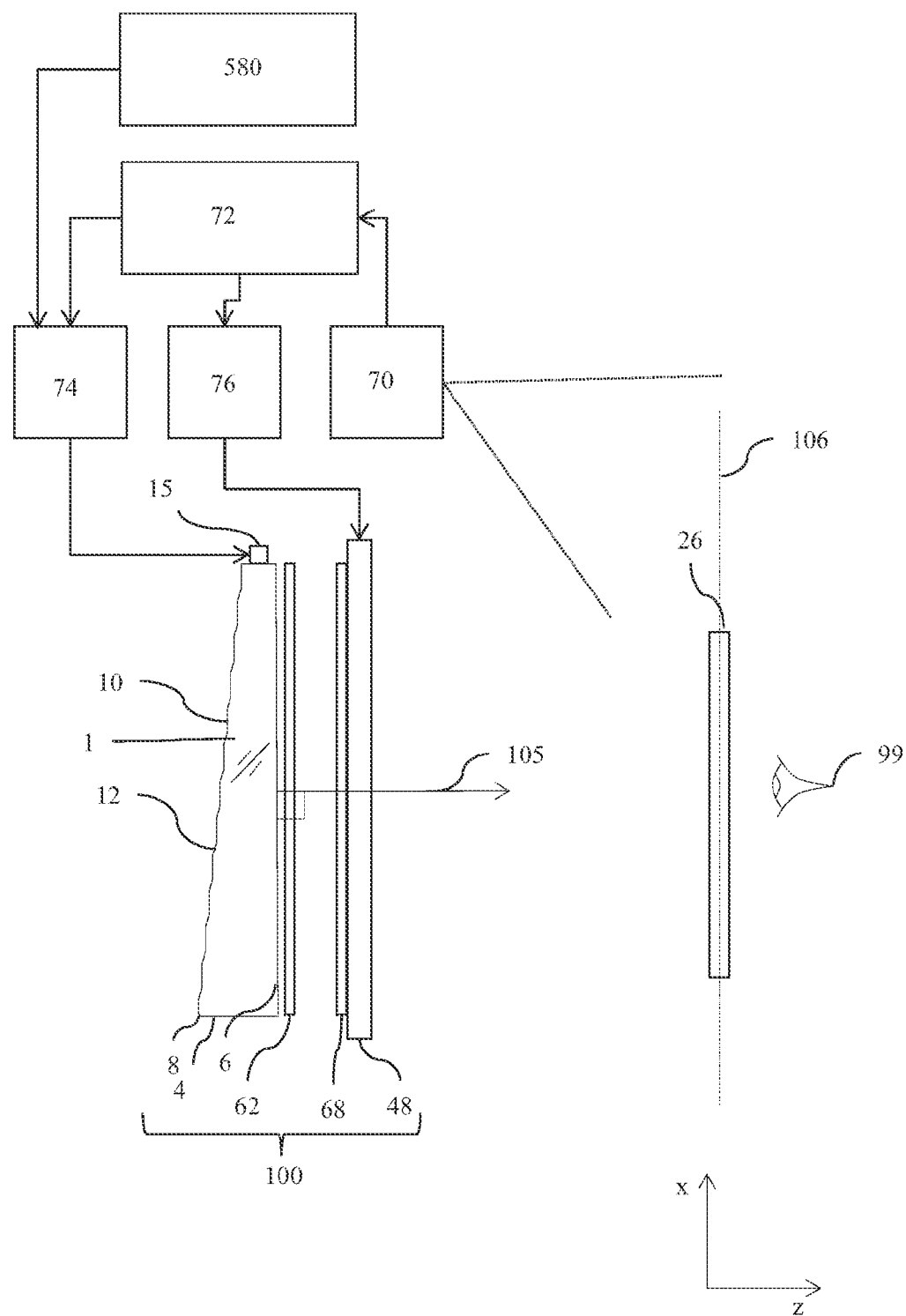
FIG. 13 is a schematic diagram illustrating a control system for an observer tracking directional display apparatus, in accordance with the present disclosure.

FIG. 13 is a schematic diagram illustrating a directional display apparatus including a display device 100 and a control system. The arrangement and operation of the control system will now be described and may be applied, with changes as necessary, to each of the display devices disclosed herein.

The directional display device 100 includes a directional backlight that includes waveguide 1 and an array 15 of illuminator elements 15n arranged as described above. The control system is arranged to selectively operate the illumination elements 15a-15n to direct light into selectable optical windows.

The waveguide 1 is arranged as described above. The reflective end 4 converges the reflected light. A Fresnel lens 62 may be arranged to cooperate with reflective end 4 to achieve viewing windows 26 at a window plane 106 observed by an observer 99. A transmissive spatial light modulator (SLM) 48 may be arranged to receive the light from the directional backlight. Further a diffuser 68 may be provided to substantially remove Moiré beating between the waveguide 1 and pixels of the SLM 48 as well as the Fresnel lens 62.

The control system may include a sensor system arranged to detect the position of the observer 99 relative to the display device 100. The sensor system includes a position sensor 70, such as a camera, and a head position measurement system 72 that may for example include a computer vision image processing system. The control system may further include an illumination controller 74 and an image controller 76 that are both supplied with the detected position of the observer supplied from the head position measurement system 72. The illumination controller 74 supplies drive signals to the illuminator elements 15n. By controlling the drive signals, the illumination controller 74 selectively operates the illuminator elements 15n to direct light to into the viewing windows 26 in cooperation with waveguide 1. The illumination controller 74 selects the illuminator elements 15n to be operated in dependence on the position of the observer detected by the head position measurement system 72, so that the viewing windows 26 into which light is directed are in positions corresponding to the left and right eyes of the observer 99. In this manner, the lateral output directionality of the waveguide 1 corresponds with the observer position.

The illumination controller 74 may be arranged to vary the drive signals supplied to respective illuminator element 15 to control the luminous flux of the light emitted by the respective light sources of the array 15, which may be referred to as the grey level of light. The luminous flux of a light source is a measure of the optical power emitted by the light source, measured in lumens.

Control of the luminous flux may be effected by any suitable drive scheme including, without limitation, voltage modulation, current modulation, pulse width modulation, control of a spatial light modulator arranged between a light source and the input end 2, or other known greyscale drive scheme. Further the luminous flux emitted by each illuminator element 15n may be varied by altering the current flowing in each addressable device, or by a pulse width modulation scheme where the length of one or more pulses is changed in order to vary the brightness perceived by the observer due to the persistence of vision. It is also possible to combine these two effects to achieve the brightness control desired.

The image controller 76 controls the SLM 48 to display images. To provide an autostereoscopic display, the image controller 76 and the illumination controller 74 may operate as follows. The image controller 76 controls the SLM 48 to display temporally multiplexed left and right eye images. The illumination controller 74 operate the light sources 15 to direct light into viewing windows in positions corresponding to the left and right eyes of an observer synchronously with the display of left and right eye images. The position of the viewing windows may primarily depend on the detected position of the observer. In this manner, an autostereoscopic effect is achieved using a time division multiplexing technique.

As will now be described, a luminous flux controller 580, operating under user or automatic control, may control the illumination controller 74 to implement a method of controlling the illuminator elements 15n of the directional backlight to output light with luminous fluxes, scaled inversely by the width associated with the respective illuminator elements 15n in the lateral direction, that varies across the array of illuminator elements 15.

The quantity of luminous flux that is varied across the array 15 is the luminous flux of an individual illuminator 15 that is scaled. The scaling is inverse with the width associated with the respective illuminator elements 15n in the lateral direction. The purpose of that scaling is to take account of any variation in the pitch of the illuminator elements 15n across the array 15. Thus, in the simple case that the illuminator elements 15n are disposed at different input positions with a constant pitch in the lateral direction across the input end 4 of the waveguide 1, then the scaled luminous fluxes are simply the actual luminous fluxes of the illuminator elements 15n, because the scaling is constant. In cases where the pitch of the illuminator elements 15n in the lateral direction is variable, then the scaled luminous fluxes take into account that varying pitch.

The scaled luminous fluxes may therefore may take into account gaps between the light sources and non-uniformities across luminous flux of the respective outputs. Thus, the width associated with an illuminator element 15n may be taken as the pitch of the array illuminator elements 15n at the illuminator element 15n being considered. Similarly the width associated with an illuminator element 15n may be taken as the width between the mid-points of the gaps between the illuminator elements 15n. The scaled luminous flux is described further in reference to FIG. 53.

Herein, the scaled luminous fluxes are considered, because in the display device 100 this quantity affects the luminous intensity of the output light as described further below. The luminous intensity of the display device is a measure of the power emitted by the display device in a particular direction per unit solid angle. Therefore the scaled luminous fluxes are controlled to provide a desired luminous intensity.

This is advantageous because the brightness of the display device 100 as perceived by the observer 99 is elicited by the luminance which is a photometric measure of the luminous intensity per unit area of light traveling in a given direction. Thus variation of the luminous flux linear density allows the perceived brightness to be controlled, for example allowing the perceived brightness (luminance) to be varied for different positions of the observer 99 and/or power consumption to be minimized for a given perceived brightness.

The luminous flux under consideration is the total luminous flux emitted. This may be derived by integrating the luminous flux emitted by the illuminator elements 15n over the direction perpendicular to the lateral direction.

In some embodiments, the luminous flux controller 580 may control the luminous flux to vary across the array of illuminator elements 15n in a luminous flux distribution that is fixed with respect the position in the lateral direction.

In other embodiments, the luminous flux controller 580 may control the luminous flux to vary across the array of illuminator elements 15n in dependence on the detected position of the observer 99, as detected by the sensor system.

Some specific ways in which the luminous flux controller 580 may control the luminous flux to vary across the array of illuminator elements 15n will now be described.

There will first be described some embodiments in which the luminous flux controller 580 controls the scaled luminous fluxes to vary across the array of illuminator elements 15n in a luminous flux distribution that is fixed with respect the position in the lateral direction. This has particular advantage when the display device 100 is operated to display a 2D image viewable from a wide angle compared to a directional mode of operation such as an autostereoscopic mode. In that case, all the illuminator elements 15n may simultaneously be operated, in which case the sensor system might be unused or omitted.

Alternatively, the illumination controller 74 may operate the light sources 15 to direct light into a single viewing window visible by both eyes in dependence on the detected position of the observer with the SLM 48 arranged to operate in a single phase for 2D viewing for privacy and high efficiency modes of operation. Such a viewing window is sufficiently wide to be seen by both the left and right eyes of an observer. Alternatively, the fixed luminous flux distribution may also be applied when the display device is operated to provide an autostereoscopic 3D display.

Figure 14A:
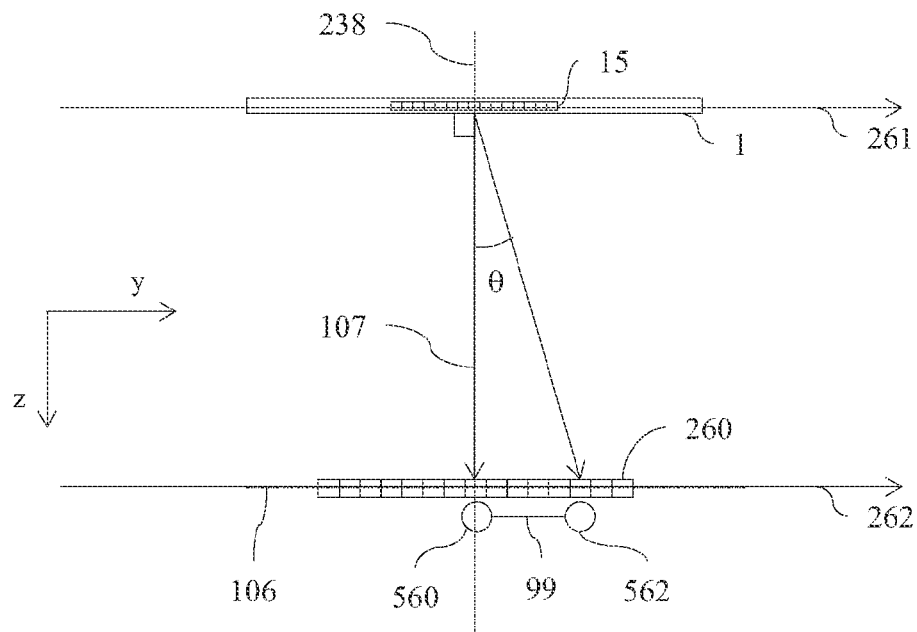
FIG. 14A is a schematic diagram illustrating a top view of a directional display including a directional backlight, in accordance with the present disclosure.

FIG. 14A is a schematic diagram illustrating a top view of a directional backlight that includes waveguide 1 and an array of illuminator elements 15n that provide an array of optical windows 260 in a window plane 106, the output direction and hence nominal lateral position in the window plane of each optical window 260 being dependant on the lateral position of the respective illuminator in the array 15. Thus at angle θ corresponding to a position 262 in the lateral (y-axis) direction across the window plane 106, the luminous intensity of the display seen from the optical windows 260 may vary with position of an observer 99 (with right and left eye positions 560, 562 as indicated). It would be desirable to achieve a variation of display luminous intensity that is Lambertian so that the display appears to equally bright to each eye of observer 99; otherwise stated the luminance of the display is substantially the same within the range of lateral viewing freedom. It would alternatively be desirable to achieve a variation of display luminous intensity that achieves a reduced luminance for off-axis viewing positions to achieve power saving advantages.

The transfer function between each element of the array 15 of illuminator elements 15n and each optical window 260 of the array of optical windows will comprise the effects of scatter, diffusion, diffraction and imaging properties of the optical components arranged between the array 15 and window plane 106. Thus the optical windows 260 are not perfect images of the illuminator elements 15n. However the lateral position 262 of the optical windows 260 will typically be directly related to the lateral position 261 of the illuminator elements 15n in the array 15.

Thus, the luminous flux controller 580 may control the scaled luminous fluxes to vary across the array of illuminator elements 15n in a luminous flux distribution with the input position of the illuminator element 15 in the lateral direction, that produces a desired luminance intensity distribution that represents the variation of the luminous intensity of the output light with the angle of the output directions, examples of which will now be described.

Figure 14B:
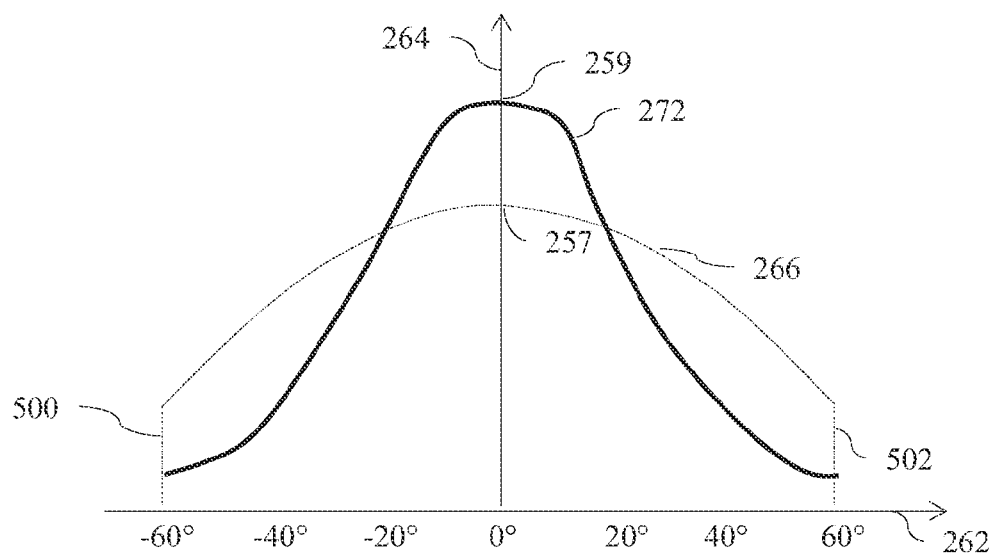
FIG. 14B is a schematic diagram illustrating a graph of optical window luminous intensity against viewing position in the window plane, in accordance with the present disclosure.

FIG. 14B is a schematic diagram illustrating a graph of the luminous intensity 264 of the output light against viewing position 262 in the window plane 106 corresponding to the angle θ of the output directions. Luminous intensity distribution 266 is Lambertian, having a luminous intensity that varies as the cosine of viewing angle θ and so the luminous intensity across the display may vary, while the observed luminance of the display is constant from viewing positions 500 to 502 within the viewing windows.

In the present embodiments, a Lambertian emitter achieves the same apparent luminance of a surface independent of the observer's angle of view. Thus the surface has an isotropic luminance (measured in candela per meter$^2$, or lumen per steradian per meter$^2$) and the variation of luminous intensity (measured in candela, or lumen per steradian) 264 obeys Lambert's cosine law wherein luminous intensity observed from an ideal diffuse radiator is directly proportional to the cosine of the angle θ between the observer's line of sight and the surface normal. In the present embodiments, Lambertian is used to describe the emission of a display over a defined angular range, for example the total width of optical windows of the display. Thus at positions in the window plane outside the width of the optical windows, the luminous intensity distribution may behave in a non-Lambertian manner.

The luminous intensity may typically be considered for a point on the backlight, for example the point corresponding to the centre of the SLM 48. The luminance (luminous intensity per unit area) of the display system may vary across the display area due to non-uniformities of output and will further vary with subtended viewing angle of the respective unit area.

FIG. 14B further shows a luminous intensity distribution for a luminous intensity distribution 272 having a gain greater than one. In particular, the luminous intensity distribution 272 has a maximum luminous intensity, corresponding to the global maximum of the luminous flux distribution, that is greater than the luminous intensity distribution 266 that is Lambertian, wherein the total power of the two luminous intensity distributions 266 and 272 is the same over all output directions 500 to 502. Thus the peak luminous intensity is greater for on-axis positions, and falls at a faster rate than the luminous intensity distribution 266 that is Lambertian. Thus, the display luminance falls for off-axis viewing positions. The ratio of luminance of distribution 272 to peak luminance of distribution 266 is often referred to as the gain of a display system.

The luminous flux controller 580 may control the scaled luminous fluxes to vary across the array of illuminator elements 15n in a luminous flux distribution that provides the output light with a luminous intensity distribution 266 that is Lambertian or with a luminous intensity distribution 272 having a gain greater than one, as follows.

Figure 15A:
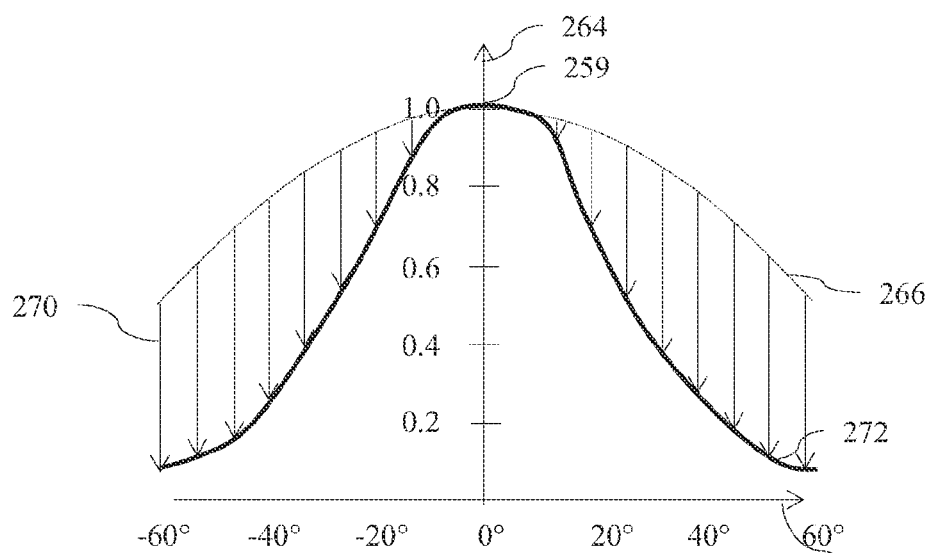
FIG. 15A is a schematic diagram illustrating a graph of optical window luminous intensity against viewing position in the window plane and a method to adjust luminous fluxes of light sources in the array, in accordance with the present disclosure.

FIG. 15A is a schematic diagram illustrating a graph of luminous intensity of the output light against viewing position 262 in the window plane 106 corresponding to the lateral angle θ of the output direction with respect to the optical axis 238, as well as a method to adjust the scaled luminous fluxes of array 15. The luminous intensity distributions 266 and 272 are shown but with their peak luminous intensities matched so that the on-axis luminances are matched and the display appears equally bright for on-axis viewing positions.

In one embodiment, the luminous intensity distribution 266 that is Lambertian may be achieved by controlling all of the illuminator elements of array 15 to have substantially the same scaled luminous flux output.

To achieve the luminous intensity distribution 272, the luminous intensity for off-axis positions may be reduced in comparison to the distribution 266, as indicated by arrows 270. This may be achieved by controlling the scaled luminous fluxes of the illuminator elements to vary across the array 15 in luminous flux distribution as follows.

Figure 15B:
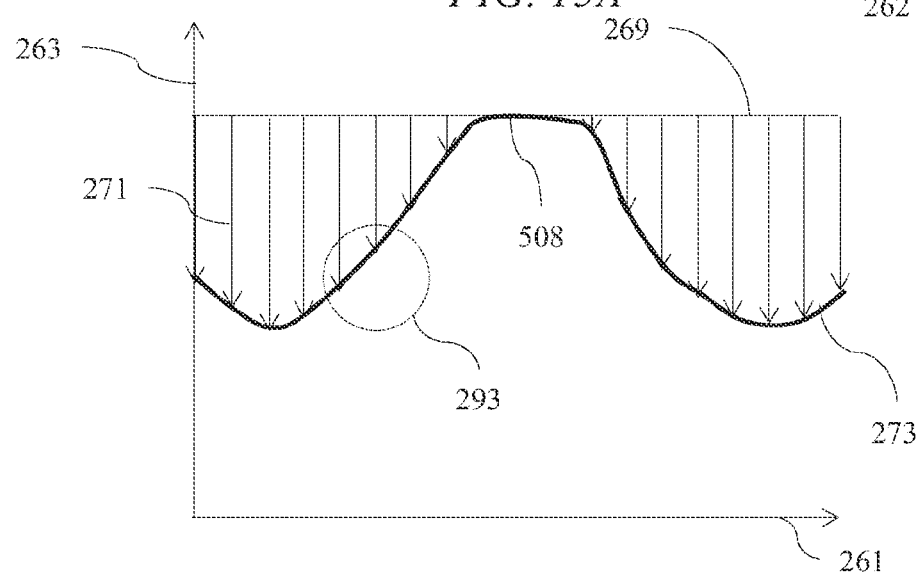
FIG. 15B is a schematic diagram illustrating a graph of luminous flux distribution for an array of light sources and method to adjust luminous fluxes of light sources in the array, in accordance with the present disclosure.

FIG. 15B is a schematic diagram illustrating a graph of luminous flux distribution for an array of illuminator elements and method to adjust the scaled luminous fluxes of the array 15. Thus the scaled luminous fluxes 263 may be plotted against the lateral position 261 in the lateral direction across the input end 2 of the waveguide 1. In a construction of the waveguide 1 in which the light extraction feature 12 are mirrored, the scaled luminous fluxes 263 has a constant luminous flux distribution 269 to provide the luminous intensity distribution 266 that is Lambertian. Arrows 271 shows the drop in scaled luminous flux, compared to constant luminous flux distribution 269, for respective light sources corresponding to arrow 270 at respective optical window position 262, to reach a non-linear luminous flux distribution 273 that provides the luminous intensity distribution 272 having a gain greater than one. Thus, the luminous flux distribution 273 has a global maximum 508 of luminous flux and reduces on either side of the global maximum 508. The global maximum 508 occurs in respect of the illuminator elements aligned with the optical axis of the waveguide 1. In one embodiment, illuminator elements of the array 15 may be controlled so that their scaled luminous fluxes vary in accordance with the non-linear luminous flux distribution 273, thereby providing the display device 100 with the luminous intensity distribution 272 having a gain greater than one. That is, the luminous intensity 264 of the output light varies with the angle 262 of the output directions in an actual luminous intensity distribution 272 that is greater than a notional luminous intensity distribution 266 that is Lambertian and has the same total luminous intensity over all output directions as the actual luminous intensity distribution 272.

Figure 15C:
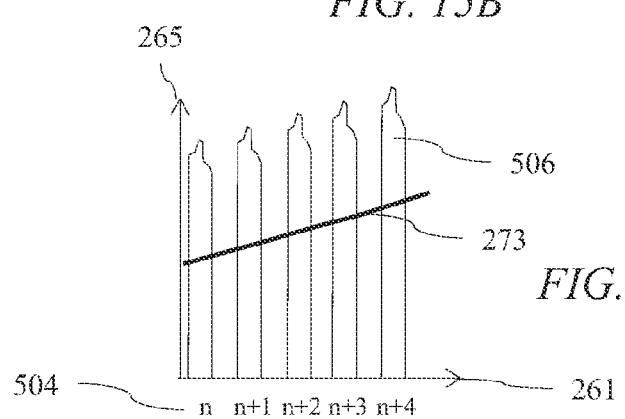
FIG. 15C is a schematic diagram illustrating a detail of FIG. 15B, in accordance with the present disclosure.

FIG. 15C is a schematic diagram illustrating a detail of FIG. 15B, but with the y-axis plotting the actual luminous flux 265 integrated over the direction perpendicular to the lateral direction. As mentioned above, the actual luminous flux 265 at a given lateral position 261 across the input end 2 is the integral of light captured by the waveguide in a slice perpendicular to the lateral direction, i.e. parallel to the z-axis. Assuming that all of the light from the respective source is captured by the waveguide 1, the actual luminous flux 265 is the same as the integrated flux output of a slice of the light source in the z-axis. As shown in FIG. 15C for detail 293 of FIG. 15B, the light sources of the array 15 will typically have substantially non-uniform distribution of actual luminous flux 265 in the lateral direction (y-axis)due to gaps between light sources and structure within the light sources. For example, as will be described in FIGS. 50 and 51 the light source may comprise an LED with blue and yellow light emitting regions. Different actual luminous flux 265 and chromaticity outputs in the lateral direction when integrated across the thickness of the input end 2 may thus be achieved. For the present purposes, the light sources may be arranged in a stepwise manner so that light source number 504 is related to a given luminous flux 506 providing the scaled luminous fluxes with the luminous flux distribution 273. Thus luminous flux distribution 273, may be provided by the actual luminous flux 265 averaged over the width in the lateral direction associated with a single illuminator element 15n. In operation, the illuminator elements 15n are not imaged precisely in the window plane 106 so that the viewing windows may include laterally diffused overlapping optical windows. Thus the transformation from luminous flux distribution 273 to luminous intensity distribution 272 may further take into account blurring between adjacent optical windows 260 within the viewing windows 26, and may be arranged to achieve the desired luminous intensity distribution 262.

Advantageously the output luminance of the display may be maintained for on-axis viewing positions, and reduced for off-axis viewing positions. Thus the power consumption of the display may be reduced for less advantageous viewing positions, improving display efficiency, battery charge lifetime and reducing display cost.

Figure 15D:
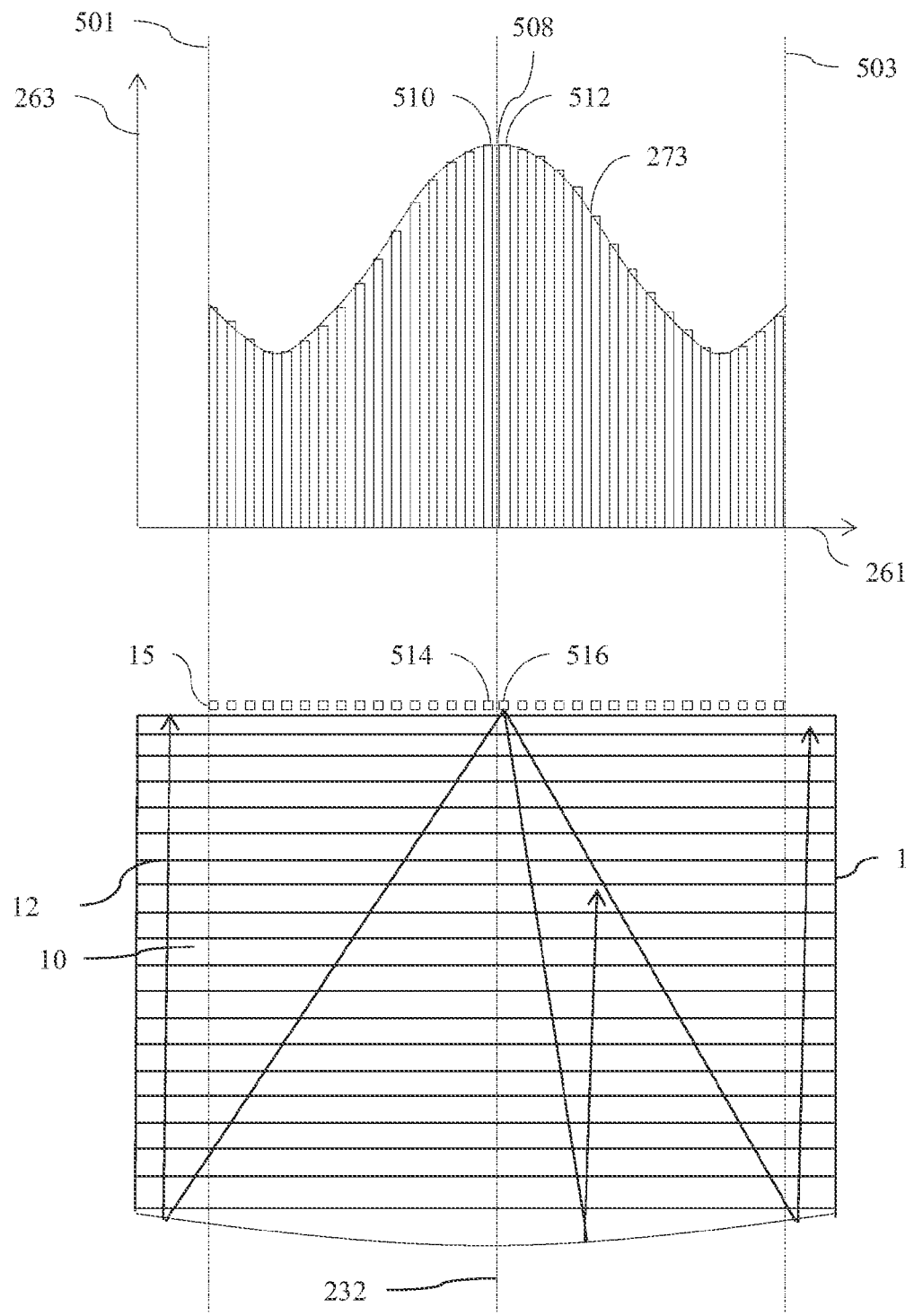
FIG. 15D is a schematic diagram illustrating a graph of luminous flux distribution and a front view of a directional backlight aligned with the luminous flux distribution, in accordance with the present disclosure.

FIG. 15D is a schematic diagram illustrating a graph of luminous flux distribution and a front view of a directional backlight aligned with the luminous flux distribution. For illustrative convenience, luminous flux distribution 273 of the scaled luminous fluxes 263 with lateral position 261 is shown aligned with respective illuminator elements of array 15. Thus illuminator elements 514, 516 have respective scaled luminous fluxes 510, 512, including the global maximum 508 of distribution 273 that is aligned with the optical axis 232 of the waveguide 1. The distribution 273 is provided between positions 261 of 501, 503. Thus the global maximum of the flux distribution may be in respect of the illuminator elements aligned with the optical axis 232 of the waveguide. The global maximum of the flux distribution may be in respect of the illuminator elements 514, 516 aligned with the optical axis 232 of the waveguide 1. Advantageously, the peak luminous intensity of output is provided on-axis with respect to the display normal 107 that may be aligned with the optical axis 232. Thus the luminance is greatest for the on-axis position for displays with gains greater than one. The on-axis position is typically the desirable viewing position, particularly for mobile displays and so the display will look brightest for the optimum viewing conditions while achieving reduced power consumption for off-axis viewing positions.

The global maximum 508 of the luminous flux distribution may be in respect of the illuminator elements 514, 516 aligned with the optical axis 232 of the waveguide 1. Such an arrangement may achieve a global maximum 259 of luminous intensity 264, which may be for respective optical windows that are aligned with the optical axis 232 of the waveguide 1.

The embodiment of FIG. 15D illustrates one arrangement of illuminator elements for wide angle 2D viewing; that is the illuminator elements may operate continuously or in a single phase and the spatial light modulator 48 may include a single 2D image. As all the illuminator elements 15n may simultaneously be operated, the sensor system might be unused or omitted. It would be further desirable to provide the power saving advantages of increased display gain in autostereoscopic mode for off-axis viewing positions.

Figure 15E:
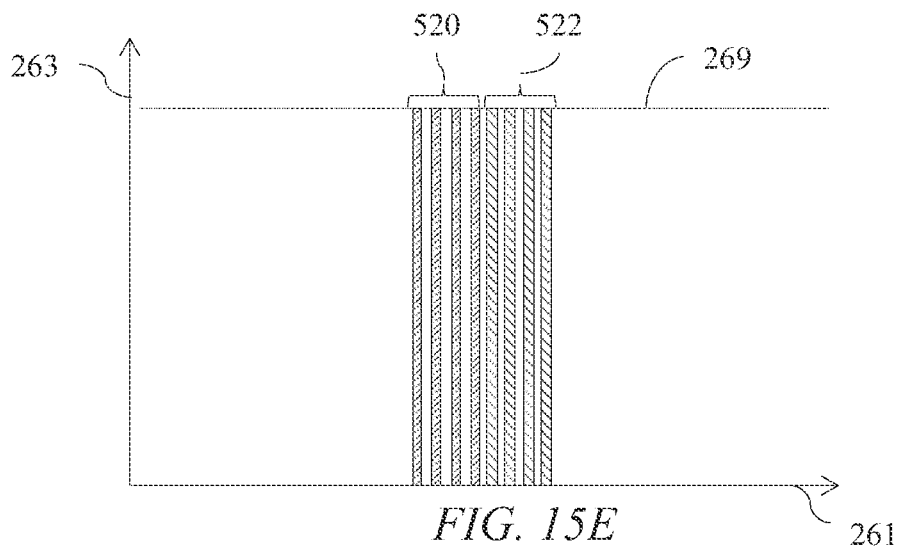
FIG. 15E is a schematic diagram illustrating a graph of luminous flux distribution for an autostereoscopic Lambertian display system, in accordance with the present disclosure.
Figure 15F:
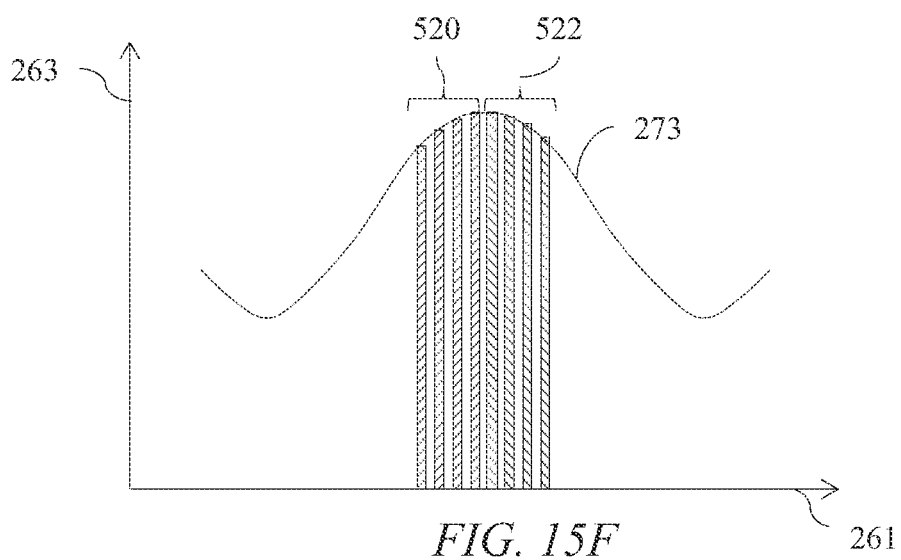
FIG. 15F is a schematic diagram illustrating a graph of luminous flux distribution for an autostereoscopic display system with a gain of greater than one and an on-axis viewing position, in accordance with the present disclosure.

FIGS. 15E to 15F are schematic diagrams illustrating a graph of luminous flux distribution for an autostereoscopic Lambertian display system. In this case, the scaled luminous fluxes vary across the array of illuminator elements 15n in a luminous flux distribution that is fixed with respect the position in the lateral direction, but the display device is operated to provide an autostereoscopic 3D display as described above by means of the SLM 48 displaying temporally multiplexed left and right eye images and light being directed into viewing windows in positions corresponding to the left and right eyes of an observer synchronously with the display of left and right eye images.

FIG. 15E illustrates an example in which a constant luminous flux distribution 269 is used to provide a luminous intensity distribution 266 that is Lambertian as shown in FIG. 14B. Viewing windows 26 may be formed from illumination of illuminator elements in a sub-array 520 for a left eye phase and a sub-array 522 in a right eye phase. As the eyes of observer 99 move off-axis, then the scaled luminous fluxes may have a constant value and the display may maintain a Lambertian appearance with viewing angle. Advantageously the number of illuminator elements illuminated is much reduced compared to the arrangement of FIG. 15D. The luminance for each eye will be substantially constant, reducing the appearance of depth errors in autostereoscopic viewing and increasing viewer comfort.

Figure 15G:
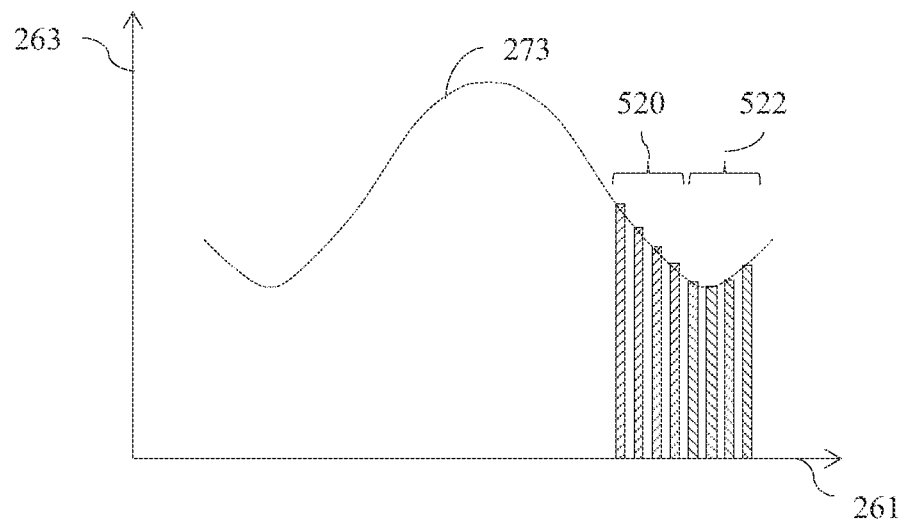
FIG. 15G is a schematic diagram illustrating a graph of luminous flux distribution for an autostereoscopic display system with a gain of greater than one and an off-axis viewing position, in accordance with the present disclosure.

FIGS. 15F and 15G illustrate an example in which a non-linear luminous flux distribution 273 is used to provide a luminous intensity distribution 272 having a gain greater than one. Thus the illuminator elements may be controlled to output light with scaled luminous fluxes 263 that vary across the illuminator elements in dependence on the detected position of the observer 99. For example FIG. 15F illustrates the case that the detected position of the observer is aligned with the optical axis and FIG. 15F illustrates the case that the detected position of the observer is offset. Sub-arrays 520, 522 of illuminator elements for the left and right eyes are selectively operated, changing with the detected position of the observer. The sub-arrays 520, 522 of illuminator elements have varying luminous intensity across their width to achieve the gain. Thus the illuminator elements may be controlled to output light with scaled luminous fluxes 263 that vary across the illuminator elements in dependence on the detected position of the observer 99 in a manner that produces a luminous intensity 264 of the output light that varies with the angle 262 of the output light in the luminous intensity distribution 272 having a gain greater than one. Advantageously, the power consumption of the array 15 of illuminator elements is reduced compared to the arrangement of FIG. 15E, since not all the illuminator elements are operated at any one time.

Advantageously off-axis power consumption may be reduced compared to on-axis positions, reducing power consumption further.

Figure 15H:
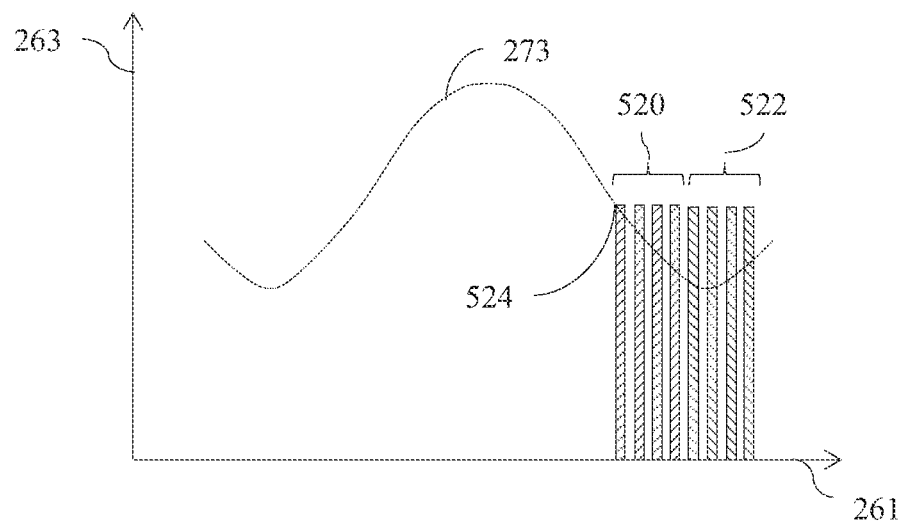
FIG. 15H is a schematic diagram illustrating a further graph of luminous flux distribution for an autostereoscopic display system with a gain of greater than one and an off-axis viewing position, in accordance with the present disclosure.

FIG. 15H is a schematic diagram illustrating a further graph of luminous flux distribution for an autostereoscopic display system with a gain of greater than one and an off-axis viewing position. In this embodiment, the arrays 520, 522 of illuminator elements are arranged to track the distribution 273 shown by matching the scaled luminous fluxes at position 524, but have equal luminous flux linear density across the sub-arrays 520 and 522. Thus, the scaled luminous fluxes vary across the array of illuminator elements 15n in a luminous flux distribution that is not fixed with respect the position in the lateral direction the illuminator elements but is varies in dependence on the detected position of the observer. In particular, this is controlled in a manner that produces a luminous intensity 264 of the output light that varies with the angle 262 of the detected position of the observer in the luminous intensity distribution 272 having a gain greater than one.

Thus, the left and right eye viewing windows may be arranged with luminous intensity 264 distributions to achieve substantially equal luminance for each eye in the manner of Lambertian distribution of luminous intensity. Again, the power consumption of the array 15 of illuminator elements is reduced compared to the arrangement of FIG. 15E, since not all the illuminator elements are operated at any one time. Off-axis power consumption may be reduced compared to on-axis positions and each eye may perceive an image luminance that is substantially equally, reducing depth errors in autostereoscopic viewing and increasing viewer comfort.

Figure 16:
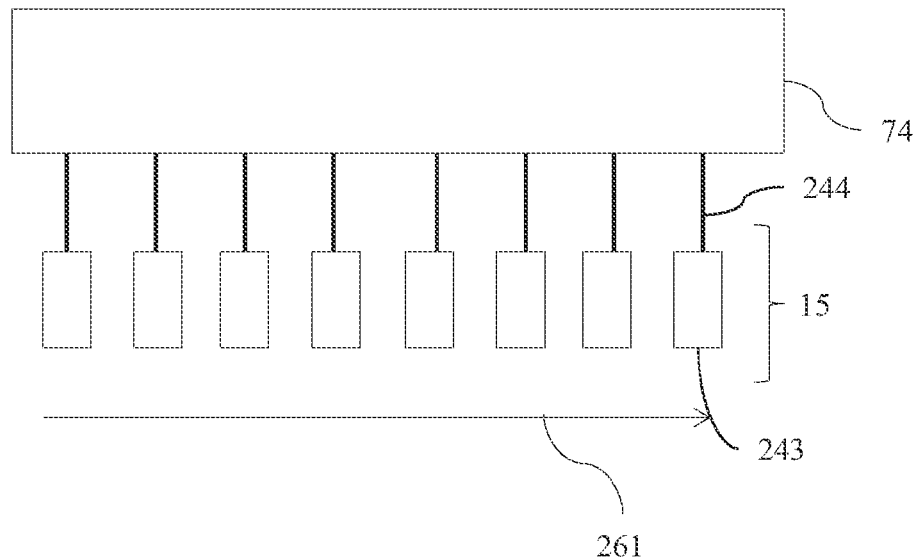
FIG. 16 is a schematic diagram illustrating a light source addressing apparatus, in accordance with the present disclosure.

FIG. 16 is a schematic diagram illustrating an illuminator element addressing apparatus. Thus illumination controller 74 may be arranged to address illuminator elements 243 of array 15 by means of drive lines 244 to provide drive signals to the array of illuminator elements. At position 261 across the array 15, illuminator elements 243 may have varying scaled luminous fluxes, as described elsewhere. In operation, scaled luminous flux variations may be achieved by means of controlling current into the respective sources 243 by the illumination controller 74 and control system. Control of luminous flux distribution may be achieved by means of current control or voltage control for example. Further the variation may be adjusted according to user requirements, thus a user may select a high gain, low power consumption mode or may select a wide field of view mode.

In the present embodiments, the array 15 of illuminator elements may be arranged at the input end 2 of a waveguide 1, for example as shown in FIG. 13 or may be at the input end 1103 of a wedge waveguide 1104 as shown in FIG. 12.

Figure 17:
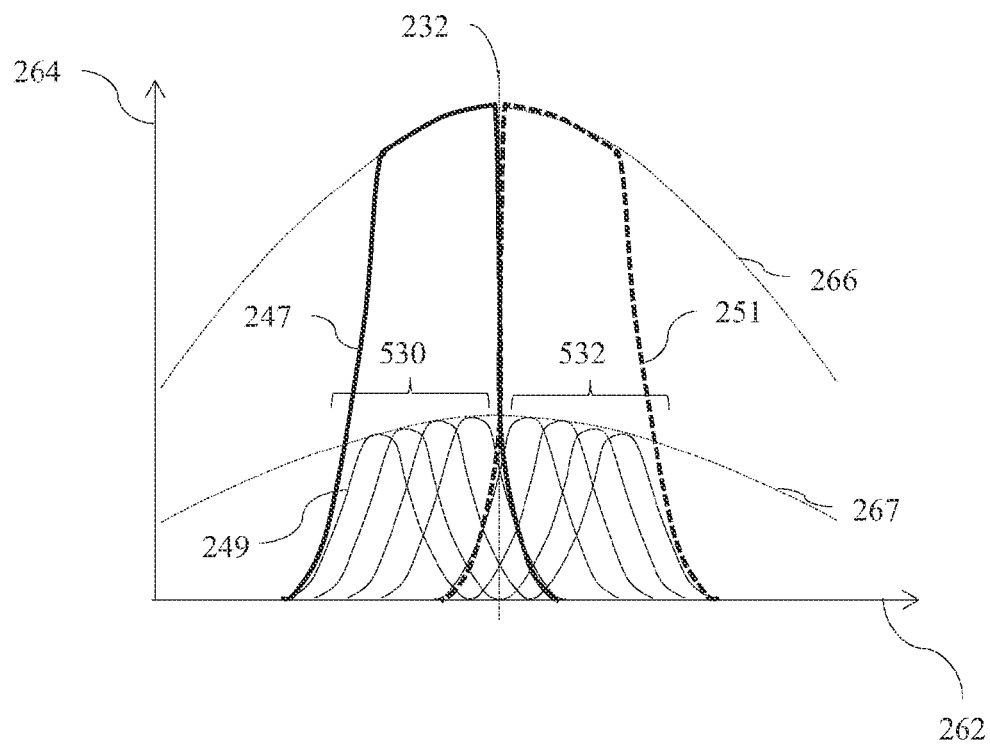
FIG. 17 is a schematic diagram illustrating a graph of luminous intensity for an array of optical windows and respective optical windows, in accordance with the present disclosure.

FIG. 17 is a schematic diagram illustrating a graph of luminous intensity for an array of optical windows and respective optical windows, in a further example in which the display device is operated to provide an autostereoscopic 3D display as described above, and the scaled luminous fluxes vary across the array of illuminator elements 15n in dependence on the detected position of the observer. Thus illuminator elements of array 15 may provide a constant scaled luminous fluxes and an optical system in such conditions may achieve a Lambertian profile of luminous intensity at the window plane. Each source of array 15 may provide an optical window 249 in the window plane 106. A left eye viewing window 247 is provided by an array 530 of left eye optical windows and a right eye viewing widow 251 is provided by an array 532 of right eye optical windows, in left and right eye illumination phases respectively. The left and right eye viewing windows 247 and 251 are generated in dependence on the detected position of the observer. The scaled luminous fluxes vary across the array of illuminator elements 15n in accordance with a luminous flux distribution that produces a luminous intensity of the output light in the optical windows that varies with the angle of the output directions in a luminous intensity distribution 267. This produces a luminous intensity of the output light in the viewing windows 247, 251, on addition of optical window arrays 530, 532, that varies with the angle of the detected position of the observer in the lateral direction in a luminous intensity distribution 266. Thus, the display device 100 may be achieved with substantially Lambertian output appearance. Thus luminous intensity distributions 266, 267 may be Lambertian. In embodiments described herein, similar formation of viewing windows from optical windows are provided. Different luminous intensity distributions for viewing windows 26 other than Lambertian are further provided by combining arrays of optical windows 249.

Figure 18:
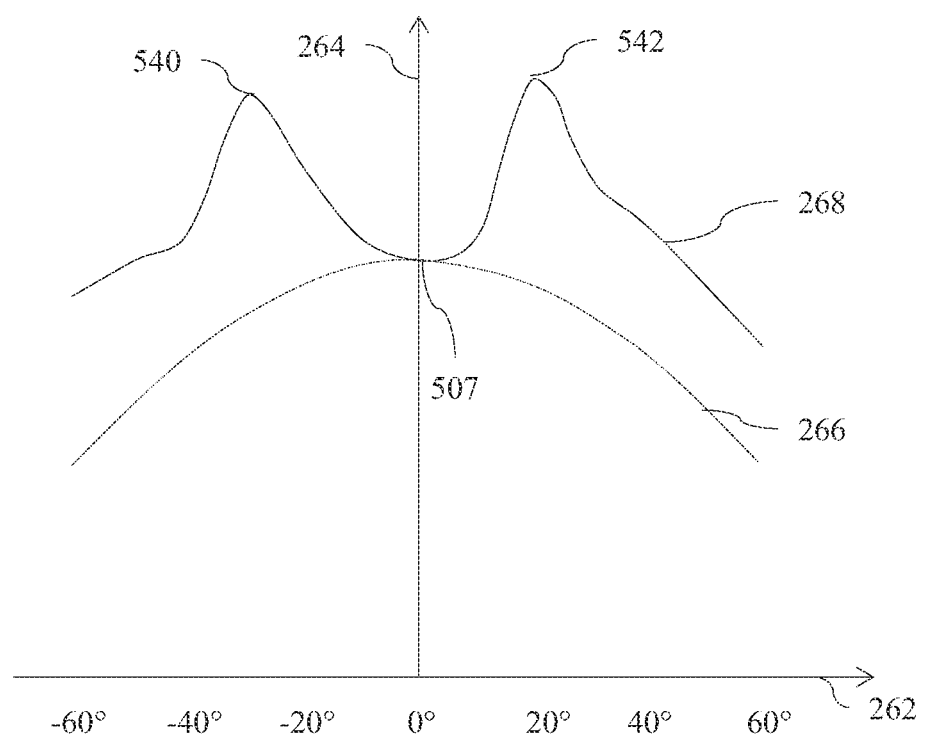
FIG. 18 is a schematic diagram illustrating a graph of optical window luminous intensity against viewing position for a waveguide including uniform luminous intensity of light sources, in accordance with the present disclosure.

FIG. 18 is a schematic diagram illustrating a graph of optical window luminous intensity 264 against viewing position 262 for a waveguide 1 including uniform luminous intensity of illuminator elements in array 15, in an alternative construction of the waveguide 1. The embodiments described above assume that for a luminous flux distribution 269, a substantially Lambertian luminous intensity distribution 266 is achieved. In embodiments of the waveguide 1, non-Lambertian behaviour may be exhibited by the waveguide 1 as will be described with reference to FIGS. 19A-19B. More specifically, a luminous intensity distribution 268 may be achieved by the waveguide 1 including horn shaped features 540, 542. Thus for a matched on-axis luminous intensity 507, the off-axis luminous intensity is substantially higher than that provided by a Lambertian output luminous emittance distribution 266; in other words the luminance of the display may increase for some off-axis viewing positions. It would be desirable to reduce power consumption of the array 15 of illuminator elements when operating in 2D mode by means of compensation of the distribution 268.

Figure 19A:
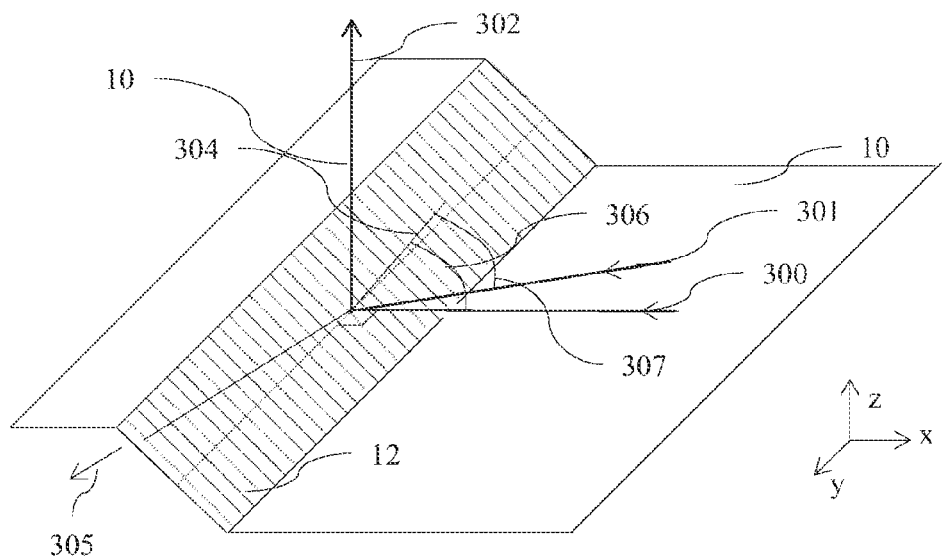
FIG. 19A is a schematic diagram illustrating a perspective view of a light ray incident with a first direction onto a light extraction feature of a waveguide, in accordance with the present disclosure.

FIG. 19A is a schematic diagram illustrating a perspective view of a light ray incident with a first direction onto a light extraction feature of a waveguide 1 of an alternative construction in which the light extraction feature 12 are not mirrored and instead reflect light by TIR. Surface 8 of the waveguide 1 may include intermediate regions 10 and light extraction features 12, which may be referred to herein as light extraction facets. On axis light rays 300 at an angle 307 to the normal 304 to feature 12 and that are parallel to features 10 are reflected by total internal reflection at feature 12 along ray 302. However, light rays 301 that remain in the same x-z plane as rays 300 that at a smaller angle 307 to the surface normal 304 of features 12 may be transmitted to ray 305. Thus rays 305 may be lost to the output luminous intensity distribution.

Figure 19B:
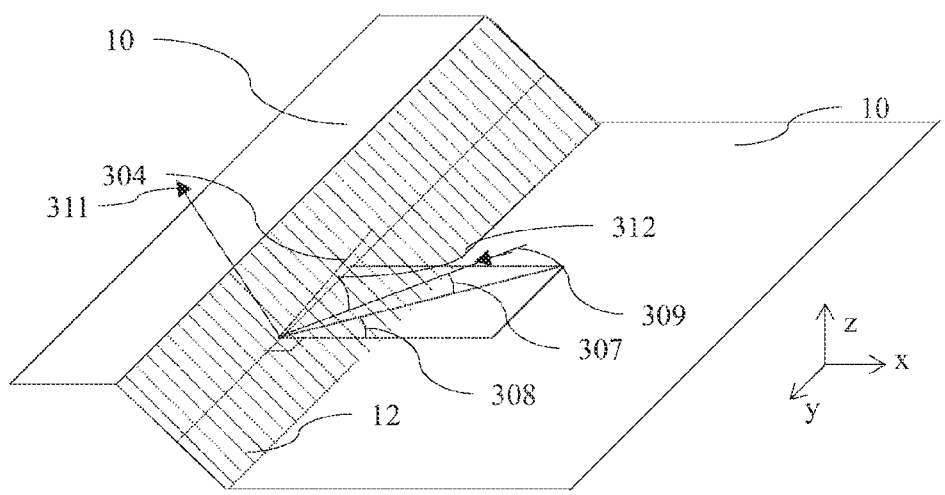
FIG. 19B is a schematic diagram illustrating a perspective view of a light ray incident with a second direction onto a light extraction feature of a waveguide, in accordance with the present disclosure.

FIG. 19B is a schematic diagram illustrating a perspective view of a light ray incident with a second direction onto a light extraction feature of a waveguide 1 of the same construction as FIG. 19A. Off-axis rays 308 may be provided by an off-axis illuminator element of array 15 and are incident at an angle 308 to on-axis rays in the x-y plane. Rays 309 that for on axis incidence that would be transmitted by the feature 12 are incident at an angle 312 to the normal 304 that has a greater resolved angle than angle 307 and thus undergoes total internal reflection at the feature 12. Thus light rays 311 are reflected rather than transmitted. This means that the luminous flux of the output light reflected by the feature 12, as a proportion of the luminous flux of the input light, varies for different illuminator elements 15n. This contributes to increased luminous intensity 264 at the respective off-axis position 262 in the window plane, and produce the horn features 540, 542. The control system is arranged to control the illuminator elements to output light with scaled luminous fluxes that vary across the array of illuminator elements in manner that compensates for this variation in the luminous flux of the output light reflected by the facets, as follows.

Figure 20A:
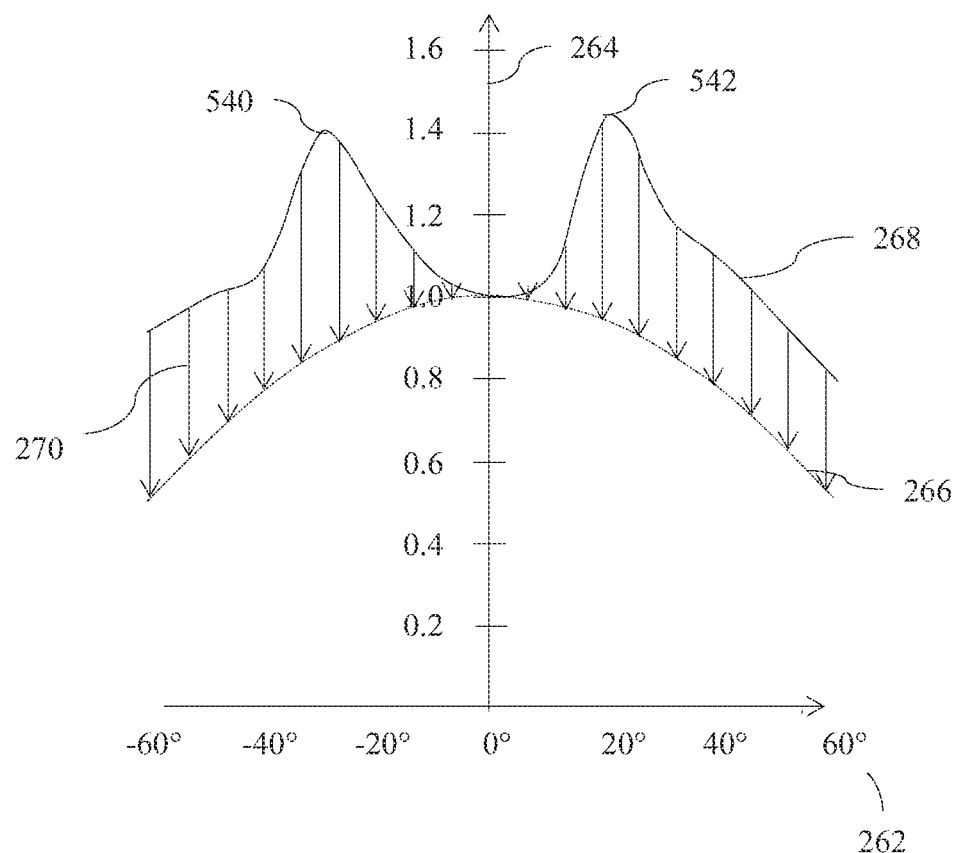
FIG. 20A is a schematic diagram illustrating a graph of optical window luminous intensity against viewing position in the window plane of a waveguide and a method to adjust luminous fluxes of light sources in the array, in accordance with the present disclosure.

FIG. 20A is a schematic diagram illustrating a graph of optical window luminous intensity against viewing position in the window plane of a waveguide and a method to adjust scaled luminous fluxes of the illuminator elements 15n. In order to achieve a luminous intensity distribution 266 that is Lambertian, the luminous intensity distribution may be modified as shown by arrows 270. This may be achieved by controlling the scaled luminous fluxes of the illuminator elements 15n to vary across the array 15 in luminous flux distribution as follows.

Figure 20B:
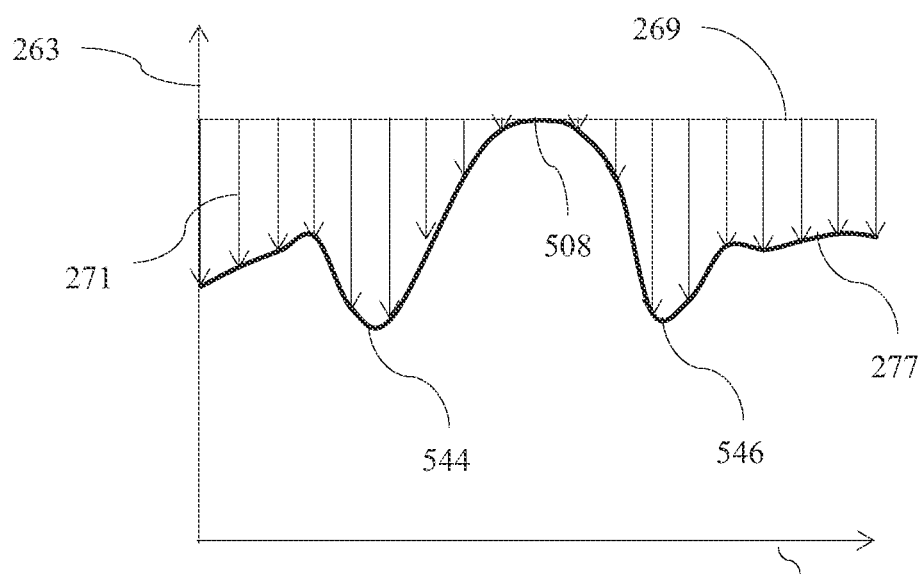
FIG. 20B is a schematic diagram illustrating a graph of luminous flux distribution for an array of light sources and method to adjust luminous fluxes of light sources in the array for a waveguide, in accordance with the present disclosure.

FIG. 20B is a schematic diagram illustrating a graph of luminous flux distribution for an array of illuminator elements and method to adjust the scaled luminous fluxes of the illuminator elements 15n for a waveguide 1. Arrows 271 shows the drop in the scaled luminous fluxes, compared to constant luminous flux distribution 269, for respective light sources corresponding to arrow 270 at respective optical window position 262, to reach a non-linear luminous flux distribution 277 that provides the luminous intensity distribution 266 that is Lambertian. Thus arrows 271 that may have a length proportionately equivalent to the length of arrows 270 for a respective equivalent positions 262, 261, and the luminous flux distribution 277 may be provided. Thus, the luminous flux distribution 277 has a global maximum 508 of luminous flux and reduces on either side of the global maximum 508 is provided across the array 15. The global maximum 508 occurs in respect of the illuminator elements aligned with the optical axis of the waveguide 1. The luminous flux distribution 277 also has 'anti-horn' features 544, 546 to compensate for horn features in the distribution 268.

Further in combination with the observer tracking arrangement of FIG. 13, the illuminator elements of the array 15 corresponding to optical windows that are not seen by the observer 99 may be extinguished, advantageously reducing power consumption Thus the illuminator elements may be controlled to output light with scaled luminous fluxes 263 that vary across the illuminator elements in dependence on the detected position of the observer 99 in a manner that produces a luminous intensity 264 of the output light that varies with the angle 262 of the detected position of the observer 99 in a luminous intensity distribution 266 that is Lambertian.

Advantageously, the non-Lambertian luminous intensity output of the waveguide 1 can be compensated for, achieving substantially uniform luminance across the viewing angle of the display.

Figure 21A:
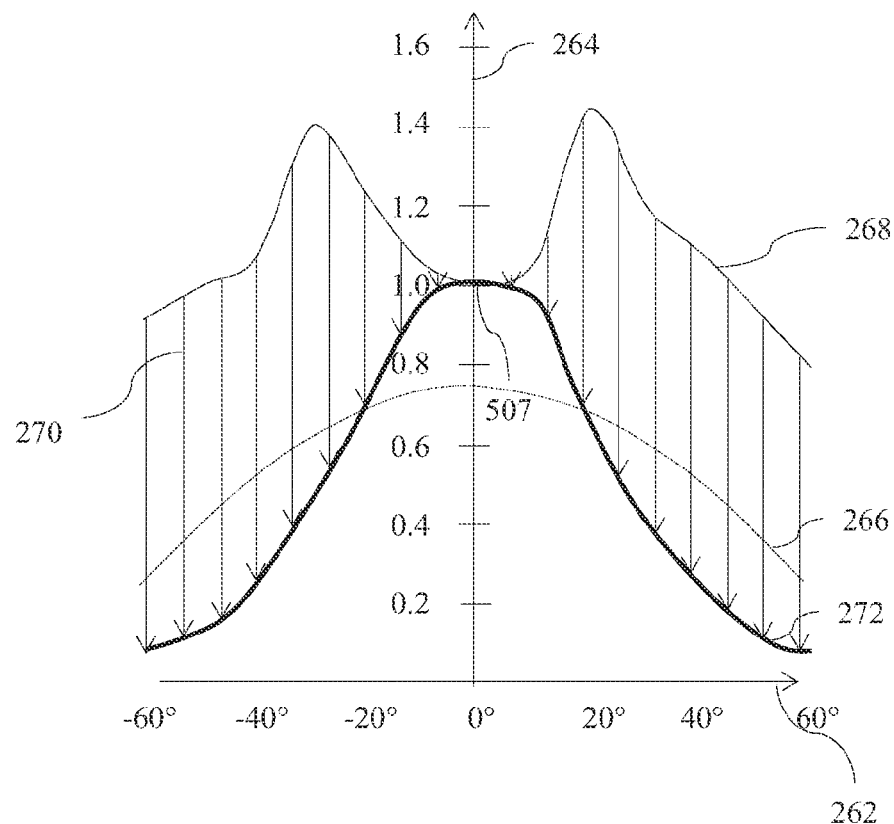
FIG. 21A is a schematic diagram illustrating a graph of optical window luminous intensity against viewing position in the window plane of a waveguide and a method to adjust luminous fluxes of light sources in the array, in accordance with the present disclosure.

FIG. 21A is a schematic diagram illustrating a graph of optical window luminous intensity against viewing position in the window plane of a waveguide and a method to adjust the scaled luminous fluxes of the illuminator elements 15n. In another embodiment, the luminous intensity distribution 268 can be adjusted to achieve luminance intensity distribution 272 having a gain greater than one. In particular, the luminous intensity distribution may be modified as shown by arrows 270. This may be achieved by controlling the scaled luminous flux of the illuminator elements to vary across the array 15 in luminous flux distribution as follows.

Figure 21B:
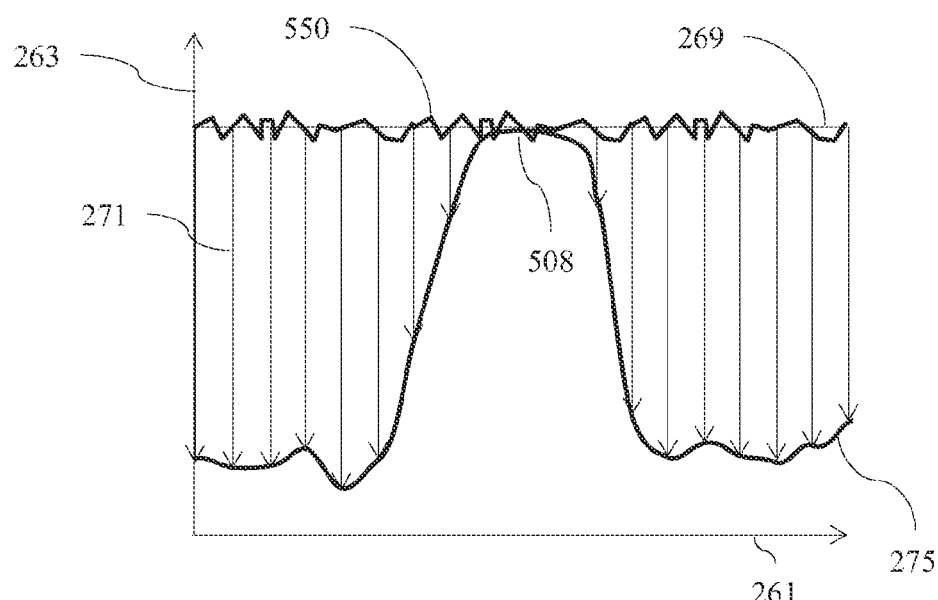
FIG. 21B is a schematic diagram illustrating a graph of luminous flux distribution for an array of light sources and method to adjust luminous fluxes of light sources in the array for a waveguide, in accordance with the present disclosure.

FIG. 21B is a schematic diagram illustrating a graph of luminous flux distribution for an array of illuminator elements and method to adjust the scaled luminous fluxes of the of the illuminator elements 15n for a waveguide 1. Thus the luminous flux distribution 275 may be achieved in a similar manner to that described for FIG. 20B. Arrows 271 shows the drop in scaled luminous flux, compared to constant luminous flux distribution 269, for respective light sources corresponding to arrow 270 at respective optical window position 262, to reach a non-linear luminous flux distribution 275 that provides the luminous intensity distribution 272 having a gain greater than one. Thus, the luminous flux distribution 275 has a global maximum 508 of scaled luminous flux and reduces on either side of the global maximum 508 is provided across the array 15. The global maximum 508 occurs in respect of the illuminator elements aligned with the optical axis of the waveguide 1. The luminous flux distribution 277 also has 'anti-horn' features 544, 546 to compensate for horn features in the distribution 268.

Further, the array 15 may include a luminous flux distribution for a constant drive current that varies as shown by distribution 550. Such a variation can be removed during the correction of scaled luminous fluxes described by non-linear luminous flux distribution 275 by knowledge of the distribution 550 prior to applying correction shown by arrows 271. Thus the total luminous intensity under curve 272 may be the same as the total luminous intensity under curve 266.

In one embodiment, illuminator elements of the array 15 may be controlled so that their scaled luminous fluxes vary in accordance with the non-linear luminous flux distribution 273, thereby providing the display device 100 with the luminous intensity distribution 272 having a gain greater than one. That is, the luminous intensity 264 of the output light varies with the angle 262 of the output directions in an actual luminous intensity distribution 272 that is greater than a notional luminous intensity distribution 266 that is Lambertian and has the same total luminous intensity over all output directions as the actual luminous intensity distribution 272.

In an illustrative embodiment, a 15.6" spatial light modulator may be illuminated by a waveguide 1 including an array 15 of 86 illuminator elements, each that may achieve 16 lumen per steradian of optical output in CW mode in a Lambertian distribution for the illuminator element arranged in air. Such illuminator elements may each be driven with 350 mW of electrical power if the luminous flux distribution 269 is provided, delivering a total array power consumption of 30 W. For the same on-axis luminous intensity (and thus luminance), and applying the distribution 272 to luminous intensity, and thus a luminous flux distribution similar to distribution 275, the total electrical power consumption of the array 15 may be reduced to 16 W. In autostereoscopic mode of operation, the illuminator elements are operated in pulsed mode, for example with a 25% duty cycle and 50% current overdrive, thus the illuminator elements may have substantially a 50% total luminance compared to CW mode. By matching the 2D and 3D on-axis luminous intensities, the total power consumption of the array 15 may be reduced to 8 W.

Figure 22:
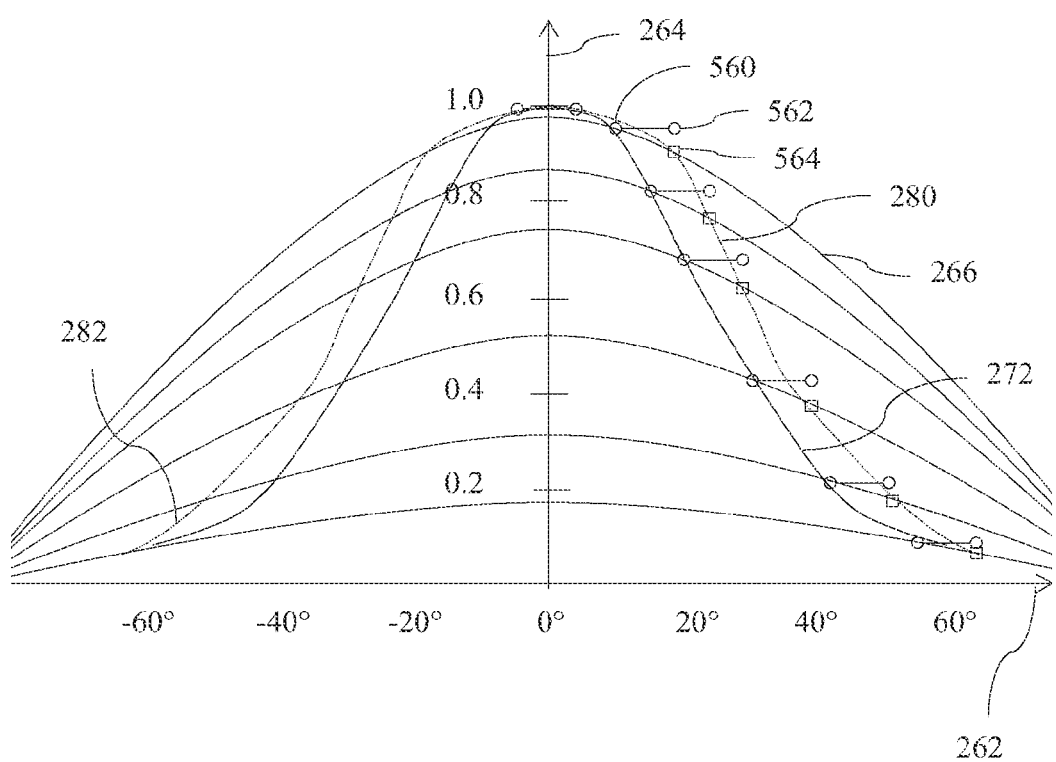
FIG. 22 is a schematic diagram illustrating a graph of optical window luminous intensity against viewing position in the window plane and a method to adjust luminous fluxes of light sources in the array for left and right eye illumination phases, in accordance with the present disclosure.

FIG. 22 is a schematic diagram illustrating a graph of optical window luminous intensity against viewing position in the window plane, corresponding to the angle of the output light in the lateral direction, in an example in which the display device is operated to provide an autostereoscopic 3D display as described above and a method to adjust scaled luminous fluxes of illuminator elements 15n for left and right eye illumination phases.

In FIG. 22, the luminous intensity distribution 272 for a gain of greater than one is marked, and left eye 560 and right eye 562 positions are marked for observer 99 at various viewing positions. For an observer 99 moving to the right of the optical axis, the left eye position is indicated to follow the luminous intensity distribution 272. For an equal display luminance, the display should achieve a difference in the luminous intensity between the left and right eyes of the observer that is Lambertian. Thus Lambertian distribution 266 may be arranged to pass through the left eye 560 and provide a desired luminous intensity 564 at the right eye position 562 across the window plane 106 position 262. Thus points 564 can be interpolated across the window plane for the right eye to provide right eye luminous intensity distribution 280. For an observer 99 moving to the left of the optical axis, the right eye may follow the luminous intensity distribution 272, while the left eye may provide distribution 282 in a similar manner.

Figure 23A:
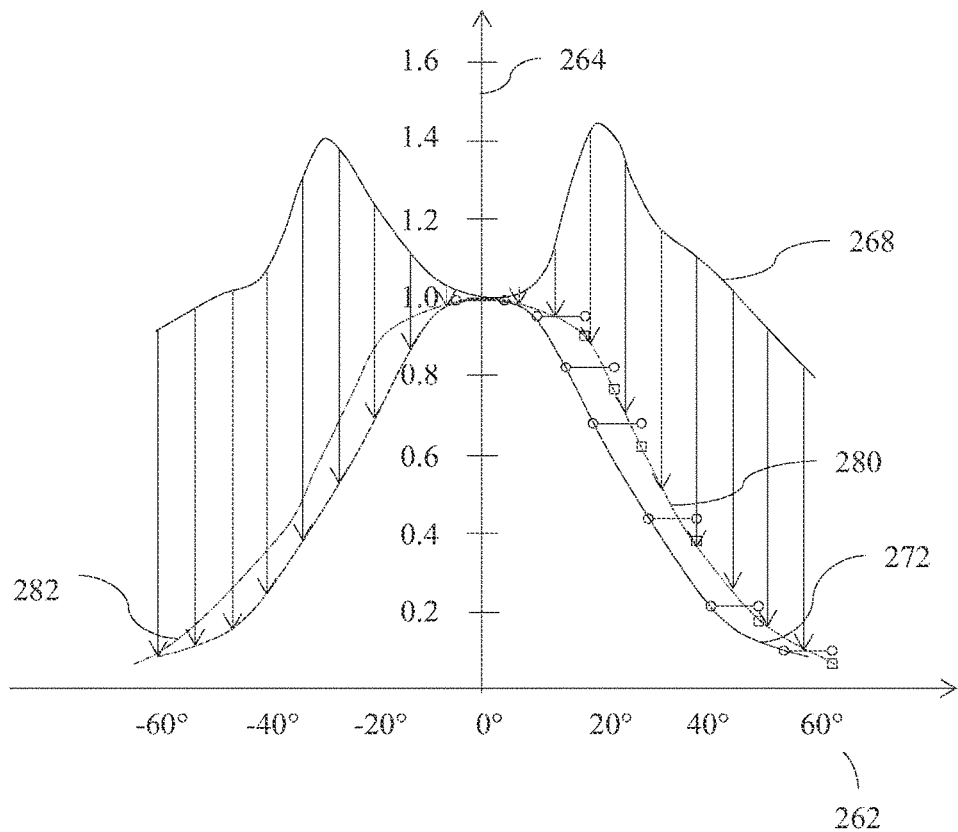
FIG. 23A is a schematic diagram illustrating a graph of optical window luminous intensity against viewing position in the window plane of a waveguide and a method to adjust luminous fluxes of light sources in the array for the right eye illumination phase, in accordance with the present disclosure.

FIG. 23A is a schematic diagram illustrating a graph of optical window luminous intensity against viewing position in the window plane of a waveguide 1 and a method to adjust scaled luminous fluxes of illuminator elements 15n for the right eye illumination phase. Thus, after correction as shown by the arrows, for the right eye 562, the waveguide luminous intensity distribution 268 may be modified to the luminous intensity distribution 272 for positions to the left of the optical axis and distribution 280 to the right of the optical axis. Similarly for the left eye 560, the waveguide luminous intensity distribution 268 may be modified to the luminous intensity distribution 272 for positions to the right of the optical axis and distribution 282 to the left of the optical axis. This may be achieved by controlling the scaled luminous flux of the illuminator elements 15n to vary across the array 15 in dependence on the detected position of the observer and in dependence on whether the output light is modulated by a left or right image, as follows as follows.

Figure 23B:
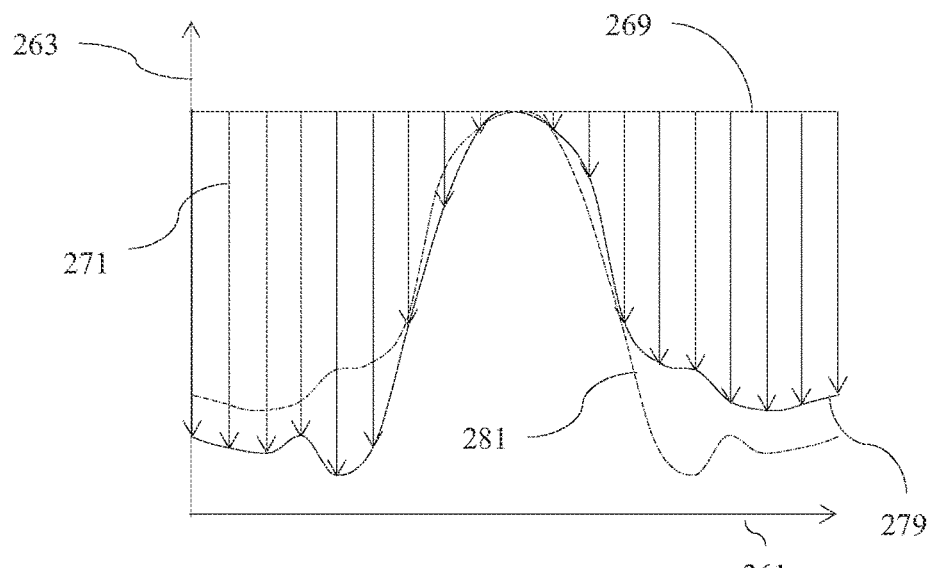
FIG. 23B is a schematic diagram illustrating a graph of luminous flux distribution for an array of light sources for left and right eye illumination phases and method to adjust luminous fluxes of light sources in the array for a waveguide for the right eye illumination phase, in accordance with the present disclosure.

FIG. 23B is a schematic diagram illustrating a graph of luminous flux distribution for an array of illuminator elements for left and right eye illumination phases and method to adjust scaled luminous fluxes of the illuminator elements 15n for a waveguide 1 for the right eye illumination phase. Thus, the right eye luminous flux distribution 279 may be different to the left eye luminous flux distribution 281. Arrows 271 shows the drop in scaled luminous flux, compared to constant luminous flux distribution 269, for respective light sources corresponding to arrow 270 at respective optical window positions 262, to reach the right eye luminous flux distribution 279 when the output light is modulated by a right image and the left eye luminous flux distribution 281 the output light is modulated by a left image.

Advantageously, the power consumption of the array 15 may be substantially reduced in a 2D mode while maintaining equal luminance between left and right eyes, thus improving display luminance. Similarly, an observer tracking display for the purposes of an autostereoscopic display, privacy display or high efficiency 2D mode display can achieve low power consumption while maintaining comfortable luminance properties of the display for left and right eye images.

In the above examples, control of the scaled luminous flux is effected to provide a luminous intensity distribution 266 that is Lambertian or a luminous intensity distribution 272 that has a gain greater than one. However, this is not limitative and the scaled luminous flux may be controlled so to provide a luminous intensity distribution of other shape. Some examples are now given.

Figure 24:
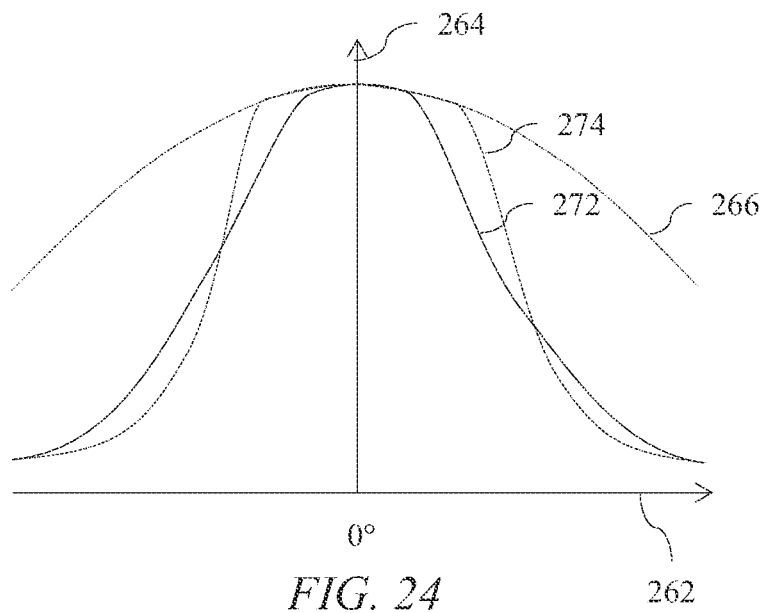
FIG. 24 is a schematic diagram illustrating a graph of optical window luminous intensity against viewing position in the window plane of a waveguide, in accordance with the present disclosure.

FIG. 24 is a schematic diagram illustrating a graph of optical window luminous intensity against viewing position in the window plane of a waveguide 1, corresponding to the angle of the output direction. It may be desirable to further modify the luminance intensity distribution, for example to provide a broader region of Lambertian behaviour near to on-axis positions but to increase the slope of the distribution 274 in off-axis positions in comparison to distribution 272. Advantageously the display may have substantially Lambertian behaviour on-axis, may have sufficient light for off-axis viewing while achieving low power consumption for off-axis viewing.

Figure 25:
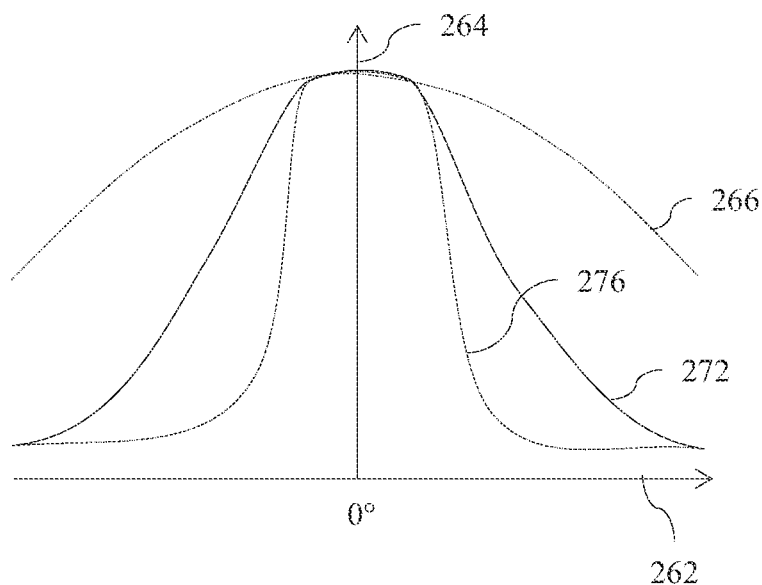
FIG. 25 is a schematic diagram illustrating a further graph of optical window luminous intensity against viewing position in the window plane of a waveguide, in accordance with the present disclosure.

FIG. 25 is a schematic diagram illustrating a further graph of optical window luminous intensity against viewing position in the window plane of a waveguide 1, corresponding to the angle of the output direction. Thus distribution 276 may have a very narrow central region and a fast drop-off to a background illumination profile.

The distributions for example 266, 272, 274 or 276 may be controlled by a user selection or by automatic selection by a control system, for example by means of luminous flux controller 580 shown in FIG. 13. Advantageously the properties of the display may be modified to suit remaining battery lifetime, privacy requirements, multiple viewers, display brightness environment, user experience and other user requirements.

Figure 26A:
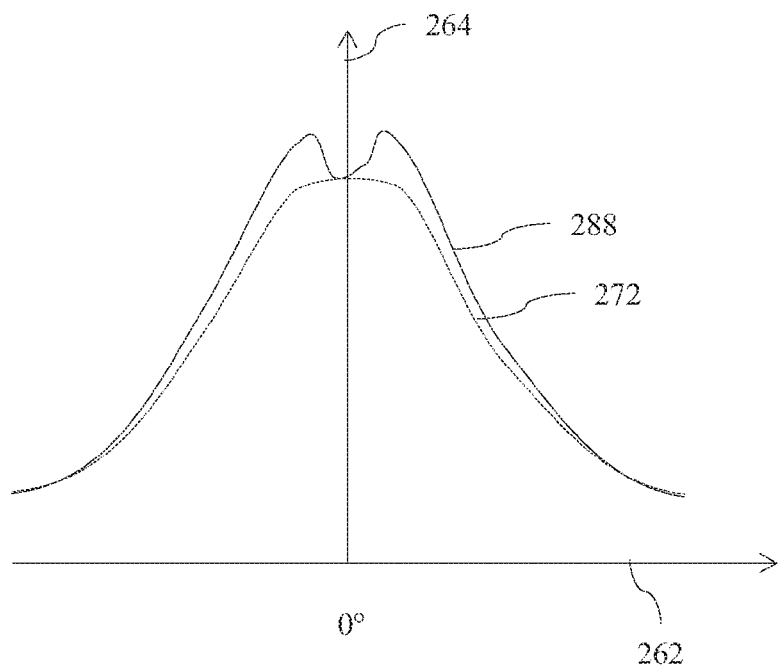
FIG. 26A is a schematic diagram illustrating a further graph of optical window luminous intensity against viewing position in the window plane of a waveguide, in accordance with the present disclosure.
Figure 26B:
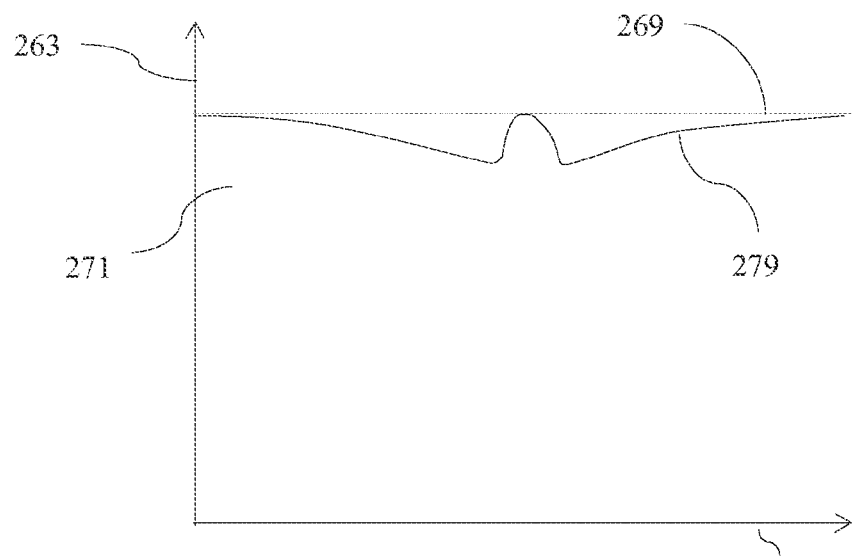
FIG. 26B is a schematic diagram illustrating a graph of luminous flux distribution for an array of light sources to compensate for light source degradation, in accordance with the present disclosure.

FIG. 26A is a schematic diagram illustrating a further graph of optical window luminous intensity against viewing position in the window plane of a waveguide 1, corresponding to the angle of the output direction, and FIG. 26B is a schematic diagram illustrating a graph of luminous flux distribution for an array of illuminator elements to compensate for light source degradation. Illuminator elements such as LEDs including gallium nitride blue emitters and yellow phosphors may undergo ageing wherein the scaled luminous fluxes and chromaticity may vary with usage. In particular, on-axis illuminator elements may be used more frequently than off-axis illuminator elements that may provide a non-uniform degradation in luminous emittance. Such errors can be corrected as shown by distribution 279 of scaled luminous fluxes from the respective illuminator elements. Advantageously, the luminance distribution of the display may be maintained throughout the device lifetime.

Figure 27A:
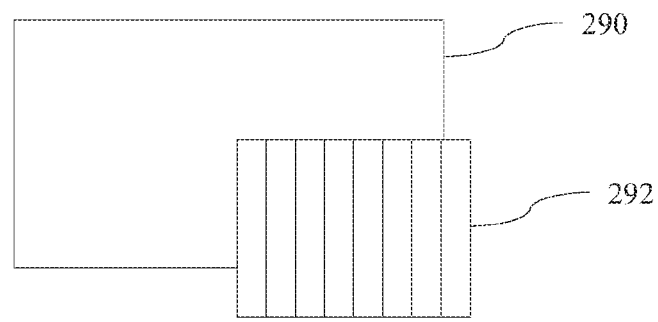
FIG. 27A is a schematic diagram illustrating a front view of a directional display apparatus in landscape mode, in accordance with the present disclosure.
Figure 27B:
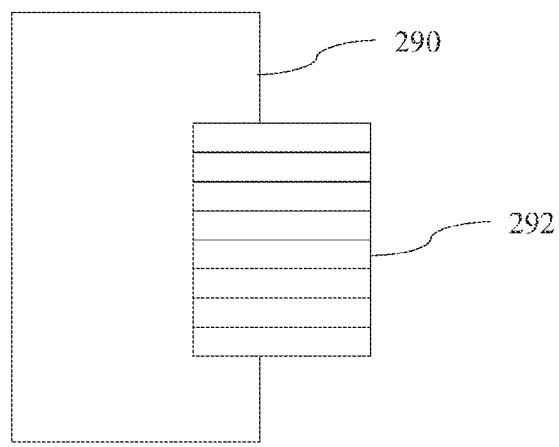
FIG. 27B is a schematic diagram illustrating a front view of a directional display apparatus in portrait mode, in accordance with the present disclosure.
Figure 27C:
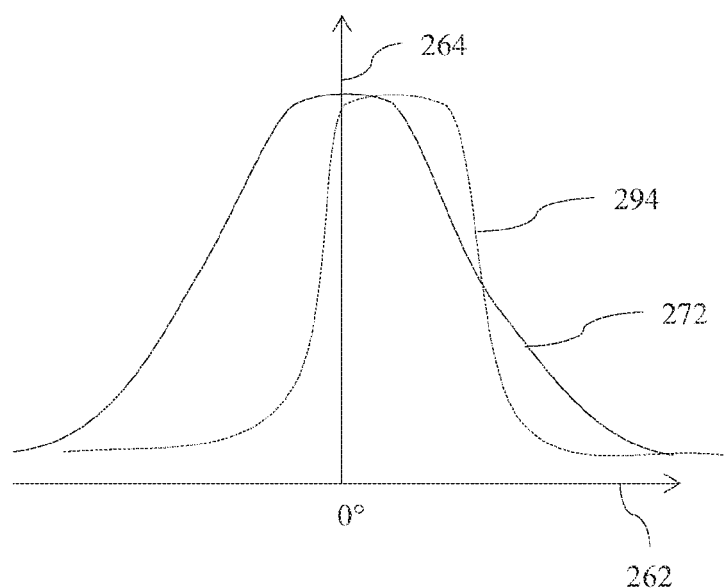
FIG. 27C is a schematic diagram illustrating a further graph of optical window luminous intensity against viewing position in the window plane of a waveguide for the arrangement of FIG. 27B, in accordance with the present disclosure.

FIG. 27A is a schematic diagram illustrating a front view of a directional display apparatus in landscape mode. Thus display 290 may provide vertical viewing windows 292. FIG. 27B is a schematic diagram illustrating a front view of a directional display apparatus in portrait mode. Thus when display 290 is rotated, the viewing windows 292 become horizontal when such a display is used in privacy mode or green mode, it may be desirable to adjust the luminous intensity distribution as shown in FIG. 27C. FIG. 27C is a schematic diagram illustrating a further graph of optical window luminous intensity against viewing position in the window plane of a waveguide 1 for the arrangement of FIG. 27B. Thus distribution 294 may be offset from the on-axis position, achieving high brightness for the preferred vertical viewing position, while achieving low power consumption for other viewing angles, while maintaining a display that is visible.

Figure 28:
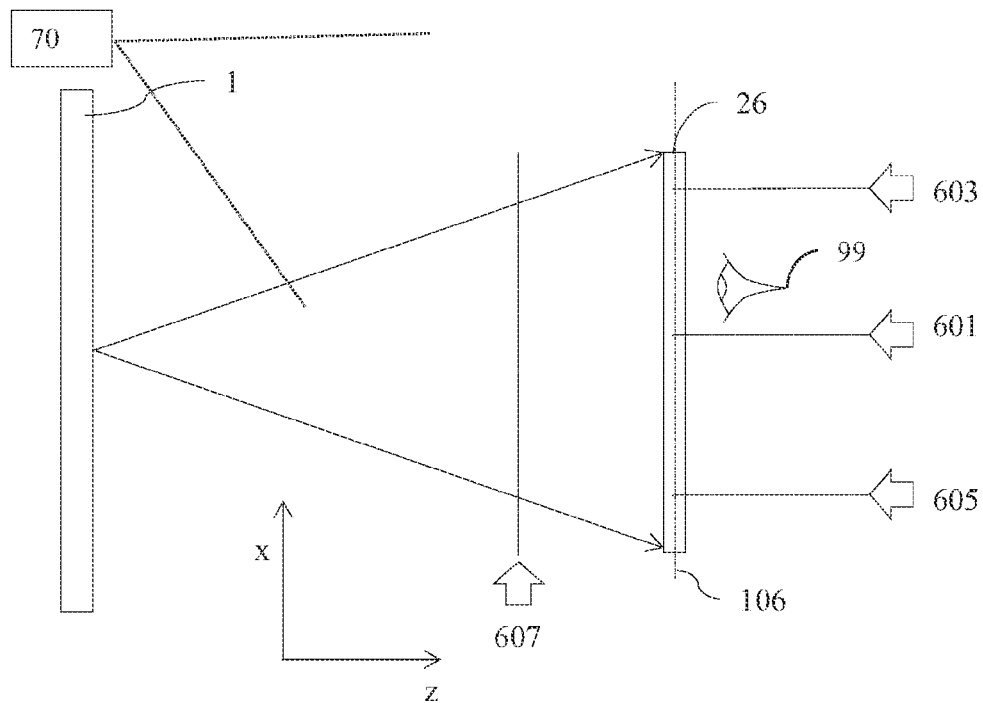
FIG. 28 is a schematic diagram illustrating a side view of a waveguide and viewing windows for observer movement, in accordance with the present disclosure.
Figure 29:
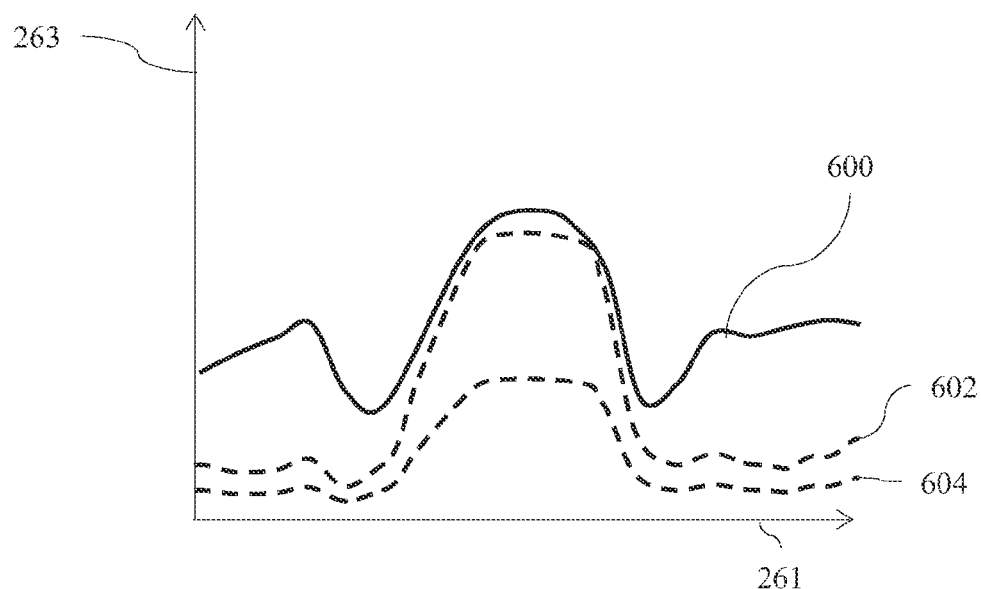
FIG. 29 is a schematic diagram illustrating a graph of luminous flux distribution for an array of light sources and method to adjust luminous fluxes of light sources in the array for a waveguide with the viewer movement of FIG. 28, in accordance with the present disclosure.

FIG. 28 is a schematic diagram illustrating a side view of a waveguide 1 and viewing windows 26 for observer movement in a direction perpendicular to the lateral direction at the same distance from the waveguide 1 (hereinafter referred to as "vertical") and/or along the normal to the first guide surface of the waveguide 1. FIG. 29 is a schematic diagram illustrating a graph of luminous flux distribution for an array 15 of illuminator elements and method to adjust the scaled luminous fluxes of the illuminator elements 15n for a waveguide 1 with the observer movement of FIG. 28. In this case the scaled luminous fluxes are controlled in dependence on the position of the observer, as detected by the sensor system as described above, to provide aluminous intensity of the output light that varies with the angle of the detected position in the observer in the lateral direction, and also varies with the vertical position of the observer and/or the position of the observer along the normal to the first guide surface of the waveguide 1. In a first embodiment, for vertical viewing positions 601, 603, 605, the respective luminous flux distributions 600, 602, 604 may be provided. Advantageously, as the observer moves away from a preferred vertical viewing position, the output luminous flux distributions may be adjusted accordingly. The profiles of the distributions 600, 602, 604 are shown here as being different shapes; the shape of the distributions can be modified for example to achieve a high quality Lambertian output for preferred vertical viewing angles, but higher gain performance for different viewing angles, thus saving power for viewing from those directions. Similarly, viewer movement to plane 607 away from the window plane 106 may be used to modify the luminous flux distribution across the array 15.

Observer tracking displays may suffer from image flicker for moving observers. For an observer approximately at the window plane, the whole display may change intensity simultaneously due to non-uniformities of the integrated optical window array 121 in the window plane. If the observer is away from the window plane or the illumination system output is aberrated, then different regions of the display surface may appear to flicker by different amounts. It is desirable that the tracking and illumination steering systems cooperate to remove flicker for moving observers, which may be achieved by reducing the amplitude of the perceived intensity variation.

For example, an eye that moves into a non-illuminated optical window may see a large intensity variation on the display. It may be desirable to increase the intensity of this window prior to movement so that the flicker artefact may be reduced. However, increasing the intensity of optical windows, particularly the interocular optical windows located between the observer's eyes may increase image cross talk, and may degrade 3D image quality. Further increasing window intensity at times when the observer is substantially stationary, when low cross talk is desirable, and when the observer is moving, when low flicker is desirable, may result in an additional flicker artefact.

Figure 30:
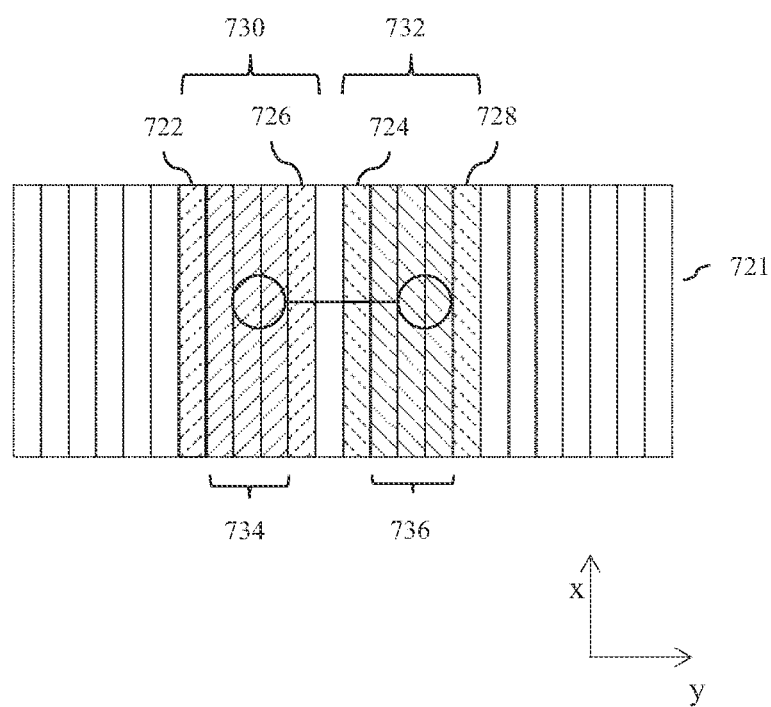
FIG. 30 is a schematic diagram illustrating an arrangement of viewing windows during observer motion between viewing positions in accordance with the present disclosure.

FIG. 30 is a schematic diagram illustrating an arrangement of viewing windows during observer motion between viewing positions in an example in which the display device is operated to provide an autostereoscopic 3D display as described above. Further, FIG. 30 shows another switching arrangement for an array 721 of optical windows during movement of an observer and arranged to reduce display flicker while substantially maintaining reduced image cross talk.

In FIG. 30, the illuminator elements 15n are controlled to direct light into a left viewing window 730 and a right viewing window 732 that each comprise plural optical windows, in positions corresponding to left and right eyes of an observer, in dependence on the detected position of the observer. In this example, there is a gap of one optical window between the left and right viewing windows 730 and 732, but alternatively there may be no gap or a larger gap. In this example, each of the left and right viewing windows 730 and 732 comprises five optical windows, but in general a viewing window could comprise any number of optical windows.

In the case that the viewing windows comprise at least two optical windows, then the illuminator elements 15n may be controlled to output light with a scaled luminous fluxes that varies across each of the left and right viewing windows 730 and 732. In the example of FIG. 30, the distribution of the scaled luminous fluxes across each of the left and right viewing windows 730 and 732 is as follows.

The distribution has a global maximum for the optical windows 730 and 734 which are central in the left and right viewing windows 730 and 732. In addition, the distribution for the left and right viewing windows 730 reduce on both sides of that global maximum, that is in optical windows 722 and 726 of the left viewing window 730 and in optical windows 724 and 728 of the right viewing window 732. The example of FIG. 30 shows a single optical window 722, 724, 726, 728 on each side of optical window array 730 having a reduced, scaled luminous flux, but in general more than one optical window may have a reduced, scaled luminous flux of the same or different levels. The reduced, scaled luminous flux of optical window 722, 724, 726, 728 may be achieved by change in the illumination level, pulse width or pulse pattern, or any combination of these.

Advantageously using the luminous flux switching of FIG. 30 may reduce the perception of flicker by the observer while substantially maintaining low cross talk and thereby may improve display quality. Such an embodiment may achieve windows suitable for both stationary and moving observers, while reducing the effect of flicker from increasing the intensity of adjacent or interocular optical windows. Flicker is reduced in particular by reducing the scaled luminous flux on the side of the viewing window adjacent the other viewing window, i.e. for the left viewing window 730 in the optical window 726 on the side of the right viewing window 732, and similarly for the right viewing window 732 reduces below the global maximum in the optical window 724 on the side of the left viewing window 730.

Advantageously the number of optical windows illuminated may be reduced, for example, in battery powered equipment which may extend battery operation time. Reducing the number of illuminated optical windows may increase the perceived flicker.

FIGS. 31 to 35 illustrate some other distributions of scaled luminous flux that may be applied across the left and right viewing windows at the window plane, being schematic graphs of luminous intensity 700 against input position 702 in the lateral direction (y-direction).

Figure 31:
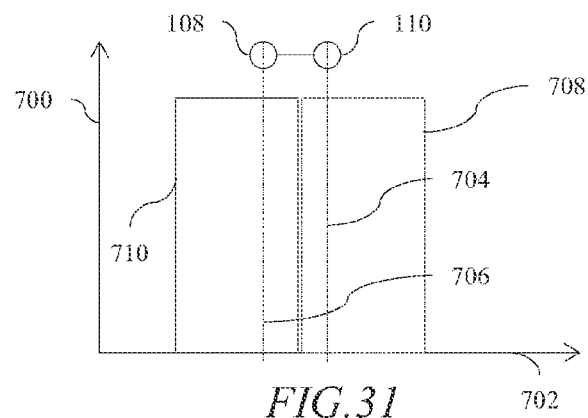
FIG. 31 is a schematic diagram illustrating intensity distribution of an arrangement of viewing windows in accordance with the present disclosure.

FIG. 31 shows distributions 708, 710 for left eye 110 and right eye 108 of an observer i. Eye positions 704, 706 can then be used to determine the intensity and cross talk at a given location across the window plane. The arrangement of FIG. 31 would be for near-perfect windows, such that no cross talk is observed, however such windows are not typically present.

Figure 32:
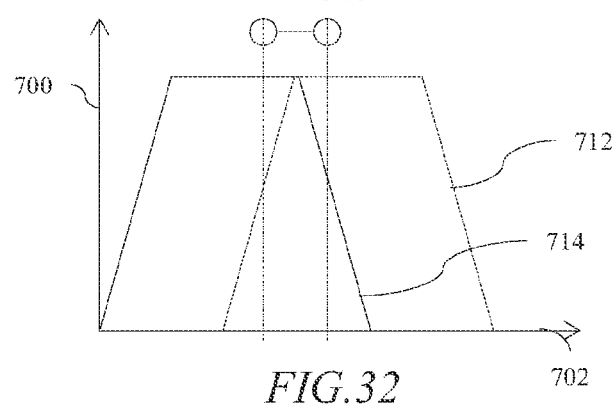
FIG. 32 is a schematic diagram illustrating a further intensity distribution of an arrangement of viewing windows in accordance with the present disclosure.

FIG. 32 shows distributions 712, 714 having sloped sides so that eyes see some light from adjacent viewing windows, creating undesirable image cross talk and visual fatigue for users.

Figure 33:
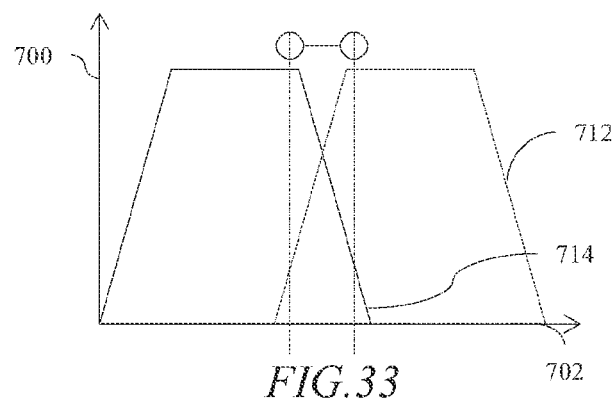
FIG. 33 is a schematic diagram illustrating a further intensity distribution of an arrangement of viewing windows in accordance with the present disclosure.

FIG. 33 shows distributions 712, 714 which are similar to FIG. 32 but more widely separated, for example as would be achieved by illumination wherein the illuminator elements to achieve left and right viewing windows 730, 732 having substantially the same scaled luminous fluxes. Advantageously the cross talk is reduced. However, small movements of the observer can reduce display intensity that creates flicker for a moving observer in observer tracked displays.

Figure 34:
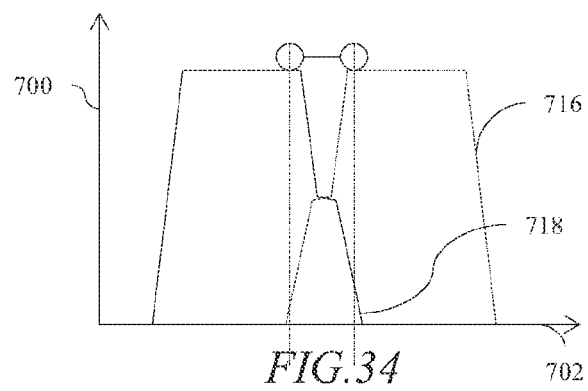
FIG. 34 is a schematic diagram illustrating a further intensity distribution of an arrangement of viewing windows in accordance with the present disclosure.

FIG. 34 shows distributions 716, 718 similar to that which would be achieved in the arrangement of FIG. 30. Such an arrangement increases the intensity of the windows near the observer's nose for the moving observer, but has reduced image cross talk for a stationary observer.

Figure 35:
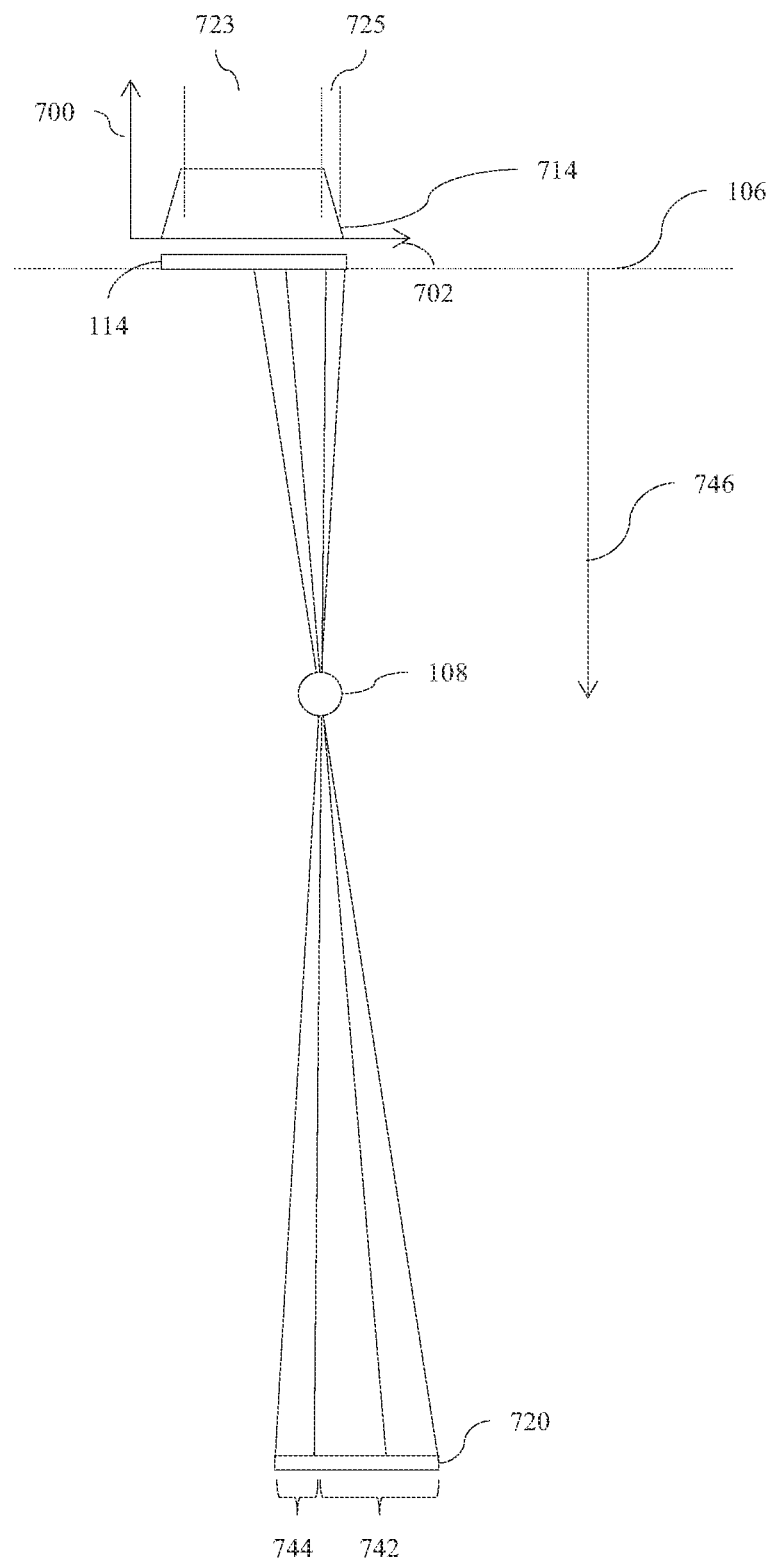
FIG. 35 is a schematic diagram illustrating non-uniformities of display illumination arising from a non-uniform window intensity distribution in accordance with the present disclosure.

FIG. 35 shows the distribution 714 for the right eye illustrating non-uniformities of display uniformity arising from a non-uniform window intensity distribution. The right eye 108 of the observer may be positioned at a distance 746 between the window plane 106 and display device 720. Thus light rays that are directed from the display region 742 to the eye 108 are those rays that would have been directed to the uniform portion 723 of the window 714 and light rays from display region 724 are those rays that would have been directed to non-uniform portion 725 of the window 714. In this manner, non-uniform window structure can result in display non-uniformities for observers not in the window plane so that regions 742 and 744 of display 720 have different intensity profiles. It is thus desirable to reduce 'hard' (sharp gradient) window boundaries to reduce visibility of artefacts in the display plane. Thus the grey scale arrangement of FIG. 30 can advantageously achieve improved performance of uniformity visibility for moving and non-moving observers, while achieving reduced image cross talk.

FIGS. 36-41 are schematic diagrams illustrating some further non-uniform luminous flux distributions that may be applied across the left and right viewing windows at the window plane, being schematic graphs of scaled luminous flux 263 against input position 261 in the lateral direction (y-direction). In each case, the left eye viewing window 730 comprises plural optical windows 770 with luminous flux distribution 772 and the right eye viewing window 732 comprises plural optical windows 771 with luminous flux distribution 774. In each case, within each of the left and right viewing windows 730, 732, the luminous flux distributions 772, 774 are non-uniform with global maxima 773, 775 respectively, and reduce on both sides of those global maxima 773, 775. In these examples, each of the left and right viewing windows 730 and 732 comprises five optical windows, but in general similar distributions reducing on both sides of a global maximum could be provided to viewing windows comprising any number of at least three optical windows.

The global maxima 773, 775 of the illuminator elements may be directed by the optical system towards the pupils of an observer in an observer tracked display in dependence on the detected position of the observer 99, obtained using the sensor system. The global maxima 773, 775 may for example be arranged to be positioned 32 mm each side of the measured nose position of an observer 99.

Figure 36:
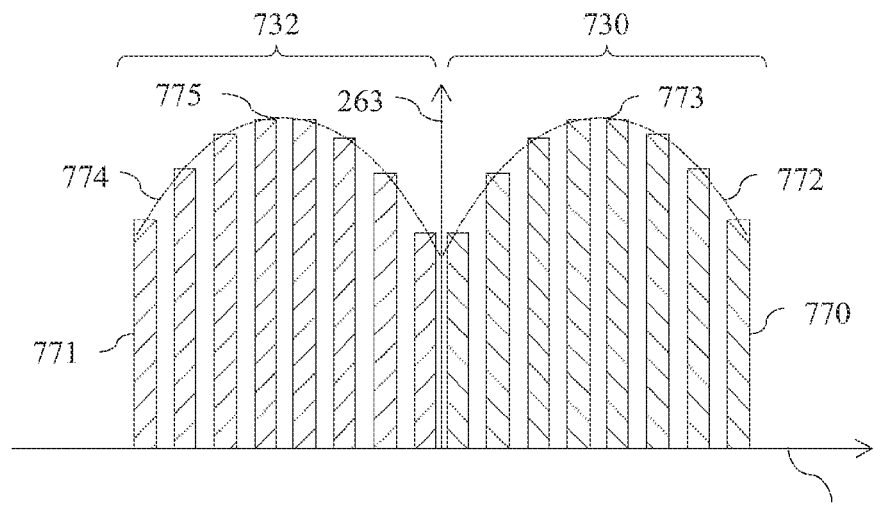
FIGS. 36-41 are schematic diagrams illustrating non-uniform luminous flux distributions from light sources, in accordance with the present disclosure.

It may be seen that the luminous flux distributions of FIG. 36 substantially achieve similar profiles of optical and viewing window arrangements, however diffusion and scatter within the optical system may serve to blur such window arrangements in comparison with the distributions of FIG. 36.

In comparison with viewing windows with substantially constant luminous flux distributions, the brightness of the observed image may be obtained, particularly in the central region of the display area. The amount of light present in the system may be reduced, and thus cross talk from stray light may be minimised. The visibility of flicker artefacts for a moving observer may be further reduced, by providing wider total window width for similar or less cross talk. Further, the total power consumption of the apparatus may be reduced, increasing efficiency and reducing cost.

Figure 37:
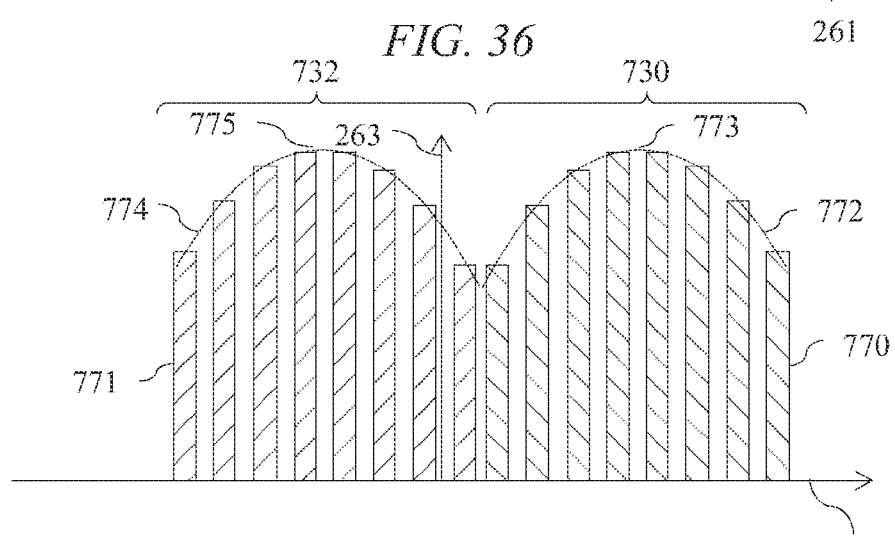

Whereas FIG. 36 illustrates the situation that the detected position of the observer 99 is aligned with the optical axis 232 of the waveguide 1, FIG. 37 illustrates the situation for an observer 99 that has moved laterally with respect to the optical axis 232 of the waveguide 1. Thus, the luminous flux distributions 772, 774 of the left and right viewing windows 730 and 732 may be displaced laterally in dependence on the detected position of the observer 99, while maintaining variations in intensity across the viewing windows. Advantageously, the change in intensity of the outer optical windows can be reduced in comparison to uniform scaled luminous flux illuminator elements for a viewing window, reducing flicker for a moving observer 99.

Figure 38:
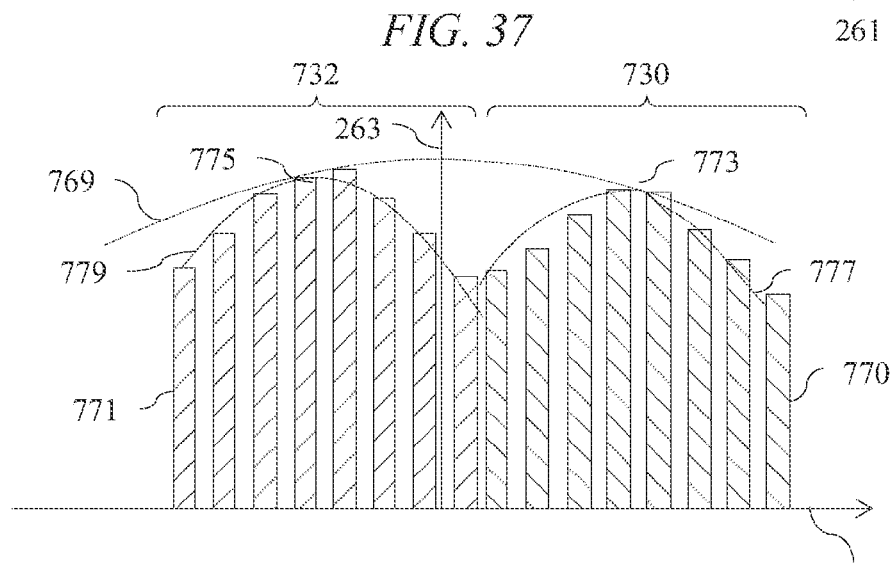

FIG. 38 illustrates an alternative form of the left and right viewing windows 730 and 732 for an observer that has moved laterally with respect to the optical axis 232 of the waveguide 1. In this case, the global maxima 773, 775 may be arranged to follow luminous flux distributions 777, 779 to achieve a Lambertian luminous intensity distribution of optical windows, and may track luminous intensity distribution 769 for example. Illuminator elements 770, 771 that are not at the global maxima 773, 775 may be modified in scaled luminous flux accordingly. Advantageously the display may appear equally bright from a range of viewing angles, while achieving reduced cross talk, flicker and power consumption. Alternatively, further power saving characteristics can be achieved by further reducing display luminance for off-axis viewing positions. The distribution 769 may be modified to increase the gain of the display and further reduce power consumption for off-axis positions.

Figure 39:
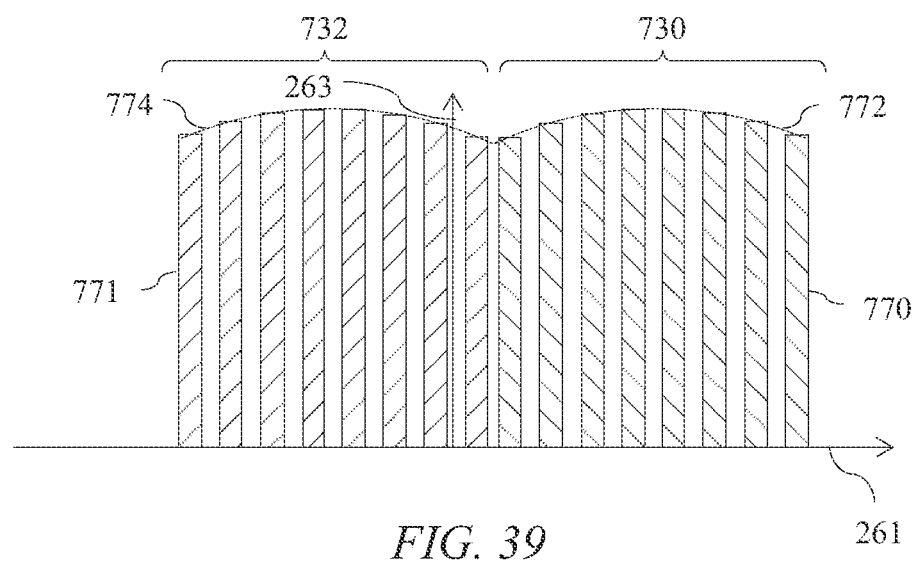

FIG. 39 illustrates an alternative form of the left and right viewing windows 730 and 732 for an observer that, in comparison to FIG. 36, has moved longitudinally along the optical axis 232 of the waveguide 1, that is along the normal to the first guide surface of the waveguide 1. In this case, the scaled luminous flux is also varied in dependence on the detected longitudinal position, in this example to provide respective optical windows and viewing windows that comprise flatter luminous flux distributions. As shown in FIG. 35, the variation of luminous intensity across the optical windows can provide a variation in display uniformity. As an observer moves longitudinally with respect to the display, non-uniformities may increase as more optical windows may be captured across the display area. Thus it may be desirable to reduce the intensity variation across the optical windows.

Further, a user may select a preferred gain profile for the whole display, and within windows to suit personal preferences for efficiency, cross talk, uniformity and image flicker as well as measured eye separation.

Figure 40:
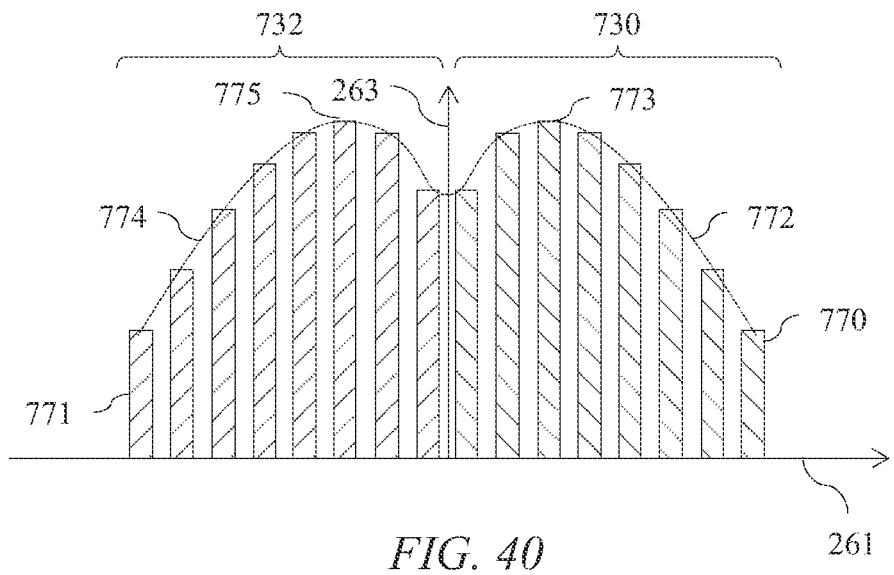
Figure 41:
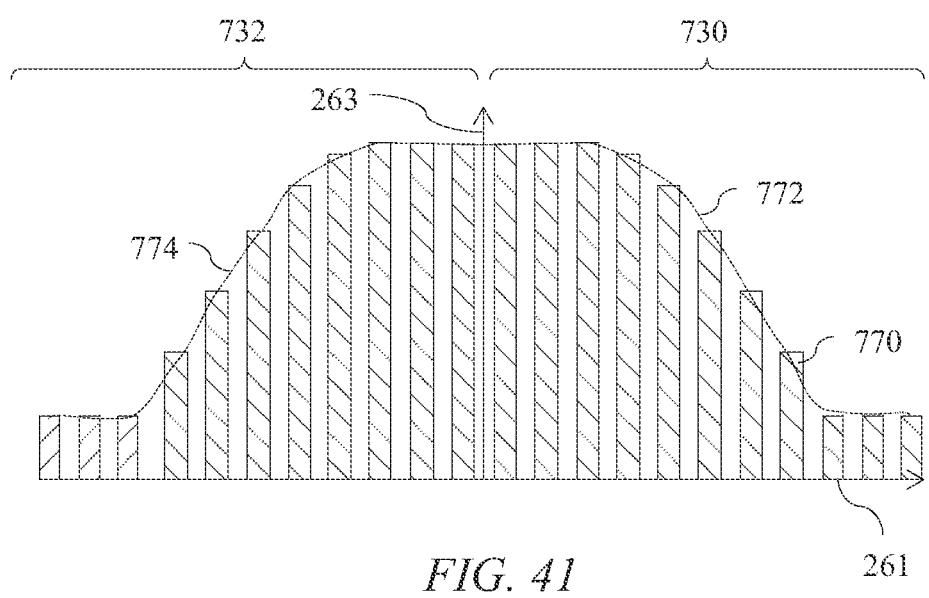

FIGS. 40 and 41 illustrate alternative forms of the left and right viewing windows 730 and 732. Herein, the scaled luminous flux of illuminator elements that are directed to optical windows between the observer's eyes, and are thus located between the global maxima 773, 775, is reduced less than the reduction of scaled luminous flux of the illuminator elements that are located outside the maxima 773, 775. Such an arrangement provides some light towards the edge of the display for observers 99 away from the window plane 106, while achieving relatively uniform brightness for regions in the centre of the display. Advantageously display uniformity is maintained while perceived image flicker is reduced.

Whereas in the above examples the display device is operated to provide an autostereoscopic 3D display, similar variation in the scaled luminous flux across a viewing window may be applied in the case that display device is operated to display a 2D image and the control system operate the light sources 15 to direct light into a single viewing window in dependence on the detected position of the observer 99. An example of this will now be described.

Figure 42:
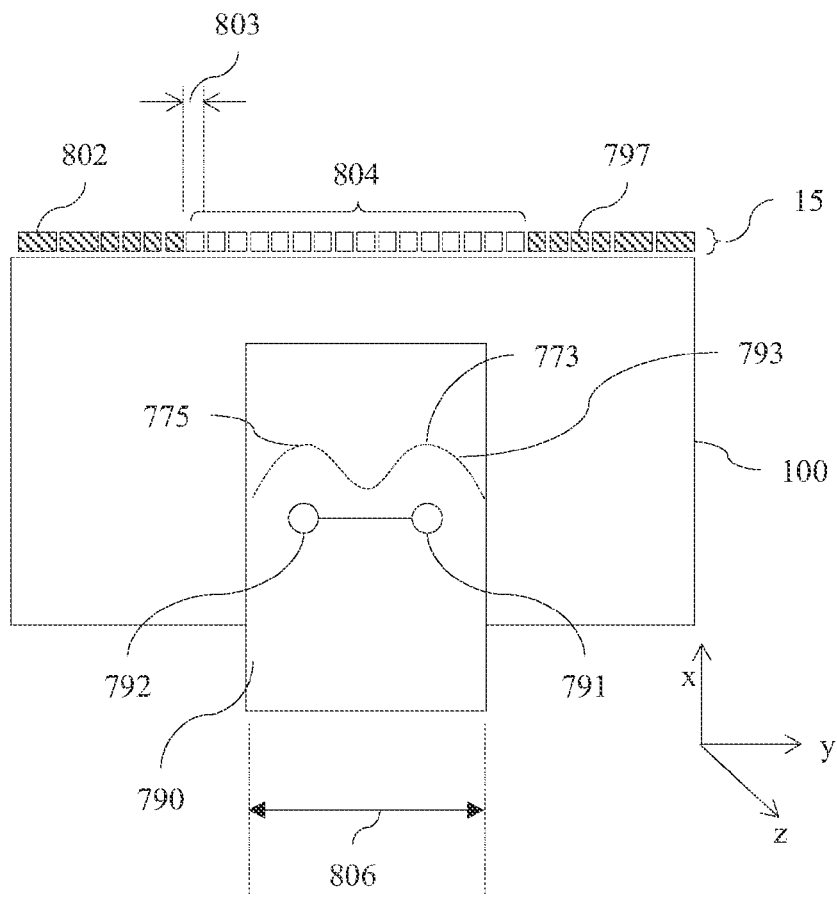
FIG. 42 is a schematic diagram illustrating a 2D directional display in landscape orientation, in accordance with the present disclosure.

FIG. 42 is a schematic diagram illustrating a 2D directional display in landscape orientation. The display device 100 is arranged to provide a single viewing window 790 in dependence on the detected position of the observer 99 in the lateral direction. The light sources are controlled to output light with scaled luminous fluxes that vary across the array of light sources to provide a luminous intensity that varies with the angle of the detected position of the observer in the luminous intensity distribution 793 with global maxima 773, 775 substantially aligned with right and left eyes 791, 792 of observer 99. The array 15 is arranged with non-illuminated illuminator elements 797 and illuminated group 804 of illuminator elements of array 15 achieving the global maxima 773, 775 in the viewing window 790. The array 15 may be arranged with a substantially constant pitch 803 to minimise non-uniformities in the viewing window when imaged in combination with asymmetric diffuser 68 and other scattering components in the display.

Thus the array 15 of illuminator elements may be disposed at different input positions 261 with a constant pitch 803 in the lateral direction across the input end of the waveguide, whereby the scaled luminous fluxes are the actual luminous fluxes of the illuminator elements 15*n*.

Further illuminator elements 802 may be provided corresponding to off axis viewing positions that have a larger pitch and/or lower scaled luminous flux than the illuminator elements for on axis viewing positions. In combination with the control of scaled luminous flux of the illuminator elements for more on-axis positions, such illuminator elements can reduce cost of the array of illuminator elements without compromising the desired optical window output.

Figure 43:
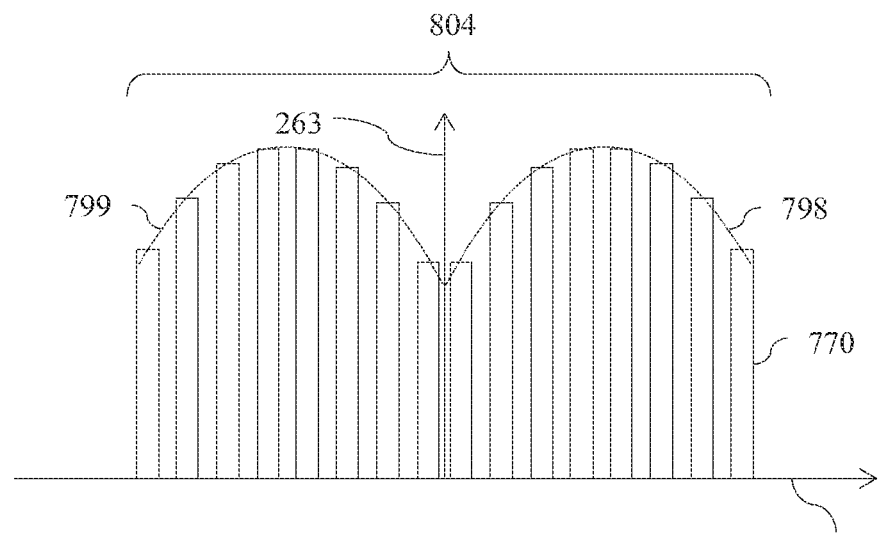
FIG. 43 is a schematic diagram illustrating a graph of scaled luminous flux against light source position for the display of FIG. 42, in accordance with the present disclosure.

FIG. 43 is a schematic diagram illustrating a graph of scaled luminous flux against input position for the display of FIG. 42. Thus the illumination of a 2D display may be arranged to provide reduced power consumption compared to a Lambertian illuminated display. The operation of the display is similar to that shown for FIGS. 36-41, however, the group 804 is arranged to be illuminated in a single phase for both eyes and may provide continuous operation. Advantageously the power consumption of the device may be reduced, while achieving substantially the same brightness of the centre of the display for an observer at the window plane, and minimizing display flicker for a moving observer. Further, the spatial light modulator 48 may operate continuously rather than in synchronization with left and right eye illumination phases, reducing cost of the spatial light modulator 48.

Figure 44:
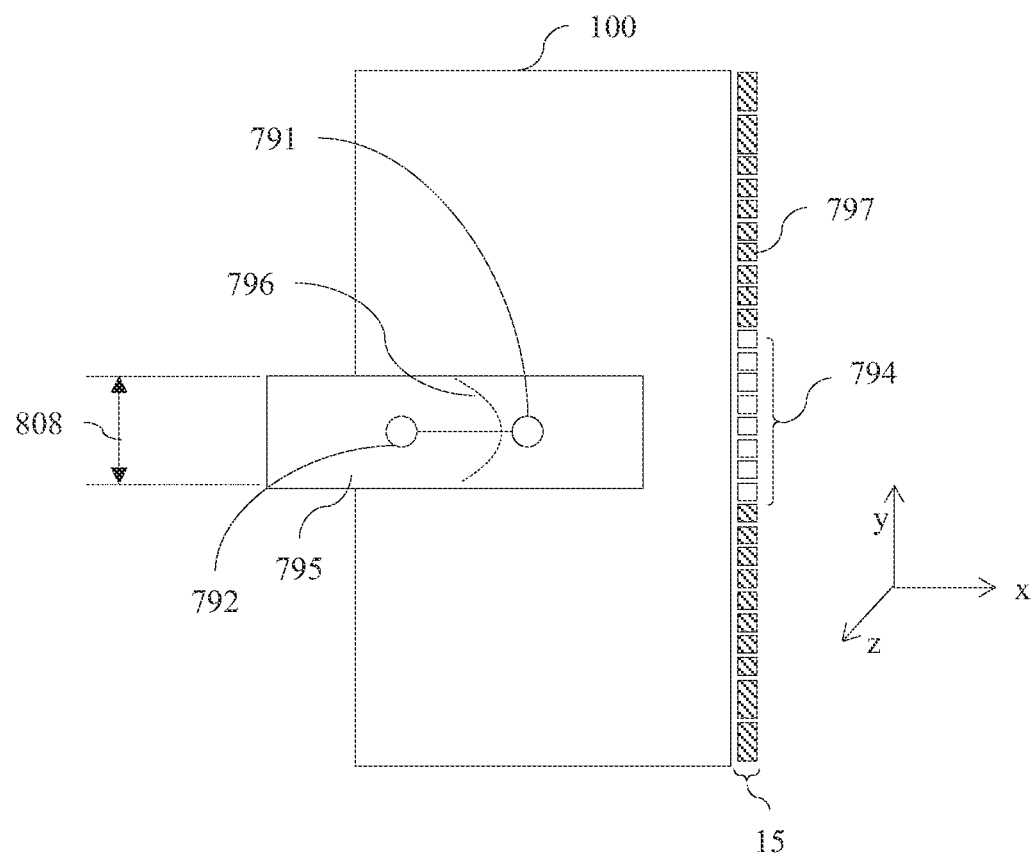
FIG. 44 is a schematic diagram illustrating a 2D directional display in portrait orientation, in accordance with the present disclosure.

FIG. 44 is a schematic diagram illustrating a 2D directional display in portrait orientation. The height 808 of the window 795 (in the lateral direction) in the portrait orientation is reduced compared to the width 806 of the window (in the lateral direction) in the landscape orientation as the eyes are arranged parallel to the extent in the x-axis of the viewing windows 795 and luminous intensity distribution 796 may be provided. Thus the power consumption can advantageously be further reduced compared to the arrangement of FIG. 42.

Figure 45:
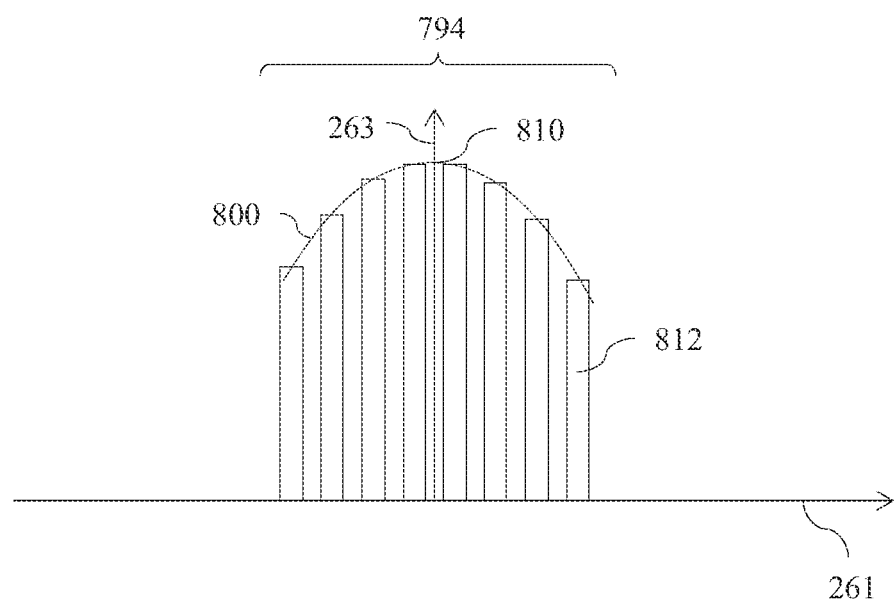
FIG. 45 is a schematic diagram illustrating a graph of scaled luminous flux against light source position for the display of FIG. 44, in accordance with the present disclosure.

FIG. 45 is a schematic diagram illustrating a graph of scaled luminous flux against input position for the display of FIG. 44. Thus, the luminous flux distribution 800 of optical windows 812 may be of narrower width than the arrangement of FIG. 44 to form viewing window 794 and a single maximum 810 may be provided so that advantageously the centre of the display is optimally illuminated for on-axis viewing positions away from the window plane. The viewing window 794 may be stationary or may be adjusted in correspondence to the detected position of observer 99.

Thus a step of selectively operating the illuminator elements to direct light into varying optical windows corresponding to said output directions may be performed to direct light into at least one viewing window 794 comprising at least two simultaneously illuminated optical windows 812, the illuminator elements being controlled to output light with luminous flux linear density 263 that varies in dependence on the detected position of the observer 99 and further varies across the plural optical windows 812 of said at least one viewing window 794.

Figure 46:
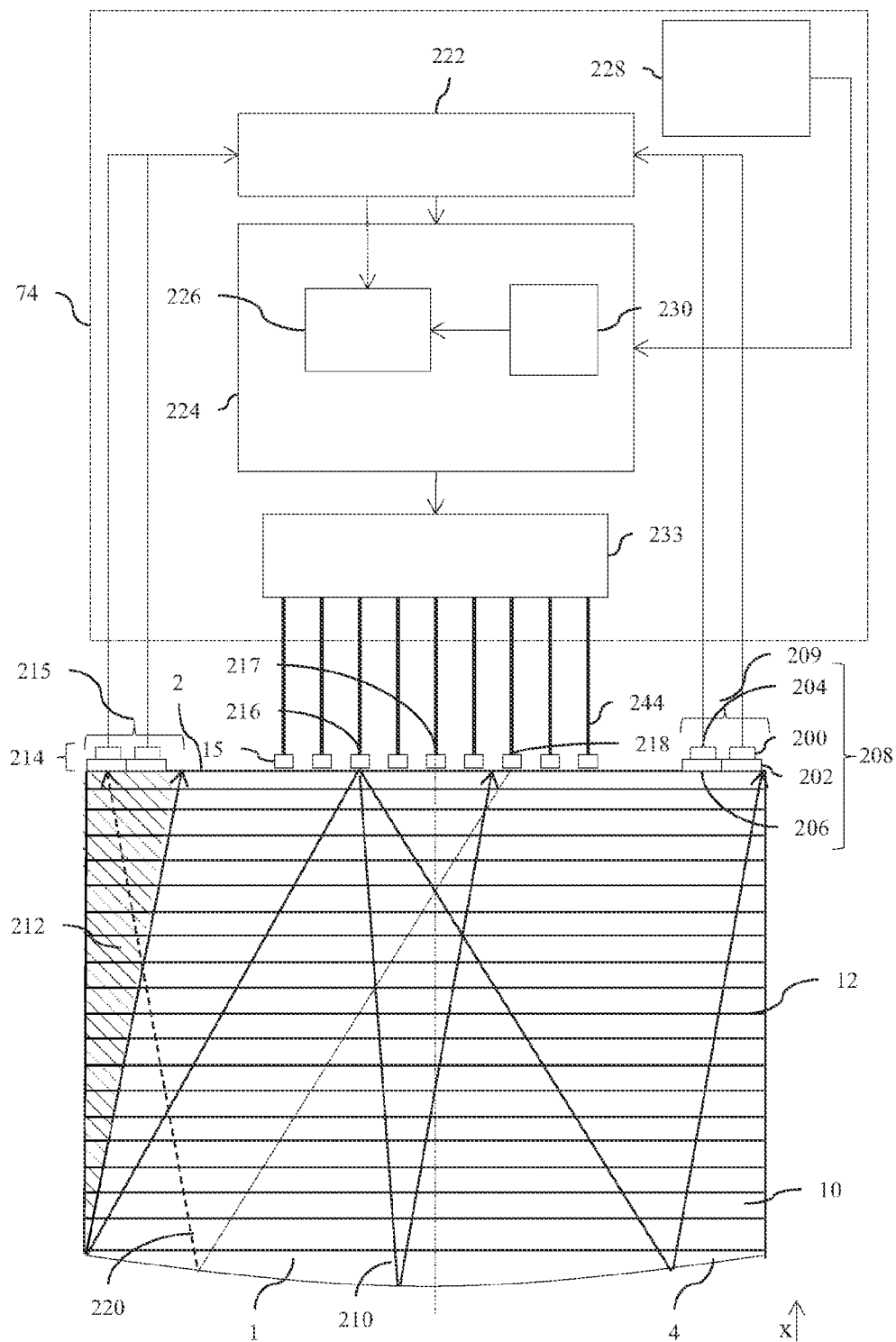
FIG. 46 is a schematic diagram illustrating a control system and front view of a directional backlight apparatus, in accordance with the present disclosure.

FIG. 46 is a schematic diagram illustrating a control system and front view of a directional backlight apparatus comprising a directional backlight as described above including a waveguide 1 and array 15 of illuminator elements. The directional backlight appratus includes a control system, as described above, that implements a method of controlling the illuminator elements 15$n$ making a calibration of the drive signals, as follows.

Light rays 210 from illuminator element 216 are directed to reflective end 4, reflected and directed back towards the input end 2. Some of the light from source 216 will be extracted by means of light extraction features 12, while some of the light will be incident on at least a portion of the input end 2. Sensor elements 208, 214 may be arranged at the input end in regions 209, 215 outside the lateral extent of the array 15 on both sides of the array 15. In regions 212, an illumination void is present so that light from source 216 will not be substantially incident on sensor 214; however light rays from source 216 will be incident on sensor 208. Each sensor 208, 214 may include a light intensity measurement sensor. Preferably as shown in FIG. 46, the sensors 208, 214 may include optical filters 202, 206 and light intensity sensors 200, 204. Such an arrangement may advantageously provide a measurement of both the light intensity and a measurement of chromaticity coordinate for the light from source 216. In a similar manner, light rays 220 from source 218 may not be incident on sensor 208, but will incident on sensor 214. For on-axis measurement, sensors 208, 214 may both detect light from respective on-axis illuminator elements 217.

Measured signals from sensors 208, 214 may be passed to illumination controller 74 which drives illuminator elements of array 15 using an illuminator element driver 233 which may be a current driver with grey level control to drive lines 244 to provide drive signals to the array of illuminator elements. The illumination controller 74 calibrates the drive signals supplied to the illuminator elements 15$n$ in response the measured signals representing the sensed light, as follows.

Array luminous flux distribution controller 224 may include for example a stored reference grey level profile 230 from front of screen measurements that may be provided at the time of manufacture, for example including luminous flux distribution data for distribution 550 in FIG. 21B. This allows the control system to output scaled luminous fluxes that have a predetermined distribution across the array of light sources, for example to vary the scaled luminous fluxes as described above.

Data from sensors 208, 214 may be supplied for example to calibration measurement system 222 that may provide data to a look up table 226 within the luminous flux distribution controller 224. Further selection of luminous intensity distribution (for example to select between luminous intensity distributions 266, 272, 274, 276, 294) may be provided by selection controller 228. Selection controller may have user input or an automatic input that is determined by sensing of display viewing conditions. For example the number of viewers, the room brightness, display orientation, the image quality settings and/or the power savings mode settings may be used to vary the selected distribution.

In device manufacture, the output of the sensors 208, 214 in response to each of the light sources of the array 15 may be compared to the signal from a camera or detector placed in the window plane of the display. This achieves an initial calibration or referencing of the internal sensors with respect to light in the window plane. Such calibration may be stored in a look up table or similar.

In operation of a calibration mode, a single illuminator element of the array 15 is illuminated and sensors 208, 214 may measure a signal for the said illuminator element. The said illuminator element is extinguished and the next source of the array operated and a measurement taken. The output of the array of measurements is compared with a factory calibration so that the output luminous intensity for the given luminous flux distribution can be interpolated. The appropriate luminous flux distribution for the required luminous intensity distribution is then derived by the controller 224 and the illuminator element controller 233 appropriately configured to achieve the desired luminous flux distribution.

Advantageously the light from the whole array 15 may be measured by a combination of sensors 208, 214 and a desired luminous intensity distribution may be achieved.

Thus said sensing of light incident on the input end 2 may use sensor elements 208 arranged at region 209 of the input end 2 outside the array 15 of illuminator elements in the lateral direction. Said sensing of light incident on the input end 2 may use sensor elements 208, 214 arranged at regions 209, 215 of the input end 2 outside the array 15 of illuminator elements in the lateral direction on both sides of the array of illuminator elements.

The sensor system may be arranged with the waveguide 1 only during the fabrication of the display for characterization purposes and removed after completion of product fabrication. Preferably the sensor system may be arranged with the waveguide 1 during normal operation. The in-field calibration phase may be applied during display switch-on. The spatial light modulator may be arranged with a black image during calibration to remove visibility to the user of the calibration phase. The calibration phase may be repeated on a daily, weekly or monthly basis for example to compensated for ageing artefacts as shown in FIGS. 26A-B.

Figure 47:
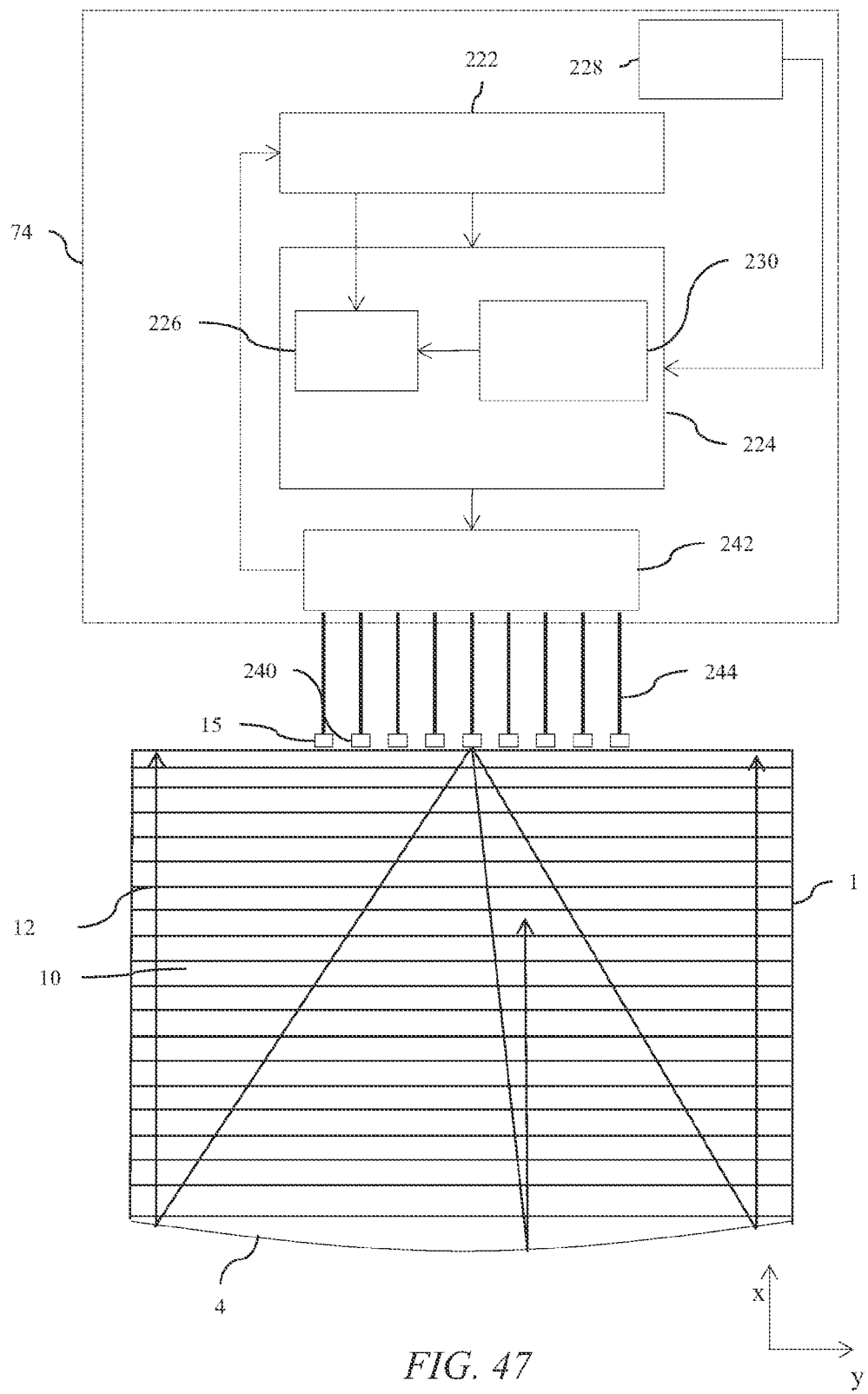
FIG. 47 is a schematic diagram illustrating a control system and front view of a directional backlight apparatus, in accordance with the present disclosure.

FIG. 47 is a schematic diagram illustrating a control system and front view of a directional backlight apparatus, similar to that of FIG. 47 but with the following modifications in which the sensors 208, 214 are removed and replaced by using the illuminator elements of the array 15 in a sensing mode as will be described. Thus in a calibration mode of operation, an illuminator element is illuminated and all of the other illuminator elements are arranged to sense light rather than emit light. The sensed light on the input end is used in the same was as described with reference to FIG. 46.

In using the illuminator elements 15$n$ to sense light, an integrated intensity measurement is made to provide an averaging of total detected intensity. Thus, while the illuminator elements individually may not provide high quality measurement, the signal to noise ratio of the array may improve the performance. Once a calibration of performance has been made and compared to a factory setting, then the required luminous intensity distribution can be achieved as described with reference to FIG. 46. Advantageously the cost of the sensor may be reduced or eliminated, and the sensing may take place over a wide range of positions at the input end, providing an averaging of optical performance.

Figure 48:
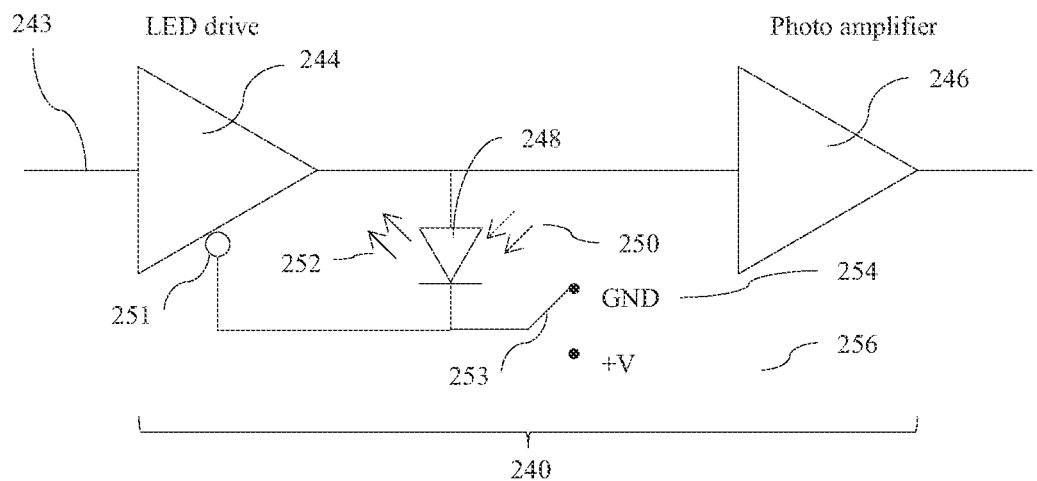
FIG. 48 is a schematic diagram illustrating an apparatus to drive a light source for a calibration mode of operation, in accordance with the present disclosure.

FIG. 48 is a schematic diagram illustrating an apparatus to drive an illuminator element for a calibration mode of operation. In this case, the illuminator elements are LEDs 248 and the sensing of light is performed by operating the LEDs 248 under reverse bias. FIG. 48 illustrates a semiconductor p-n junction device including LED 248 that may be operated as an illuminator element with a first forward bias and may also be operated with a reverse bias as a photodetector. In operation with forward bias, LED 248 is driven from drive amplifier 244, which has a signal input 243 and an enable input 251 such that when switch 253 is in the GND position 254, amplifier 244 is enabled and the LED 248 emits light 252 in response to signal input 243.

When switch 253 is in position 256, a positive voltage is applied to the cathode of LED 248 such that it is arranged with reversed bias. In reversed bias LED 248 operates to detect light 250 in cooperation with photo amplifier 246. Therefore the circuitry 240 can operate p-n junction device 248 as either a LED or a photodetector.

Advantageously this enables the same LED array 15 to function as a photo detector array with suitable circuitry 240. Each source of the array may have the arrangement of FIG. 48 and each individual p-n junction device in the array 15 may have its own photo amplifier 246.

Figure 49:
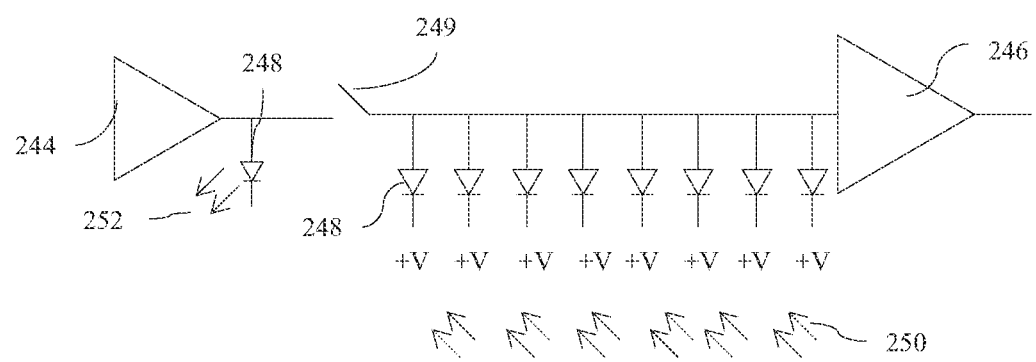
FIG. 49 is a schematic diagram illustrating a light source array in calibration mode of operation; in accordance with the present disclosure.

FIG. 49 is a schematic diagram illustrating an illuminator element array in calibration mode of operation. Also as shown in FIG. 49, a p-n junction of the array 15 may be driven with forward bias as an LED by drive amplifier 244 may be separated from the p-n junctions driven as detectors by switch 249. Similar switches may be configured at other positions in array 15. Advantageously, the current output of more than one p-n junction device 248 may be summed at the virtual ground input of photo amplifier 246. Advantageously the sensitivity of detection may be improved and the number of photo amplifiers 246 may be reduced.

Illuminator elements may typically include white LEDs, in particular LEDs that include a gallium nitride blue light emitting chip and a wavelength converting layer that is typically a phosphor arranged to convert some of the blue light to yellow light. In combination the blue and yellow light may achieve white light output. In operation, the blue and yellow light emitting elements may change output at different rates, and thus the color temperature of the white light output may change with age. Color variations may provide chromatic variations of the optical windows, and thus perceived luminance and chrominance changes in the viewing windows. Such changes may increase display flicker for a moving observer and achieve non-uniformities across the display area. It would be desirable to compensate the output of the illuminator elements for such chromaticity changes.

Figure 50:
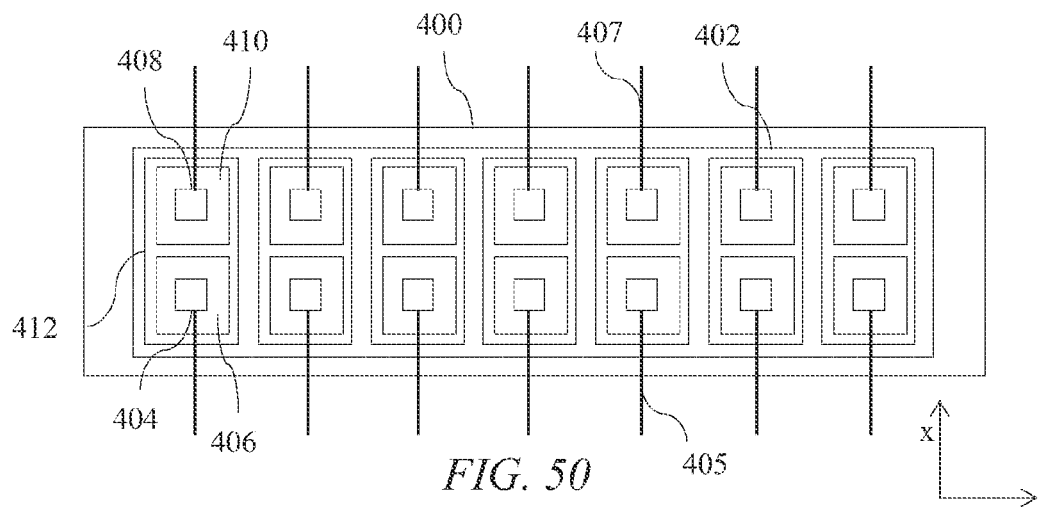
FIG. 50 is a schematic diagram illustrating a front view of a light source array arranged to achieve color correction, in accordance with the present disclosure.

FIG. 50 is a schematic diagram illustrating a front view of an illuminator element array arranged to achieve color correction. Illuminator element array 400 may be arranged in alignment with the input end 402 of a waveguide 1. Each illuminator element package 412 of the array may include first and second gallium nitride chips 404, 408 and respective aligned phosphors 406, 410, with the pair aligned in portrait arrangement compared to the input aperture 402. Individual drive lines 405, 407 are arranged to provide a desired luminous flux distribution across the array 15 of illuminator elements. The phosphors may be rare earth macroscopic phosphors or may be quantum dot phosphors.

Figure 51:
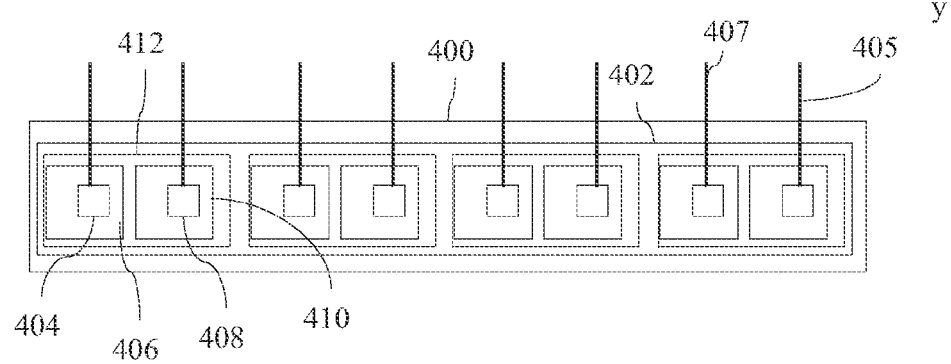
FIG. 51 is a schematic diagram illustrating a front view of a further light source array arranged to achieve color correction, in accordance with the present disclosure.

FIG. 51 is a schematic diagram illustrating a front view of a further array of illuminator elements arranged to achieve color correction. The package may be arranged in landscape orientation compared to the input end 402, and thus the input end may have reduced height, and higher efficiency may be achieved. In such an arrangement, adjacent optical windows in the window plane 106 may have different chromatic appearance; however diffusion by asymmetric diffuser 68 of the optical windows in the lateral direction may be arranged to reduce the chromatic variation in the window plane. Advantageously this arrangement may achieve higher efficiency and lower cross talk of the waveguide 1 for a given height of the reflective end 4 compared to the arrangement of FIG. 50.

Figure 52:
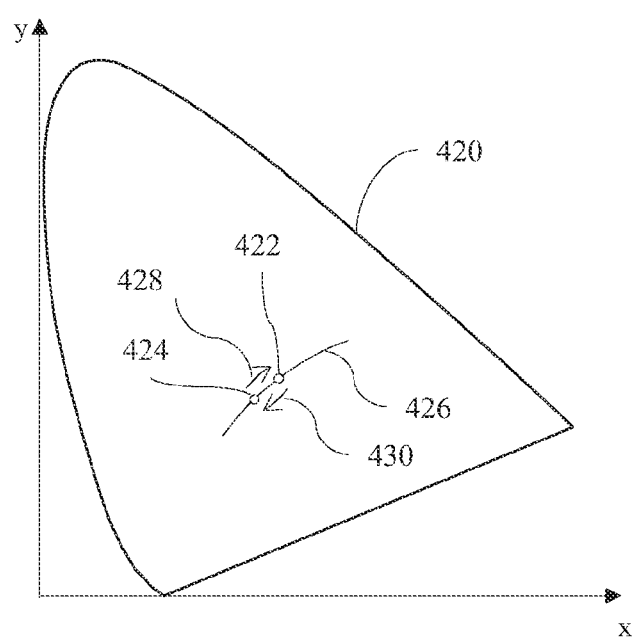
FIG. 52 is a schematic diagram illustrating a graph of optical window chromaticity variations and a method to correct chromaticity variations, in accordance with the present disclosure.

FIG. 52 is a schematic diagram illustrating a graph of optical window chromaticity variations and a method to correct chromaticity variations. Thus on a CIE 1931 x-y chromaticity diagram with spectral locus 420 and white point locus 426, a factory setting for chromaticity coordinate (being the average of the two sources 404, 406 and 408, 410) may be provided as point 422. After ageing, the average chromaticity may move in direction 430 to point 424. Such a chromaticity may be measured by means of sensor and filter elements 204, 206 and 200, 202 respectively as shown in FIG. 46. The control system of FIG. 46 can further provide different corrected drive signals along drive lines 405, 407 for each illuminator element to correct for said variation in output chromaticity and move chromaticity coordinate in direction 428 back to point 422.

Further, the chromaticity and output of illuminator elements may vary with temperature. Thus illuminator elements in a heavily used part of the array 15 such as for on-axis positions may operate at a higher temperature than less frequently used parts of the array. Thus, in operation, the luminance of the illuminator elements may vary with time due to temperature effects. The sensors 208, 214 may be arranged to operate during display operation to compensate for said temperature variations by means of control system as described above. Thus non-operating illuminator elements or separate sensors may be arranged to continuously monitor output luminance and provide adjustment of the illuminator element output dynamically.

Figure 53:
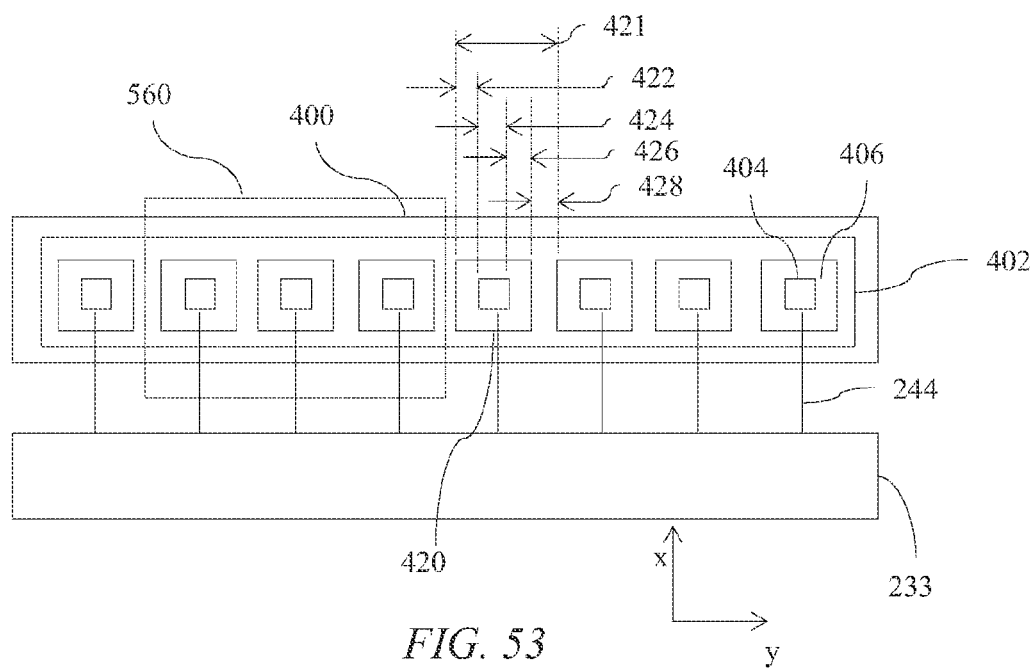
FIG. 53 is a schematic diagram illustrating a front view of a light source array, in accordance with the present disclosure.
Figure 54:
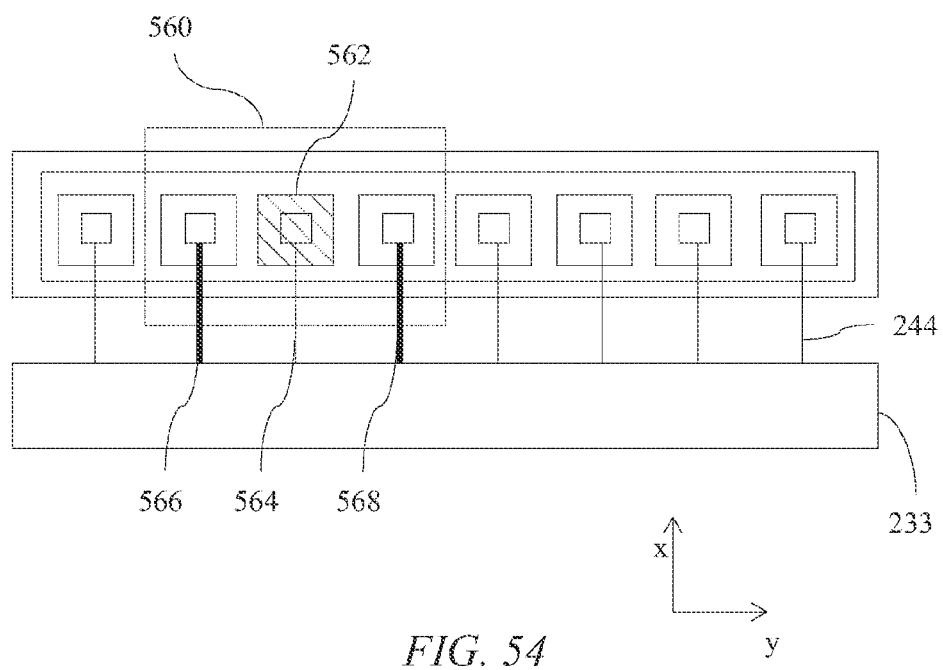
FIG. 54 is a schematic diagram illustrating a front view of a light source array and method to correct a light source failure, in accordance with the present disclosure.

FIG. 53 is a schematic diagram illustrating a front view of a array of illuminator elements and FIG. 54 is a schematic diagram illustrating a front view of a array of illuminator elements and method to correct an illuminator element failure. In operation, viewing window 26 may include light from adjacent optical windows 249, such that for a given viewing position in the window plane, the viewing window for example includes light from at least two and preferably three or more illuminator elements as shown by region 560. Failure of illuminator elements may result in a dip in viewing window profile and can be detected by the sensing system, such as that described in FIG. 46. Such a failure can be compensated as described above, and further by increasing the drive to drive lines 566, 568 to neighbouring illuminator elements, removing drive to drive line 564.

Pitch 421 of the light source 420 of the array 15 of illuminator elements 15n may comprise widths 422, 426 of light with a higher yellow light content due to predominantly phosphor emission compared to width 424 comprising GaN chip area with a higher blue light content. Further gap 428 (that may comprise parts of the light source mechanical, thermal and electrical package) may have no light emission. The scaled luminous flux is therefore a measure of the average luminous flux across the pitch 421. The pitch 421 may vary across the lateral width of the array 15 of illuminator elements 15n.

As may be used herein, the terms "substantially" and "approximately" provide an industry-accepted tolerance for its corresponding term and/or relativity between items. Such an industry-accepted tolerance ranges from zero percent to ten percent and corresponds to, but is not limited to, component values, angles, et cetera. Such relativity between items ranges between approximately zero percent to ten percent.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the embodiment(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

What is claimed is:

1. A method of controlling an array of light sources of a directional backlight that comprises a waveguide having an input end and the array of light sources disposed at different input positions in a lateral direction across the input end of the waveguide, the light sources associated with various widths in the lateral direction, the waveguide further comprising first and second, opposed guide surfaces for guiding light along the waveguide, the waveguide being arranged to direct input light from the light sources as output light through the first guide surface into optical windows in output directions distributed in a lateral direction to a normal to the first guide surface that are dependent on the input positions;
the method comprising selectively operating the light sources to direct light into varying optical windows, the light sources being controlled to output light with luminous fluxes, scaled inversely by the width associated with the respective light sources, that vary across the array of light sources, wherein a first light source in the array is controlled to output light with a first scaled luminous flux, the first light source being associated with a first width, and wherein a second light source in the array is controlled to output light with a second scaled luminous flux less than the first scaled luminous flux, the second light source being associated with a second width narrower than the first width.

2. A method according to claim 1, wherein the light sources are controlled to output light with said scaled luminous fluxes varying across the array of light sources in a luminous flux distribution with the input positions across the input end that has a global maximum and reduces on either side of the global maximum.

3. A method according to claim 2, wherein the global maximum of the luminous flux distribution is in respect of the light sources aligned with the optical axis of the waveguide.

4. A method according to claim 1, wherein the light sources are controlled to output light with said scaled luminous fluxes varying with the light sources in a luminous flux distribution with the input positions that produces a luminous intensity of the output light that varies with the angle of the output directions in a luminous intensity distribution that is Lambertian.

5. A method according to claim 1, wherein the light sources are controlled to output light with said scaled luminous fluxes varying with the light sources in a luminous flux distribution with the input positions that produces a luminous intensity of the output light that varies with the angle of the output directions in an actual luminous intensity distribution having a maximum luminous intensity corresponding to the global maximum of the luminous flux distribution that is greater than a luminous intensity distribution that is Lambertian and has the same total luminous intensity over all output directions as the actual luminous intensity distribution.

6. A method according to claim 1, wherein
the directional backlight is part of a display device that further comprises a transmissive spatial light modulator arranged to receive the output light from the first guide surface and to modulate it to display an image, and
the method further comprises detecting the position of an observer across the display device, said step of selectively operating the light sources to direct light into optical windows being performed to direct light into optical windows in dependence on the detected position of the observer, and the light sources being controlled to output light with said scaled luminous fluxes varying across the array of light sources in dependence on the detected position of the observer.

7. A method according to claim 6, wherein the light sources are controlled to output light with said scaled luminous fluxes varying across the light sources in dependence on the detected position of the observer in a manner that produces a nous intensity of the output light that varies with the angle of the detected position of the observer in the lateral direction in a luminous intensity distribution that is Lambertian.

8. A method according to claim 6, wherein the light sources are controlled to output light with said scaled luminous fluxes varying across the light sources in dependence on the detected position of the observer in a manner that produces a luminous intensity of the output light that varies with the angle of the detected position of the observer in the lateral direction in an actual luminous intensity distribution having a maximum luminous intensity that is greater than a luminous intensity distribution that is Lambertian and has the same total luminous intensity over all output directions as the actual luminous intensity distribution.

9. A method according to claim 6, wherein the light sources are controlled to output light with said scaled luminous fluxes varying across the light sources in dependence on the detected position of the observer in a manner that produces a luminous intensity of the output light that varies with the angle of the detected position of the observer in the lateral direction and with the detected position of the observer in a direction along the normal to the first guide surface.

10. A method according to claim 6, wherein said step of selectively operating the light sources to direct light into varying optical windows corresponding to said output directions is performed to direct light into at least one viewing window comprising at least two simultaneously illuminated optical windows, the light sources being controlled to output light with said scaled luminous fluxes varying in dependence on the detected position of the observer and further varies across the plural optical windows of said at least one viewing window.

11. A method according to claim 10, wherein the at least one viewing window comprises at least three simultaneously illuminated optical windows, and the light sources are controlled to output light with said scaled luminous fluxes varying across the at least three simultaneously illuminated optical windows in a viewing window distribution that has a global maximum and reduces on both sides of the global maximum.

12. A method according to claim 6, further comprising controlling the spatial light modulator to display temporally multiplexed left and right images, said selective operation of the light sources being performed synchronously to direct the displayed left and right images into optical windows corresponding to left and right eyes of the observer, in dependence on the detected position of the observer.

13. A method according to claim 12, wherein the light sources are controlled to output light with luminous flux linear density that varies across the array of light sources in dependence on whether the output light is modulated by a left or right image.

14. A method according to claim 13, wherein the light sources are controlled to output light with said scaled luminous fluxes varying across the array of light sources in dependence on whether the output light is modulated by a left or right image in a manner that produces a luminous intensity of the output light that varies with the angle of the left and right eyes of the observer in the lateral direction with a difference in luminous intensity that is Lambertian.

15. A method according to claim 13, wherein said step of selectively operating the light sources to direct light into varying optical windows corresponding to said output directions is performed to direct light into a left viewing window comprising at least two simultaneously illuminated left optical windows and a right viewing window comprising at least two simultaneously illuminated right optical windows, the light sources being controlled to output light with said scaled luminous fluxes further varying across the at least two optical windows of each of the left and right viewing windows.

16. A method according to claim 15, wherein the light sources are controlled to output light with said scaled luminous fluxes varying across the at least two simultaneously illuminated left optical windows in a left viewing window distribution that has a global maximum and reduces on the side of the global maximum adjacent the right viewing window, and that varies across the at least two simultaneously illuminated right optical windows in a viewing window distribution that has a global maximum and reduces on the side of the global maximum adjacent the left viewing window.

17. A method according to claim 16, wherein the left viewing window distribution reduces on both sides of the global maximum, and the right viewing window distribution reduces on both sides of the global maximum.

18. A method according to claim 1, wherein
the directional backlight is part of a display device that further comprises a transmissive spatial light modulator arranged to receive the output light from the first guide surface and to modulate it to display an image, and
the method further comprises controlling the spatial light modulator to display temporally multiplexed left and right images, said selective operation of the light sources being performed synchronously to direct light into a left viewing window comprising at least two simultaneously illuminated left optical windows and a right viewing window comprising at least two simultaneously illuminated right optical windows, the light sources being controlled to output light with said scaled luminous fluxes further varying across the at least two optical windows of each of the left and right viewing windows.

19. A method according to claim 1, wherein the first guide surface is arranged to guide light by total internal reflection and the second guide surface comprises a plurality of light extraction features oriented to reflect light guided through the waveguide in directions allowing exit through the first guide surface as the output light and intermediate regions between the light extraction features that are arranged to direct light through the waveguide without extracting it.

20. A method according to claim 19, wherein the second guide surface has a stepped shape comprising facets, that are said light extraction features, and intermediate regions.

21. A method according to claim 20, wherein said facets of the second guide surface are arranged to reflect light by total internal reflection, whereby the luminous flux of the output light reflected by the facets, as a proportion of the luminous flux of the input light, has a variation for different light sources, the light sources being controlled to output light with said scaled luminous fluxes varying across the array of light sources in manner that compensates for said variation in the luminous flux of the output light reflected by the facets.

22. A method according to claim 1, wherein
the first guide surface is arranged to guide light by total internal reflection and the second guide surface is substantially planar and inclined at an angle to reflect light in directions that break the total internal reflection for outputting light through the first guide surface, and
the display device further comprises a deflection element extending across the first guide surface of the waveguide for deflecting light towards the normal to the spatial light modulator.

23. A method according to claim 1, wherein the waveguide further comprises a reflective end facing the input end for reflecting light from the input light back through the waveguide, the waveguide being arranged to direct input light from the light sources as output light through the first guide surface after reflection from the reflective end.

24. A method according to claim 23, wherein the reflective end has positive optical power in a lateral direction across the waveguide.

25. A method according to claim 1, wherein the array of light sources disposed at different input positions with a constant pitch in the lateral direction across the input end of the waveguide, whereby said scaled luminous fluxes are the actual luminous fluxes of the light sources.

26. A directional display apparatus comprising:
a display device comprising:
a waveguide having an input end;
an array of light sources disposed at different input positions in a lateral direction across the input end of the waveguide, the light sources associated with various widths in the lateral direction, the waveguide further comprising first and second, opposed guide surfaces for guiding light along the waveguide, the waveguide being arranged to direct input light from the light sources as output light through the first guide surface into optical windows in output directions distributed in a lateral direction to a normal to the first guide surface that are dependent on the input positions; and a transmissive spatial light modulator arranged to receive the output light from first guide surface and to modulate it to display an image; and a control system arranged to selectively operate the light sources to direct light into varying optical windows, and to control the light sources to output light with luminous fluxes, scaled inversely by the width associated with the respective light sources, that vary across the array of light sources, wherein the control system is arranged to control a first light source in the array to output light with a first scaled luminous flux, the first light source being associated with a first width, and wherein the control system is arranged to control a second light source in the array to output light with a second scaled luminous flux less than the first scaled luminous flux, the second light source being associated with a second width narrower than the first width.

* * * * *